US008498952B2

(12) United States Patent
Ferringer et al.

(10) Patent No.: US 8,498,952 B2
(45) Date of Patent: Jul. 30, 2013

(54) SYSTEMS AND METHODS FOR BOX FITNESS TERMINATION OF A JOB OF AN EVOLUTIONARY SOFTWARE PROGRAM

(75) Inventors: Matthew Phillip Ferringer, Round Hill, VA (US); Timothy Guy Thompson, Purcellville, VA (US)

(73) Assignee: The Aerospace Corporation, El Segundo, CA (US)

( * ) Notice: Subject to any disclaimer, the term of this patent is extended or adjusted under 35 U.S.C. 154(b) by 580 days.

(21) Appl. No.: 12/550,817

(22) Filed: Aug. 31, 2009

(65) Prior Publication Data

US 2010/0293120 A1 Nov. 18, 2010

Related U.S. Application Data

(60) Provisional application No. 61/178,806, filed on May 15, 2009.

(51) Int. Cl.
*G06F 15/18* (2006.01)
*G06N 3/12* (2006.01)

(52) U.S. Cl.
CPC .................................... *G06N 3/126* (2013.01)
USPC ........................................................ 706/13

(58) Field of Classification Search
USPC .......................................................... 703/13
See application file for complete search history.

(56) References Cited

U.S. PATENT DOCUMENTS

| 5,568,590 | A | 10/1996 | Tolson |
| 6,532,076 | B1 | 3/2003 | Sidorowich |
| 7,996,344 | B1 * | 8/2011 | Goel .............................. 706/13 |
| 8,069,127 | B2 | 11/2011 | Taylor et al. |
| 8,255,344 | B2 | 8/2012 | Ferringer et al. |
| 8,255,345 | B2 | 8/2012 | Ferringer et al. |
| 8,285,653 | B2 | 10/2012 | Ferringer et al. |
| 8,433,662 | B2 | 4/2013 | Ferringer et al. |
| 2008/0010044 | A1 * | 1/2008 | Ruetsch ........................... 703/2 |
| 2010/0292929 | A1 | 11/2010 | Ferringer et al. |
| 2010/0293122 | A1 | 11/2010 | Ferringer et al. |
| 2011/0078100 | A1 * | 3/2011 | Goel ............................. 706/13 |
| 2012/0084314 | A1 | 4/2012 | Ferringer et al. |

OTHER PUBLICATIONS

Laumanns, Marco et al.; "Combining Conbergence and Diversity in Evolutionary Multi-Objective Optimization"; 2002; Massachusetts Institiute of Technology; Evolutionary Computation 10(3); pp. 1-21.*

(Continued)

*Primary Examiner* — Jeffrey A Gaffin
*Assistant Examiner* — Stanley K Hill
(74) *Attorney, Agent, or Firm* — Sutherland Asbill & Brennan LLP

(57) ABSTRACT

Systems and methods may include receiving a respective plurality of objective function values for each chromosome data structure of a population, where the respective plurality of objective function values are obtained based upon an evaluation of each chromosome data structure; mapping the respective objective function values to respective epsilon values, where the respective epsilon values define a respective address associated with the plurality of objective functions; and performing non-domination sorting of the population to generate a reduced population of chromosome data structures; and performing epsilon non-dominated sorting to identify an elite set of addresses, where the prior steps are performed for a current generation, where the elite set of addresses are compared to a prior elite set of addresses for a predetermined number of prior generations to determine one or more variance values, where the one or more variance values are utilized to determine whether a current job of an evolutionary algorithm is to be halted.

20 Claims, 43 Drawing Sheets

OTHER PUBLICATIONS

Deb, Kalyanmoy et al.; "Omni-Optimizer: A generic evolutionary algorithm for single and multi-objective optimization"; 2006; Elsevier; European Journal of Operational Research 185 (2008); pp. 1062-1087.*

Matthew P. Ferringer et al., "Efficient and Accurate Evolutionary Multi-Objective Optimization Paradigms for Satellite Constellation Design." Journal of Spacecraft and Rockets. vol. 44, No. 3, May-Jun. 2007. 682-691.

Patrick M. Reed et al., "Parallel Evolutionary Multi-Objective Optimization on Large, Heterogeneous Clusters: An Applications Perspective." Journal of Aerospace Computing, Information, and Communication. vol. 5, Nov. 2008. 460-478.

J.B. Kollat et al., "A Computational Scaling Analysis of Multiobjective Evolutionary Algorithms in Long-Term Groundwater Monitoring Applications." Advances in Water Resources. Jan. 25, 2006. 1-24.

Y. Tang et al., "Parallelization Strategies for Rapid and Robust Evolutionary Multiobjective Optimization in Water Resources Applications." Advances in Water Resources. Mar. 29, 2006. 1-39.

J.B. Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kalyanmoy Deb et al., "Evaluating the epsilon-Domination Based Multi-Objective Evolutionary Algorithm for a Quick Computation of Pareto-Optimal Solutions." Evolutionary Computation (13)4: 501-525.

Joshua B. Kollat et al., "The Value of Online Adaptive Search: A Performance Comparison of NSGAII, epsilon-NSGAII and epsilonMOEA." Springer-Verlag Berlin Heidelberg 2005. 386-398.

Kalyanmoy Deb et al., "A Fast and Elitist Multi-Objective Genetic Algorithm: NSGA-II" KanGAL Report No. 200001. 20 pages.

Matthew P. Ferringer et al., "Many-objective Reconfiguration of Operational Satellite Constellations with the Large-Cluster Epsilon Non-domination Sorting Genetic Algorithm-II." The Aerospace Corporation's Independent Research and Development Program. Oct. 31, 2008. 10 pages.

David A. Van Veldhuizen et al., "Considerations in Engineering Parallel Multiobjective Evolutionary Algorithms." IEEE Transactions on Evolutionary Computation. vol. 7, No. 2, Apr. 2003. 144-173.

Matthew P. Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Search Report and Written Opinion for International Application No. PCT/US2010/034955 mailed Aug. 17, 2010.

Matthew P. Ferringer et al., Many-objective Reconfiguration of Operational Satellite Constellations with the Large-Cluster Epsilon Non-dominated Sorting Genetic Algorithm-II. 2009 IEEE Congress on Evolutionary Computation, 10 pages.

Matthew P. Ferringer, "General Framework for the Reconfiguration of Satellite Constellations." <http://etda.libraries.psu.edu/theses/approved/WorldWideIndex/ETD-3537/index.html>, 40 pages.

Matthew P. Ferringer et al., "Pareto-hypervolumes for the Reconfiguration of Satellite Constellations." AIAA/AAS Astrodynamics Specialist Conference and Exhibit. Aug. 18-21, 2008, p. 1-31.

Yong Tang, "Advancing Hydrologic Model Evaluation and Identification Using Multiobjective Calibration Sensitivity Analysis and Parallel Computation." ProQuest Information and Learning Company. 2007, 48 pages.

Scott Zimmer et al., "Utilizing Evolutionary Algorithms for Problems with Vast Infeasible Regions and Expensive Function Evaluations." The Aerospace Corporation. Jun. 27, 2008, 12 pages.

Theodore R. Stodgell et al., "Satellite Rendezvous Tours Using Multiobjective Evolutionary Optimization." The Pennsylvania State University. 28 pages.

Joshua B. Kollat et al., "A Framework for Visually Interactive Decision-making and Design using Evolutionary Multi-objective Optimization (VIDEO)" Environmental Modelling & Software 22. 2007, 1691-1704.

Joshua B. Kollat et al., "A New Epsilon-Dominance Hierarchical Bayesian Optimization Algorithm for Large Multiobjective Monitoring Network Design Problems" Advances in Water Resources 31. 2008, 828-845.

Y. Tang et al., "Parallelization Strategies for Rapid and Robust Evolutionary Multiobjective Optimization in Water Resources Applications." Advances in Water Resources 30. 2007, 335-353.

Matthew P. Ferringer, "Efficient and Accurate Evolutionary Multi-Objective Optimization Paradigms for Satellite Constellation Design." Journal of Spacecraft and Rockets. vol. 44, No. 3, May-Jun. 2007. 10 pages.

Patrick M. Reed et al., "Parallel Evolutionary Multi-Objective Optimization on Large, Heterogeneous Clusters: An Applications Perspective." Journal of Aerospace Computing Information and Communication. vol. 5, Nov. 2008, 460-478.

Allison Barker, "Aerospace Competes in International Global Trajectory Optimization Competition." Orbiter. vol. 48, No. 3. Mar. 27, 2008, 1 page.

Anonymous, <http://www.apptimation.com/Technology/Technology.html>, 1 page.

Muhlenbein, Heinz et al.; "Evolution in time and space—the parallel genetic algorithm."; 1991; Morgan Kaufmann; pp. 1-22.

Ventura, Sebastian et al.; "JCLEC: a Java framework for evolutionary computation"; 2007; Springer-Verlag; pp. 381-392.

Chuang, Angela S. et al.; "An Extensible Genetic Algorithm Framework for Problem Solving in a Common Environment"; 2000; IEEE; Transactions on Power Systems, vol. 15, No. 1; pp. 269-275.

Tan, K. C. et al.; "A Multiobjective Evolutionary Algorithm Toolbox for Computer-Aided Multiobjective Optimization"; 2001; IEEE; Transactions on Systems, Man, and Cybernetics- Part B: Cybernetics, vol. 31, No. 4; pp. 537-556.

Cantu-Paz, Erick et al.; "Efficient parallel genetic algorithms: theory and practice." 2000; Comput. Methods Appl. Mech. Engrg. 186 (2000) pp. 221-238; Elsevier Science S.A.

Related U.S. Appl. No. 13/799,819, filed Mar. 13, 2013.

Related U.S. Appl. No. 13/837,782, filed Mar. 15, 2013.

Shajulin Benedict and V. Vasudevan, "Scheduling of Scientific Workflows Using Niched Pareto GA for Grids"; 2006, IEEE pp. 908-912.

David A. Van Veldhuizen et al., "(Final Draft) TR-98-03 Multiobjective Evolutionary Algorithm Research: A History and Analysis" Oct. 14, 1998; pp. 1-30.

Jeffrey Horn, et al., "A Niched Pareto Genetic Algorithm for Multiobjective Optimization" 1994; IEEE; pp. 82-87.

Mark Erickson et al.; Multi-objective Optimal of Groundwater Remediation Systems: Application of the Niced Pareto Genetic Algorithm (NPGA); Advances in Water Resources 25 (2002); pp. 51-65.

* cited by examiner

```
OBJECTIVES (
  NAME    car_objectives ;

OBJECTIVE (
    OBJ_NUM         0;
    TAG             cost;
    OPT_DIRECTION   MINIMIZE;
    SCALING_LIMITS  NO,(0.0,1.0);
    EPSILON_VALUE   10000.0;
  );

OBJECTIVE (
    OBJ_NUM         1;
    TAG             features;
    OPT_DIRECTION   MAXIMIZE;
    SCALING_LIMITS  NO,(0.0,1.0);
    EPSILON_VALUE   10000.0;
  );
```

```
FUNCTIONS(
  NAME  car_functions;

FUNC_INFEASIBLE        car_infeasible;
  FUNC_OBJECTIVE         car_objective;

FUNC_PREPROCESS        car_preprocess;
  FUNC_POSTPROCESS       car_postprocess;
  FUNC_ENDOFGEN          car_endOfGen;
  FUNC_RUN_TERMINATION   car_runTermination;

FUNC_REPORT_VTK_LARGE  car_rpt_vtkLarge;
  FUNC_REPORT_VTK_SMALL  car_rpt_vtkSmall;

FUNC_REPORT_ENDOFGEN   car_rpt_all        ,ALL  ,NONDOM=NO ,FLUSH=YES;
  FUNC_REPORT_ENDOFGEN   car_rpt_allNondom  ,ALL  ,NONDOM=YES,FLUSH=YES;
  FUNC_REPORT_ENDOFGEN   car_rpt_final      ,FINAL,NONDOM=NO ,FLUSH=YES;
  FUNC_REPORT_ENDOFGEN   car_rpt_finalNondom,FINAL,NONDOM=YES,FLUSH=YES;
);
```

FIG. 13A

```
ARGUMENTS (
   NAME      car_arguments;
   ARGUMENT_REAL       TAG= defTolerance,VALUE =5.0;      #[mm]
   ARGUMENT_REAL       TAG= appliedForce,VALUE =5000.0;   #[N]

ARGUMENT_REAL       TAG=length    ,VALUE=78.0;
   ARGUMENT_INT        TAG=width     ,VALUE= 30;
   ARGUMENT_INT        TAG=height    ,VALUE= 60;
   ARGUMENT_BOOL       TAG= bool     ,VALUE=YES;
   ARGUMENT_CHAR       TAG=char      ,VALUE=" myTextString and more ...";
   ARGUMENT_PAIR_REAL  TAG= pairDou  ,VALUE=7.27,3.45;
   ARGUMENT_PAIR_INT   TAG= pairInt  ,VALUE=6,3;
   ARGUMENT_ARRAY_REAL TAG= model_density
                       VALUE=(1.1,2.2,3.3,4.4,5.5,6.6,7.7,8.8,9. 9);
   ARGUMENT_ARRAY_INT  TAG= arrayInt,
                       VALUE=(1,2,3,4,5,6,7,8,9,10,11,12,13,14,1 5,16,
                              17,18,19,20,21,22,23,24,28,29,30,3 1,32);
   ARGUMENT_SPREAD     TAG=spread,
                       FILE=$LOCAL/data/ spread.csv,
                       COLUMNS=3,TYPE=REAL,HEADER=YES;
);
```

```
Genes (
  NAME   car_genes ;

GENE (
    INDEX  ASSIGN,NUM =20;
    TAG    myFloat ;
    LIMITS ( -300.0,300.0);
  );

GENE_INT (
    INDEX  ASSIGN,NUM =10;
    TAG    myInt ;
    LIMITS (20,30);
  );

GENE_GAUSSIAN  (
    INDEX  ASSIGN,NUM =20;
    TAG    myGaus ;
    LIMITS ( -300.0,300.0);
  );

RANDOM_SIGMAS   (
     LOW_MIN   =    1.0;  LOW_MAX   = 100.0;
     HIGH_MIN  =  150.0;  HIGH_MAX  = 200.0;
  );

GENE_MATRIX   TAG= myCar, car_gene_matrix
);
```

FIG. 15A

```
GENE_MATRIX (
 NAME car_gene_matrix
 ROW ONOFF=NO,TAG=aaa,  (A0*A1; 100.0; EVOLVE_GAUS, 4; (B0+C0)^C1; myFunc0 (A0, A1));

ROW ONOFF=YES,TAG=car1, (EVOLVE,0; 1.0; EVOLVE_INT,0; myFunc0; 5.0); #car1
 ROW ONOFF=YES,TAG=car2, (EVOLVE,0; 1.0; EVOLVE_INT,1; myFunc0; 6.0); #car2
 ROW ONOFF=YES,TAG=car3, (EVOLVE,0; 2.0; EVOLVE_INT,2; myFunc1; 7.0); #car3
 ROW ONOFF=YES,TAG=car4, (EVOLVE,0; 2.0; EVOLVE_INT,3; myFunc2; 8.0); #car4

LIMITS    COL=A,(0.0,1.0);

LIMITS    COL=C,(100,200);

GENE_MATRIX TAG=xxx, car_gene_matrix2;
 GENE_MATRIX TAG=yyy, car_gene_matrix3;
 );
```

FIG. 15C

```
OUTPUT (
    NAME   car_output;
    GEN_OUTPUT_CHECK_POINT            YES,MODULO_FREQ_HOURS=0.1;
    GEN_OUTPUT_ALL_POPS               YES,MODULO_FREQ=1;
    GEN_OUTPUT_ALL_NON_DOMINATED      YES,MODULO_FREQ=1;
    GEN_OUTPUT_FINAL_POP              YES;
    GEN_OUTPUT_FINAL_NON_DOMINATED    YES;
    GEN_OUTPUT_STATS_METRICS          YES,MODULO_FREQ=1;
    GEN_OUTPUT_PARAMS                 YES;
    GEN_OUTPUT_VISUAL_TOOLKIT         YES,SMALL,MODULO_FREQ=1;
    TIMERS_RPT                        YES,MODULO_FREQ=100;
);
```

FIG. 16A

```
SETTINGS (
  NAME  car_settings;

POP_SIZE_INITIAL              4;
  POP_SIZE_MINIMUM              8;
  POP_SIZE_MAXIMUM              4000;
  POP_SCALING_FACTOR            0.25;
  MAX_GENERATIONS_PER_RUN       100;
  MAX_GENERATIONS_RUN_ZERO      1;

JOB_TERMINATION_CRITERIA (
    MAX_FUNCTION_EVALUATIONS   NO ,NFE=1000,CUMULATIVE=1000;
    MAX_ELAPSED_TIME           YES,HOURS=1000.0,CUMULATIVE=1024.0;
    BOX_FITNESS_STABLIZATION   YES,LAG_WINDOW=20,PCT_UNCHANGED=90,NUM_TIMES=20;
  );

INFEASIBLE_OPTIMIZATION   YES,(
    RANDOM_POPSIZE   100;
    RANDOM_RETRY      10;
    RANDOM_ITER     2500;
    CROSSOVER_ITER 2500;
  );

NUM_CONSTRAINTS               2;
  REAL_CROSSOVER_PROBABILITY    0.9;
  REAL_MUTATION_PROBABILITY     0.05;
  DISTRIBUTION_INDEX_CROSSOVER  15.0;
  DISTRIBUTION_INDEX_MUTATION   20.0;
  RUN_TERM_CRITERIA             YES,DELTA=10;

LAG_WINDOW_INITIAL            250;
  LAG_WINDOW_INIT_NUM_GENS      1;
  LAG_WINDOW_FINAL              20;
);
```

FIG. 17A

```
PLUGIN (
    LIBRARY              $GRIPSHome/lib/libextraRevisit;
    FUNC_PREPROCESS      preprocess_extra;
    FUNC_POSTPROCESS     postprocess_extra;
    FUNC_PARSE_KEYWORDS  parseRevisitc_keywords_extra;
    FUNC_GENTAB_KEY      genTabKeyRev_extra;

ARGUMENT_REAL        TAG=inArg0   ,VALUE=7800.0;
    ARGUMENT_INT         TAG=inArg1   ,VALUE=  30;
);
```

```
PROGRAM (
    NAME                car_2_objectives;
    PROG_TYPE           ENSGA2;
    RESULTS_DIRECTORY   USE_PROGRAM_NAME;
    FUNCTIONS           car_functions;
    OUTPUT              car_output;
    GENES               car_genes;
    OBJECTIVES          car_objectives;
    SETTINGS            car_settings;
    ARGUMENTS           car_arguments;
);
```

FIG. 19A

```
OBJECTIVES (
    NAME                        coverage_objectives;  ◄──────── 2002
    OBJECTIVE (
    OBJ_NUM                     0;
    TAG                         avg_revisit_time
    OPT_DIRECTION               MINIMIZE;
    SCALING_LIMITS              NO,(0.0,10.0);
    EPSILON_VALUE               0.0075;

OBJECTIVE (
    OBJ_NUM                     1;
    TAG                         max_revisit_time
    OPT_DIRECTION               MAXIMIZE;
    SCALING_LIMITS              NO,(0.0,10.0);
    EPSILON_VALUE               0.0075;
    );
);

FUNCTIONS (                                           ◄──────── 2004
    NAME                        functions1;
    FUNC_OBJECTIVE              Revisit_objectives;
    FUNC_PREPROCESS             Revisit_preprocess;
);

ARGUMENTS (                                           ◄──────── 2006
    NAME  arguments0;
    ARGUMENT_REAL               TAG=minEl,VALUE=5.0;
    ARGUMENT_ARRAY_REAL         TAG=latGrid,VALUE=(50.0,60.0,70.0, 80.0);
    ARGUMENT_REAL               TAG=longitude,VALUE=(0.0);
    ...
);
```

FIG. 20A

```
GENES (                                         ◄──────── 2008
   NAME constellation;
   GENE_MATRIX constellation_gene_matrix
);

GENE_MATRIX(                                    ◄──────── 2010
NAME constellation_gene_matrix ROW, TAG=satellite1, ONOFF=YES,(4043.918; 0.0; EVOLVE,0; 0.0; 0.0; 0.0);
ROW, TAG=satellite2, ONOFF=YES,(4033.770; 0.0; EVOLVE,0; EVOLVE,0; 0.0; EVOLVE,0);
ROW, TAG=satellite3, ONOFF=YES,(4053.880; 0.0; EVOLVE,0; EVOLVE,1; 0.0; EVOLVE,1);

LIMITS COL=C,(0.0,180.0);
LIMITS COL=D,(0.0,360.0);
LIMITS COL=F,(0.0,360.0);

);

OUTPUT (                                        ◄──────── 2012
    NAME output1;
    GEN_OUTPUT_CHECK_POINT          YES,MODULO_FREQ_HOURS=0.1;
    GEN_OUTPUT_ALL_POPS             NO ,MODULO_FREQ=1;
    GEN_OUTPUT_ALL_NON_DOMINATED    YES,MODULO_FREQ=1;
    GEN_OUTPUT_FINAL_POP            YES;
    GEN_OUTPUT_FINAL_NON_DOMINATED  YES;
    GEN_OUTPUT_STATS_METRICS        YES,MODULO_FREQ=1;
    GEN_OUTPUT_RAND_SEED            YES;
    GEN_OUTPUT_PARAMS               YES;
    GEN_OUTPUT_VISUAL_TOOLKIT       YES,BOTH,MODULO_FREQ=10;
    TIMERS_RPT                      YES,MODULO_FREQ=10;
    LIFE_SIGN                       YES,MODULO_FREQ=1;
```

FIG. 20B

```
SETTINGS (                                    ◄────── 2014
    NAME                            settings1;
    RANDOM_SEED_ANALYSIS            RANDOMIZE = YES,START=1,STOP=1;
    POP_SIZE_INITIAL                100;
    POP_SIZE_MINIMUM                100;
    POP_SIZE_MAXIMUM                20000;
    POP_SCALING_FACTOR              0.25;
    MAX_GENERATIONS_PER_RUN         100;
    JOB_TERMINATION_CRITERIA (
    MAX_FUNCTION_EVALUATIONS        NO ,NFE=1000,CUMULATIVE=1000;
    MAX_ELAPSED_TIME                NO,HOURS=1000.0,CUMULATIVE=1024.0;
    BOX_FITNESS_STABLIZATION        YES
,LAG_WINDOW=20,PCT_UNCHANGED=90,NUM_TIMES=20;
    );
    REAL_CROSSOVER_PROBABILITY      0.9;
    REAL_MUTATION_PROBABILITY       0.05;
    DISTRIBUTION_INDEX_CROSSOVER    15.0;
    DISTRIBUTION_INDEX_MUTATION     20.0;
    RUN_TERM_CRITERIA               YES,DELTA=10;
    LAG_WINDOW_INITIAL              250;
    LAG_WINDOW_INIT_NUM_GENS        1;
    LAG_WINDOW_FINAL                20;
);
```

FIG. 20C

```
PROGRAM (
    NAME                    constellation_2obj;
    PROG_TYPE               ENSGA2;
    MASTER_SLAVE_SPEEDUP    YES;
    RESULTS_DIRECTORY       USE_PROGRAM_NAME;
    FUNCTIONS               functions1;
    OUTPUT                  output1;
    GENES                   genesGauss;
    OBJECTIVES              coverage_objectives;
    SETTINGS                settings1;
    ARGUMENTS               arguments0;
);
```

```
OBJECTIVES (
  NAME                scheduling_objectives;   ← 2202
  OBJECTIVE (
    OBJ_NUM           0;
    TAG               cost;
    OPT_DIRECTION     MINIMIZE;
    SCALING_LIMITS    NO,(0.0,1.0);
    EPSILON_VALUE     10000.0;
  );
  OBJECTIVE (
    OBJ_NUM           1;
    TAG               revenue;
    OPT_DIRECTION     MAXIMIZE;
    SCALING_LIMITS    NO,(0.0,1.0);
    EPSILON_VALUE     10000.0;
  );
  OBJECTIVE (
    OBJ_NUM           2;
    TAG               legsChanged;
    OPT_DIRECTION     MINIMIZE;
    SCALING_LIMITS    NO,(0.0,1.0);
    EPSILON_VALUE     1.0;
  );
);

FUNCTIONS (                                     ← 2204
  NAME      functions1;
  FUNC_OBJECTIVE  airl_funcEval;
  FUNC_INFEASIBLE airl_infeasible;
  FUNC_PREPROCESS airl_preprocess;
);

ARGUMENTS (                                     ← 2206
  NAME arguments0;
  ARGUMENT_CHAR   TAG=scenarioFname,VALUE="Scenario/qsi090302";
);
```

FIG. 22A

```
GENES (                                            ← 2208
  NAME genesGauss;
  SCALING_LIMITS_INTERNAL NO,(0.0,1.0);
  RANDOM_SIGMAS (
    LOW_MIN  =   1.0;
    LOW_MAX  = 180.0;
    HIGH_MIN = 200.0;
    HIGH_MAX = 200.0;
  );
  GENE_GAUSSIAN (
    INDEX ASSIGN,NUM=391;
    TAG   delta;
    LIMITS (-120.0,120.0);     );
);
```

```
OUTPUT (                                           ← 2212
  NAME output1;
  GEN_OUTPUT_CHECK_POINT            YES,MODULO_FREQ_HOURS=0.1;
  GEN_OUTPUT_ALL_POPS               NO ,MODULO_FREQ=1;
  GEN_OUTPUT_ALL_NON_DOMINATED      YES,MODULO_FREQ=1;
  GEN_OUTPUT_FINAL_POP              YES;
  GEN_OUTPUT_FINAL_NON_DOMINATED    YES;
  GEN_OUTPUT_STATS_METRICS          YES,MODULO_FREQ=1;
  GEN_OUTPUT_RAND_SEED              YES;
  GEN_OUTPUT_PARAMS                 YES;
  GEN_OUTPUT_VISUAL_TOOLKIT         YES,BOTH,MODULO_FREQ=10;
  TIMERS_RPT                        YES,MODULO_FREQ=10;
  LIFE_SIGN                         YES,MODULO_FREQ=1;
);
```

FIG. 22B

```
SETTINGS (
  NAME settings1;
  RANDOM_SEED_ANALYSIS              RANDOMIZE = YES,START=1,STOP=1;   ──── 2214
  POP_SIZE_INITIAL                  10000;
  POP_SIZE_MINIMUM                  100;
  POP_SIZE_MAXIMUM                  20000;
  POP_SCALING_FACTOR                0.25;
  MAX_GENERATIONS_PER_RUN           100;
  JOB_TERMINATION_CRITERIA          (
  MAX_FUNCTION_EVALUATIONS            NO,NFE=1000,CUMULATIVE=1000;
  MAX_ELAPSED_TIME                    NO,HOURS=1000.0,CUMULATIVE=1024.0;
  BOX_FITNESS_STABLIZATION            YES
,LAG_WINDOW=20,PCT_UNCHANGED=90,NUM_TIMES=20;
  );
  INFEASIBLE_OPTIMIZATION YES,      (
  RANDOM_POPSIZE=100,
  RANDOM_ITER=2500,
  CROSSOVER_ITER=2500;
  );
  NUM_CONSTRAINTS                   2;
  REAL_CROSSOVER_PROBABILITY        0.9;
  REAL_MUTATION_PROBABILITY             0.05;
  DISTRIBUTION_INDEX_CROSSOVER      15.0;
  DISTRIBUTION_INDEX_MUTATION       20.0;
  RUN_TERM_CRITERIA                 YES,DELTA=10;
  LAG_WINDOW_INITIAL                250;
  LAG_WINDOW_INIT_NUM_GENS          1;
  LAG_WINDOW_FINAL                  20;
);
```

```
PROGRAM (
   NAME                    airline_3obj;
   PROG_TYPE               ENSGA2;
   MASTER_SLAVE_SPEEDUP    YES;
   RESULTS_DIRECTORY       USE_PROGRAM_NAME;
   FUNCTIONS               functions1;
   OUTPUT                  output1;
   GENES                   genesGauss;
   OBJECTIVES              scheduling_objectives;
   SETTINGS                settings1;
   ARGUMENTS               arguments0;
);
```

FIG. 22D

SYSTEMS AND METHODS FOR BOX FITNESS TERMINATION OF A JOB OF AN EVOLUTIONARY SOFTWARE PROGRAM

RELATED APPLICATION

The present application claims priority to U.S. Provisional Application Ser. No. 61/178,806, filed on May 15, 2009, and entitled "Systems and Methods for Utilizing Genetic Resources for Innovation and Problem Solving," which is hereby incorporated by reference in its entirety as if fully set forth herein.

FIELD OF THE INVENTION

Aspects of the invention related generally to evolutionary algorithms and other genetic resources, and more particularly to systems and methods for utilizing evolutionary algorithms and other genetic resources to produce designs for multi-objective optimization problems.

BACKGROUND OF THE INVENTION

The goal of multiple-objective optimization, in stark contrast to the single-objective case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is nondominated. A solution is considered to be nondominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff. Classical multiple-objective optimization techniques are advantageous if the decision maker has some a priori knowledge of the relative importance of each objective. Because classical methods reduce the multiple-objective problem to a single objective, convergence proofs exist assuming traditional techniques are employed. Despite these advantages, real-world problems, such as satellite constellation design optimization and airline network scheduling optimization, challenge the effectiveness of classical methods. When faced with a discontinuous and/or nonconvex objective space, not all Pareto-optimal solutions may be found. Additionally, the shape of the front may not be known. These methods also limit discovery in the feasible solution space by requiring the decision maker apply some sort of higher-level information before the optimization is performed. Furthermore, only one Pareto-optimal solution may be found with one run of a classical algorithm.

SUMMARY OF THE INVENTION

According to an example embodiment of the invention, there is a method. The method may include receiving, by a master processor, a respective plurality of objective function values for each chromosome data structure of a population of chromosome data structures, where the respective plurality of objective function values are obtained based upon an evaluation of each chromosome data structure by a respective plurality of objective functions; mapping, by the master processor for each chromosome data structure, the respective objective function values to respective epsilon values, where the respective epsilon values define a respective address associated with the plurality of objective functions; and performing, by the master processor, non-domination sorting of the population of chromosome data structures to generate a reduced population of chromosome data structures based upon an evaluation of the respective plurality of objective function values; and performing, by the master processor, epsilon non-dominated sorting according to an optimization of the plurality of objective functions and the defined respective addresses to identify an elite set of addresses, where the prior steps are performed for a current generation, where the elite set of addresses are compared to a prior elite set of addresses for a predetermined number of prior generations to determine one or more variance values, where the one or more variance values are utilized to determine whether a current job of an evolutionary algorithm is to be halted.

According to an example embodiment of the invention, there is a system. The system may include a memory that stores computer-executable instructions; a master processor configured to access the memory, wherein the master processor is further configured to execute the computer-executable instructions to receive a respective plurality of objective function values for each chromosome data structure of a population of chromosome data structures, where the respective plurality of objective function values are obtained based upon an evaluation of each chromosome data structure by a respective plurality of objective functions; map, for each chromosome data structure, the respective objective function values to respective epsilon values, wherein the respective epsilon values define a respective address associated with the plurality of objective functions; and perform non-domination sorting of the population of chromosome data structures to generate a reduced population of chromosome data structures based upon an evaluation of the respective plurality of objective function values; and perform epsilon non-dominated sorting according to an optimization of the plurality of objective functions and the defined respective addresses to identify an elite set of addresses, where the prior steps are performed for a current generation, where the elite set of addresses are compared to a prior elite set of addresses for a predetermined number of prior generations to determine one or more variance values, where the one or more variance values are utilized to determine whether a current job of an evolutionary algorithm is to be halted.

BRIEF DESCRIPTION OF THE DRAWINGS

Reference will now be made to the accompanying drawings, which are not necessarily drawn to scale, and wherein:

FIG. 12A illustrates an example input file text for implementing an example objectives block, according to an example embodiment of the invention.

FIG. 13A illustrates an example input file text for implementing an example functions block, according to an example embodiment of the invention.

FIG. 14A illustrates an example input file text for implementing an example arguments block, according to an example embodiment of the invention.

FIG. 15A illustrates an example input file text for implementing an example genes block, according to an example embodiment of the invention.

FIG. 15C illustrates an example input file text for implementing an example matrix gene, according to an example embodiment of the invention.

FIG. 16A illustrates an example input file text for implementing an example output block, according to an example embodiment of the invention.

FIG. 17A illustrates an example input file text for implementing an example settings block, according to an example embodiment of the invention.

FIG. 18A illustrates an example input file text for implementing an example plug-in block, according to an example embodiment of the invention.

FIG. 19A illustrates an example input file text for implementing an example program block, according to an example embodiment of the invention.

FIGS. 20A-20D illustrate an example implementation of an API for the evolutionary software program that is utilized for an example satellite constellation optimization.

FIGS. 22A-D illustrate an example implementation of an API for the evolutionary software program that is utilized for an example airline network schedule optimization.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

I. Core Management System

Figure 1A:
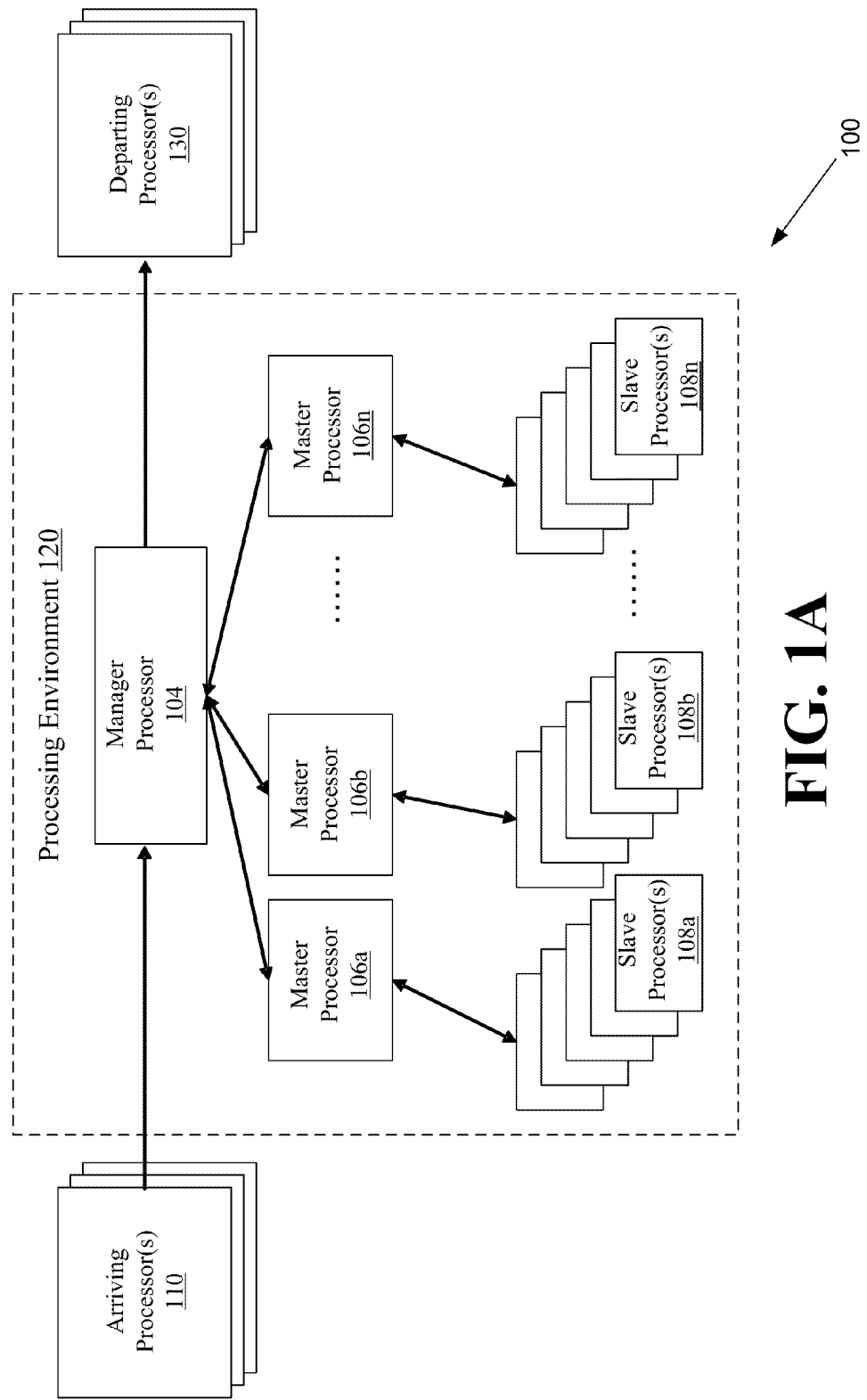
FIG. 1A illustrates an example core management system that supports parallel processing utilized for one or more evolutionary algorithms associated with multi-objective optimization, as described herein, according to an example embodiment of the invention.

FIG. 1A illustrates an example core management system 100 that supports parallel processing utilized for one or more evolutionary algorithms associated with multi-objective optimization, as described herein, according to an example embodiment of the invention. As shown in FIG. 1A, there may be a processing environment 120 in which processing associated with one or more evolutionary algorithms is managed and performed. The processing environment may include one or more manager processor computers 104 (also referred to as "manager processors"), master processor computers 106*a-n* (also referred to as "master processors"), and slave processor computers 108*a-n* (also referred to as "slave processors").

The manager processor 104 may be operative to dynamically configure and reconfigure the processing environment 120. In general, the manager processor 104 may make a dynamic determination of how many master processors 106*a-n* are needed, and how many slave processor(s) 108*a-n* are needed for each master processor 106*a-n*. The determination of the number of slave processor(s) 108*a-n* per master processor 106*a-n* can be based upon a master calibration algorithm, as will be discussed in further detail herein.

During initial set-up or configuration of the processing environment 120, the manager processor 120 may identify a number of available arriving processor(s) 110 having processing capacity. These arriving processor(s) 110 may be available for utilization, perhaps as a result of another application processing being completed. The manager processor 104 may configure one or more of the arriving processor(s) 110 as master processors 106a-n. Each master processor 106a-n may be responsible for one or more operations associated with a particular portion of the evolutionary algorithm. The manager processor 104 may also configure and assign one or more of the arriving processor(s) 110 as the respective one or more slave processors 108a-n of the respective master processor 106a-n. The slave processors 108a-n may likewise carry out one or more operations as instructed by the respective master processor 106a-n.

Subsequent to the initial-setup or configuration, the manager processor 104 may also be operative to dynamically reconfigure the processing environment 120. As an example of such reconfiguration, additional arriving processor(s) 110 may be identified by the manager processor 104 as being available while the processing environment 120 is in operation. Accordingly, the manager processor 104 may assign roles to the additional arriving processor(s) 110. For example, an additional arriving processor 110 may be assigned to a role as a manager processor 104, a master processor 106a-n, or a slave processor(s) 108a-n. On the other hand, one or more master processors 106a-n or slave processor(s) 108a-n in the processing environment 120 may become exhausted (e.g., allocated processing time has been reached), and may need to be removed from the processing environment 120 as a departing processor(s) 130. The departing processor(s) 130 may be a manager processor 104, a master processor 106a-n, or a slave processor 108a-n that has experienced a processing failure or that has otherwise been requested by a higher priority application.

In an example embodiment of the invention, a manager processor 104 that is exhausted may remove itself from the processing environment 120. The departing manager processor 104 may be operative to nominate its replacement, perhaps from an arriving processor 110, an existing master processor 106a-n, or an existing slave processor 108a-n. According to another example embodiment, a master processor 106a-n that is exhausted may need to be removed from the processing environment 120. The removed master processor 106a-n may likewise nominate its replacement, perhaps from another master processor 106a-n or an existing slave processor 108a-n. Alternatively, the manager processor 104 may determine the replacement for the removed master processor 106a-n. In addition, a slave processor(s) 108a-n that is exhausted may need to be removed from the processing environment 120, according to an example embodiment of the invention. The master processor 106a-n may replace the removed slave processor(s) 108a-n with an arriving processor(s) 110 when possible and needed, according to an example embodiment of the invention. The master processor 106a-n may inform the manager processor 104 of the removal of a slave processor(s) 108a-n and/or its replacement.

As introduced above, the manager processor 104 may determine the number of master processors 106a-n needed, and/or the number of slave processor(s) 108a-n needed per master processor 106a-n in accordance with an example master calibration algorithm. It will be appreciated that a manager processor 104 may utilize an example master calibration algorithm in a variety of instances, e.g., based upon arriving processor(s) 110 or departing processor(s) 130, or when one or more master processor processors 106a-n report that it has too many or too few slave processors(s) 108a-n.

In an example embodiment of the invention, a goal of a master processor 106a-n may be to keep the associated slave processors 108a-n fed with work as efficiently as possible. When a slave processor 108a-n requests work from the master processor 106a-n (e.g., sends a packet with results from evaluating the previously received chromosome data structure), the master processor 106a-n is most efficient in responding to the slave processor 108a-n when it is waiting for the packet (e.g., the master processor 106a-n is not busy doing other things).

Figure 1B:
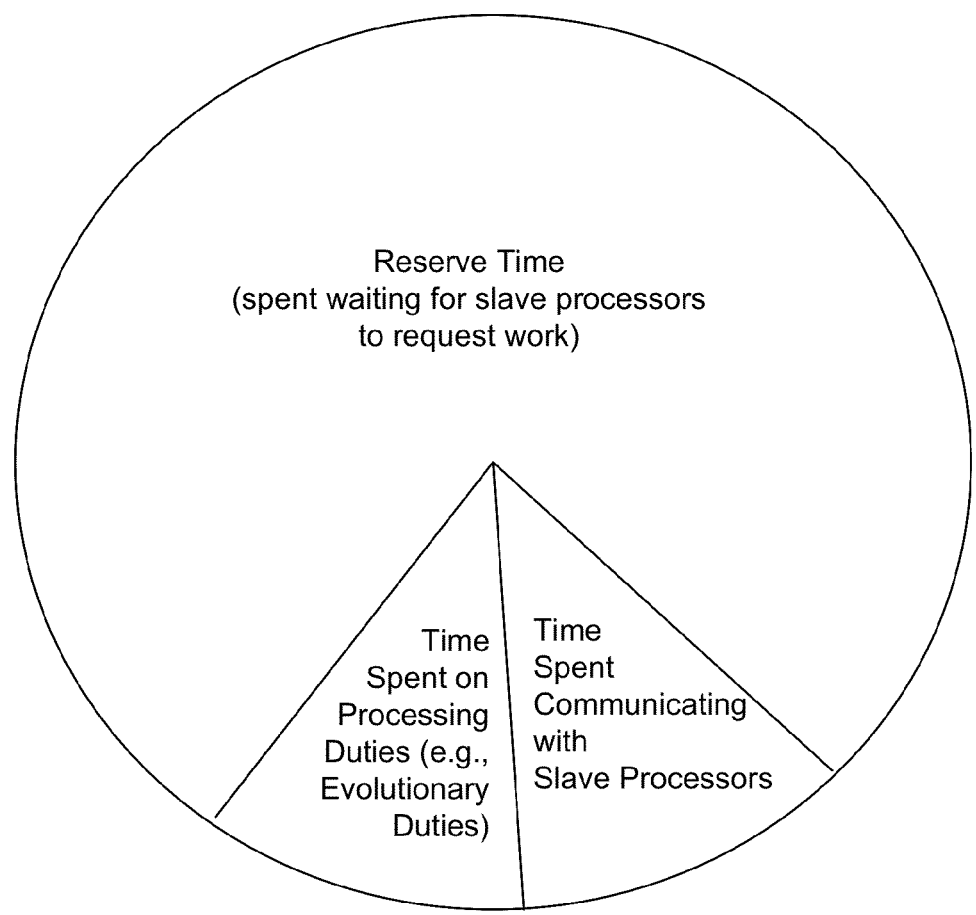
FIG. 1B illustrates an example master processor timing chart, according to an example embodiment of the invention.

As shown by the master processor timing chart in FIG. 1B, the "Reserve Time" is the time that the master processor 106a-n is waiting for work. If there is too much Reserve Time, then the master processor 106a-n has capacity to handle more slave processors 108a-n. As the number of slave processors 108a-n increases for a particular master processor 106a-n, the total time spent by a master processor 106a-n performing processing (e.g., evolutionary duties) increases, as does the total time spent communicating with slave processors 108a-n. Therefore, the master calibration algorithm may use the current timing data to estimate how many slave processors 106a-n would bring the Reserve Time into compliance with a Reserve_Time_Percentage threshold, as described below.

For purposes of utilizing the master calibration algorithm, each master processor 106a-n may maintain timing data associated with available processing resources at the master processor 106a-n. In an example embodiment of the invention, the timing data maintained by each master processor 106a-n may include the following data:

A total elapsed time in which the particular master processor 106a-n has been in operation (Total_Elapsed_Time);

A total time that the particular master processor 106a-n spends communicating with associated slave processor(s) 108a-n to send work and receive results (Total_Time_Communicating_with_Slaves); and A total time spent by a master processor 106a-n performing processing (e.g., evolutionary duties or operations) in accordance with one or more evolutionary algorithms (Total_Time_Spent_Performing_Processing_Duties).

Using the timing data, the manager processor 104 or each master processor 106a-n may be able to calculate a target number of slave processor(s) 108a-n that it can handle in accordance with the master calibration algorithm. In an example embodiment of the invention, the target number of slave processor(s) 108a-n ("Target_Number_of_Slaves") for a particular master processor 106a-n can be determined according to the following calculations:

Target_Reserve_Time=Reserve_Time_Percentage* Total_Elapsed_Time. In an example embodiment of the invention, the Reserve_Time_Percentage may be set between 10% (0.10)-20% (0.20), perhaps at 15% (0.15), so that the particular master processor 106a-n may retain some reserve processing capability. However, it will be appreciated that other values may be utilized for the Reserve_Time_Percentage without departing from example embodiments of the invention.

Average_Time_Communicating_With_Slaves=Total_Time_Communicating_with_Slaves/Number_Chromosomes_processed, where the Number_Chromosomes_processed represents the number of chromosomes processed within the Total_Elapsed_Time.

Average_Time_Spent_On_Processing_Duties=Total_Time_Spent_Performing_Processing_Duties/Number_Chromosomes_processed.

Target_Number_of_Slaves=((Total_Elapsed_Time−Target_Reserve_Time)/(Average_Time_Communicating_with_ Slaves+Average_ Time_Spent_On_Processing_Duties))*(Current_Number_of_Slaves/Number_Chromosomes_processed), where the Current_Number_of_Slaves represents the current number of slave processor(s) 108*a-n* assigned to the particular master processor 106*a-n*.

If any master processor 106*a-n* does not have the calculated Target_Number_of_Slaves, then an example reallocation algorithm may be invoked by the manager processor 104. An example reallocation algorithm may initiate with a manager processor 104 requesting that each master processor 106*a-n* provide the manager processor 104 with its respective calculated Target_Number_of_Slaves and its respective actual number of slave processor(s) 108*a-n* that has been assigned to the respective master processor 106*a-n*. The manager processor 104 may then determine whether any master processor 106*a-n* is underweighted or overweighted with respect to calculated Target_Number_of_Slaves. In particular, a master processor 106*a-n* is underweighted with respect to slave processor(s) 108*a-n* if the actual number of slave processor(s) 108*a-n* is less than the calculated Target_Number_of_Slaves. Likewise, a master processor 106*a-n* is overweighted with respect to slave processor(s) 108*a-n* if the actual number of slave processors is more than the calculated Target_Number_of_Slaves.

If one or more master processors 106*a-n* are overweighted with respect to the calculated Target_Number_of_Slaves, then slave processor(s) 108*a-n* associated with the overweighted master processors 106*a-n* may be reallocated to underweighted master processors 106*a-n*. Likewise, underweighted master processors 106*a-n* may also be provided one or more arriving processor(s) 110 for use as slave processors(s) 108*a-n*. Once all the master processors 106*a-n* meet their respective Target_Number_of_Slaves, then the manager processor 104 may designate a portion of any remaining arriving processor(s) 110 as new master processors 106*a-n*, where each new master processor 106*a-n* receives a default number of arriving processor(s) 110 for use as slave processor(s) 108*a-n*.

It will be appreciated that the processing environment 120 described herein may accommodate a large number of processors. Indeed, the processing environment may easily utilize over 25,000 processors without any significant loss in processing efficiency, according to an example embodiment of the invention.

Figure 1C:
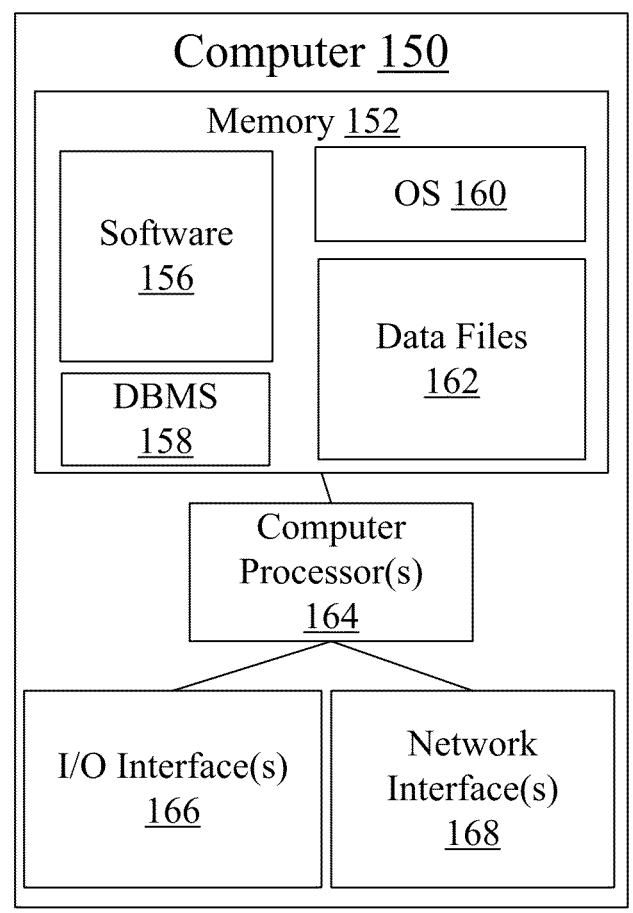
FIG. 1C illustrates an example computer for implementing one or more of the processors in FIG. 1A, according to an example embodiment of the invention.

The processors described in FIG. 1A, including the processors 104, 106*a-n*, 108*a-n*, 110, and 130, may implemented using the computer 150, or a variation thereof, illustrated in FIG. 1C. The computer 150 may be any processor-driven device, such as, but not limited to, a personal computer, laptop computer, server computer, cluster computer, and the like. In addition to having one or more computer processor(s) 164, the computer 150 may further include a memory 152, input/output ("I/O") interface(s) 166, and network interface(s) 168. The memory 152 may be any computer-readable medium, coupled to the computer processor(s) 164, such as RAM, ROM, and/or a removable storage device for storing data files 162 and a database management system ("DBMS") 158 to facilitate management of data files 162 and other data stored in the memory 152 and/or stored in separate databases. The memory 152 may also store various program modules, such as an operating system ("OS") 160 and software 156. The software 156 may comprise one or more software programs for managing, configuring, or performing one or more operations of an evolutionary algorithm, according to an example embodiment of the invention.

The I/O interface(s) 166 may facilitate communication between the computer processor(s) 164 and various I/O devices, such as a keyboard, mouse, printer, microphone, speaker, monitor, bar code readers/scanners, RFID readers, and the like. Likewise, the network interface(s) described herein may take any of a number of forms, such as a network interface card, a modem, a wireless network card, and the like.

Numerous other operating environments, system architectures, and device configurations are possible, beyond those illustrated in FIGS. 1A and 1C. Other system embodiments can include fewer or greater numbers of components and may incorporate some or all of the functionality described with respect to FIGS. 1A and 1C. Accordingly, embodiments of the invention should not be construed as being limited to any particular operating environment, system architecture, or device configuration.

II. Parallel Processing Optimization without Infeasible Space Management

A. System Overview

Figure 2:
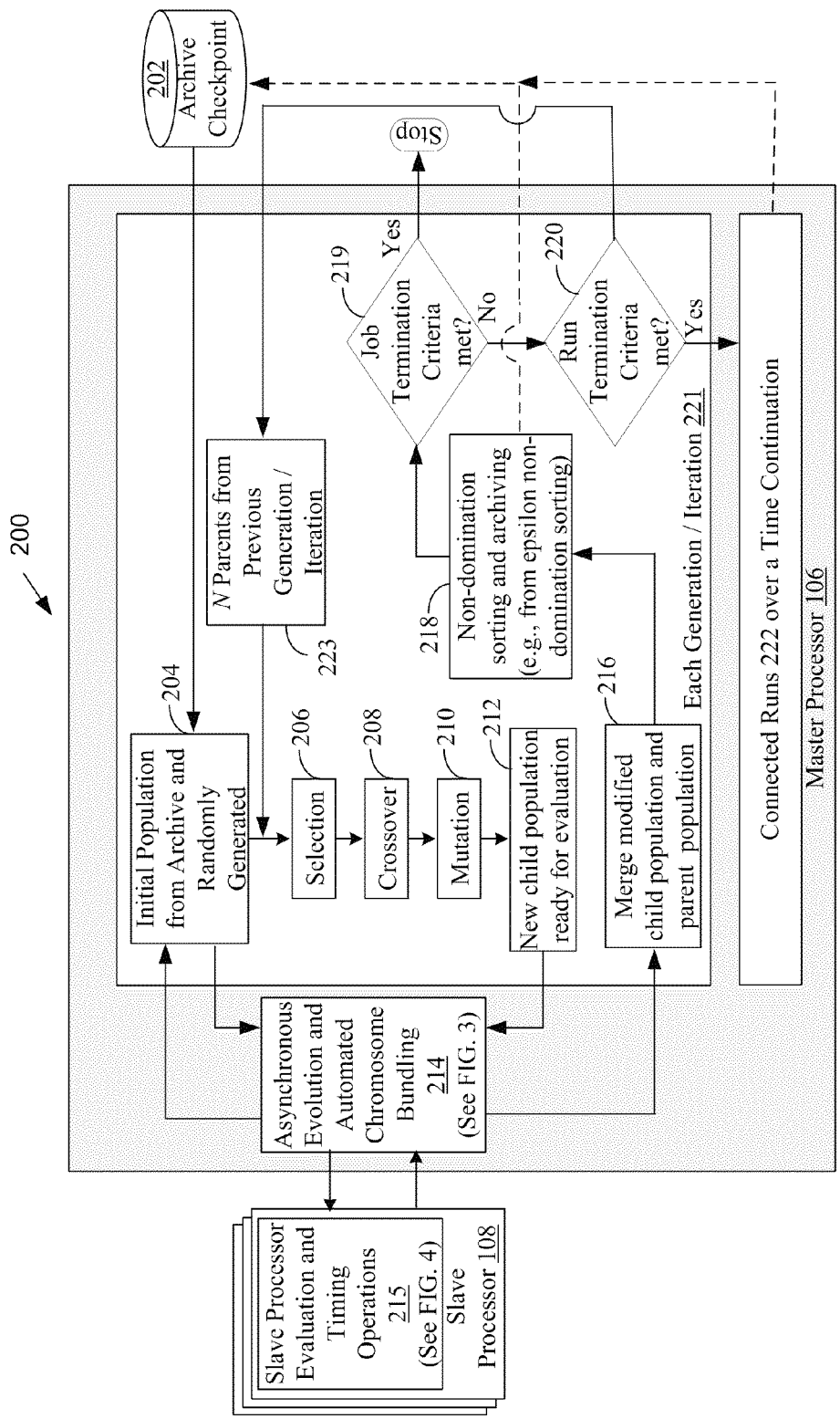
FIG. 2 illustrates an example parallel processing system that executes an evolutionary algorithm without infeasible space management, according to an example embodiment of the invention.

FIG. 2 illustrates an example parallel processing system 200 that executes an evolutionary algorithm without infeasible space management, according to an example embodiment of the invention. As shown in FIG. 2, a first portion of the evolutionary algorithm may be performed by a master processor 106 while a second portion of the evolutionary algorithm may be performed by one or more slave processors 108, as discussed herein.

In an example embodiment of the invention, an executed job of the evolutionary algorithm may comprise a plurality of connected runs 222 that occur in a sequence to form a time continuation. Each run 222 may comprise one or more evolutionary operations performed during one or more generations/iterations 221. It will be appreciated that a run may be connected to a prior run in that at least some of the same parents are shared in the "initial population" utilized for initiating respective runs, according to an example embodiment of the invention.

Example processing by an executed job of the evolutionary algorithm will now be discussed in further detail. Referring now to block 204, the master processor 106 may receive or obtain an initial population of parent chromosome data structures. In an example embodiment of the invention, each parent chromosome data structure may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Still referring to block 204, the initial population of parent chromosome data structures may be obtained by one or more sources. In an example embodiment of the invention, the initial population of parent chromosome data structures may be obtained from a combination of the archive checkpoint 202 and random generation of new chromosome data structures. For example, 25% of the initial population of parent chromosome data structures may be obtained from the archive checkpoint 202 while 75% of the initial population may be randomly generated. The chromosomes obtained from the archive checkpoint 202 may have previously been evaluated in accordance with the objective functions. On the other hand, the randomly generated chromosomes may not have been evaluated in accordance with the objective functions, and thus, they may be delivered to block 214, which allocates the chromosomes to the slave processors 108 for objective function evaluation by block 215.

The archive checkpoint 202 may include an elite set of chromosome data structures (i.e., elite solutions) obtained from one or more prior generations/iterations 221, according to an example embodiment of the invention. The archive checkpoint 202 may take the form of a data file or database stored in a computer memory, computer disk, network storage, or other non-volatile memory. As the archived chromosome data structures were previously evaluated in a prior generation/iteration 221, these chromosome data structures may be associated with a plurality of objective function values corresponding to a respective plurality of objective functions. Each objective function may be associated with any predefined objective to be optimized by the executed job of the evolutionary algorithm. For example, in a satellite constellation coverage optimization, an objective function may be associated with the objective of maximizing global coverage, and a corresponding objective function value may indicate which chromosome data structure (based upon the included chromosome and its respective genes) is able to achieve the greatest amount of global coverage.

Alternatively, in block 204, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 214, which allocates the chromosomes to the slave processors 108 for objective function evaluation by block 215. Once the objective function evaluations evaluation in block 215 have been completed, and the objective function values have been received in block 214, then each of the randomly generated parent chromosome data structures may be associated with a respective plurality of objective function values.

Having received or obtained the initial population of parent chromosome data structures in block 204, processing may then proceed to block 206. In block 206, the master processor 106 may select pairs of parent chromosome data structures from the input population of parent chromosome data structures. In an example embodiment of the invention, the selection of the pairs of parent chromosome data structures may occur according to a tournament selection process, which may include a crowded tournament selection process. An example tournament selection process in accordance with an example embodiment of the invention may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament.

Other measures of diversity may be used without departing from example embodiments of the invention. The winners of each tournament become the two parents resulting from the selection process of block 206. It will be appreciated that a predetermined number of pairs of parent chromosome data structures may be selected in block 206. It will also be appreciated that a particular parent chromosome data structure may be present in two or more selected pairs of parent chromosome data structures, according to an example embodiment of the invention.

Following block 206, the chromosomes in selected pairs of parent chromosome data structures may be subject to one or more evolutionary operators to generate a plurality of child chromosome data structures, according to an example embodiment of the invention. Two example evolutionary operators are illustrated by blocks 208 and 210. For example, block 208 illustrates a crossover evolutionary operator in which a portion of the parameter values or "gene" values may be exchanged between chromosomes in selected pairs of parent chromosome data structures to generate new pairs of chromosome data structures. In an example embodiment of the invention, the crossover evolutionary operation may be capable of performing crossover using integer or non-integer numbers (e.g., double precision numbers, etc.), binary representation of numbers, letters, and/or symbols. As another example, block 210 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the invention, only a portion or percentage of the received chromosomes in the chromosome data structures in blocks 208 and 210 may have their genes crossed-over or mutated, respectively. The respective portions or percentages that are crossed-over and/or mutated may be predetermined or dynamically varied during operation of the evolutionary algorithm, according to an example embodiment of the invention. For example, a first predetermined portion or percentage (e.g., 50%-80%) of the received chromosomes of the chromosome data structures may have genes that are crossed over in block 208 while a second predetermined portion or percentage (e.g., 1%-3%) of the received chromosomes of the chromosome data structures may have genes that are mutated in block 210. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 208 and 210 may be available without departing from example embodiments of the invention. Likewise blocks 208 and 210 may be performed in a different order than that shown in FIG. 2 or otherwise combined into a single block without departing from example embodiments of the invention.

By applying one or more evolutionary operators to the chromosomes of the selected pairs of parent chromosome data structures, a new population of child chromosome data structures may be obtained in block 212. Following block 212, processing may proceed to block 214. In block 214, the new population of child chromosome data structures may be received into a "To Evaluate" list or queue (see also FIG. 3, which illustrates block 214 in further detail). Block 214 may then allocate the chromosome data structures from the "To Evaluate" list or queue to the plurality of slave processors 108 according to an asynchronous evolution process. An automated chromosome bundling process, discussed in further detail with respect to FIG. 3, may also be utilized in block 214 to determine how many chromosome data structures should be included in a respective chromosome bundle for a respective slave processor 108. For example, a slave processor 108 with faster processing capability may receive a chromosome bundle with a larger number of chromosome data structures. Alternatively, the slave processor 108 may receive a fixed number of chromosome data structures in a chromosome bundle, but simply receive a larger number of chromosome bundles within a predetermined amount of time. The example automated chromosome bundling process may allow efficient allocation of chromosome data structures among the plurality of slave processors 108.

In block 215, each slave processor 108 may have received a chromosome bundle comprising one or more chromosome data structures from the master processor 106. The slave processors 108 may be homogenous or heterogeneous in processing capability. Each slave processor 108 may evaluate, in accordance with a plurality of objective functions, the received chromosome bundle of chromosome data structures to generate a plurality of respective objective function values for each chromosome data structure in block 215. In addition, each slave processor 108 may also perform timing operations or calculations, including determination of certain wait times and/or evaluation times associated with the respective slave processor 108, in block 215. As each slave processor 108 finishes the objective function evaluations and/or timing operations in block 215, the slave processor 108 may provide a results bundle (e.g., objective function values) and timing data (e.g., wait times and/or objective function evaluation times) to the master processor 106. The master processor 108 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 108. Indeed, the evolutionary process is asynchronous in that as soon as the "To Evaluate" list is empty for a given generation/iteration 221, the processing taking place in block 214 is completed, where the child population passed to block 216 is comprised of all of the chromosome data structures currently within the "Finished" list. It will be further appreciated that the results from some of the chromosome bundles previously sent to the various slave processors 108 may not have been received at the time the "To Evaluate" list is emptied. These may be referred to as late chromosome data structures from one or more prior generations/iterations.

In block 216, the master processor 106 receives a modified child population of chromosome data structures from the asynchronous evolution process of block 214. The modified child population may include different chromosome structures as well as a different number of chromosome data structures as compared to the child population of block 212. The received modified child population is merged with the current parent population, as illustrated by block 216. In block 218, the master processor 106 may perform non-domination sorting (e.g., based off of an epsilon vector) of the merged list of child and parent chromosome data structures to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, non-domination sorting in block 218 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the invention, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 202 or another archive of a computer memory or other data storage for subsequent retrieval.

Following processing in block 218, processing may proceed to block 219. In block 219, a determination is made as to whether the current job is completed such that the evolutionary algorithm should be terminated. A job typically comprises processing involving a plurality of connected runs 222, where each run 222 may include processing associated with one or more generations/iterations 221. Block 219 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria (see, e.g., FIGS. 5A-5F). It will be appreciated that the obtained solutions comprising the chromosome data structures may be output in a variety of formats, including a database format, a comma separated value (CSV) format, or a graphical format.

If block 219 determines that the job is not complete, then processing may proceed to block 220 to determine whether the current run 222 has completed. In determining whether the current run is complete, block 220 may determine whether a current run 222 has failed to produce improvement in quantity and quality of the solutions generated from the prior iterations/generations 221. The quantity measure may be based upon the number of solutions. The quality measure may be based on some quantification of distance from a utopia point, box fitness (e.g., described with respect to FIGS. 5A-5F), or yet another measure.

If block 220 determines that a current run 222 is not complete, then processing may proceed to block 223, wherein a population of parent chromosome structures may be obtained or otherwise selected from the elite chromosome data structures determined from block 218. The prior process is then repeated for another generation/iteration 221 using the parent chromosome data structures from the prior generation/iteration. It will be appreciated that because the evolution process of block 214 is asynchronous, there may be one or more late child chromosome data structures received in the "Finished" list or queue in 216 that are associated with one or more pairs of parent chromosome data structures allocated to slave processors 108 during one or more prior generations/iterations. Therefore, in the next generation/iteration 221, the merged children chromosome data structures in block 216 may likewise include those late child chromosome data structures as well as current child chromosome data structures from parent chromosome data structures allocated to slave processors 108 during the current generation/iteration 221.

On the other hand, block 220 may determine that a current run 222 is complete. For example, looking back over a predetermined number of generations, the search may have failed to produce improvement in the solutions during each generation/iteration 221 of the current run 222. Improvement may be based upon the quantity of the solutions (e.g., the number of solutions) and the quality of the solutions (e.g., some quantification of distance from a utopia point, box fitness, etc.). In this case, the current run 222 is completed, and processing proceeds to initiate a subsequent run 222. The subsequent run 222 may generate an initial population by invigorating the elite solutions stored in the archive checkpoint 202. In particular, the subsequent run 222 may utilize a first number of the elite solutions from the archive checkpoint 202 as part of the initial population utilized in block 204, but may also invigorate the initial population by adding a second number of randomly generated parent chromosome data structures. The randomly generated parent chromosome data structures may be generated and evaluated using the example processes discussed with respect to blocks 204 and 214.

B. Asynchronous Evolution and Automated Chromosome Bundling

Figure 3:
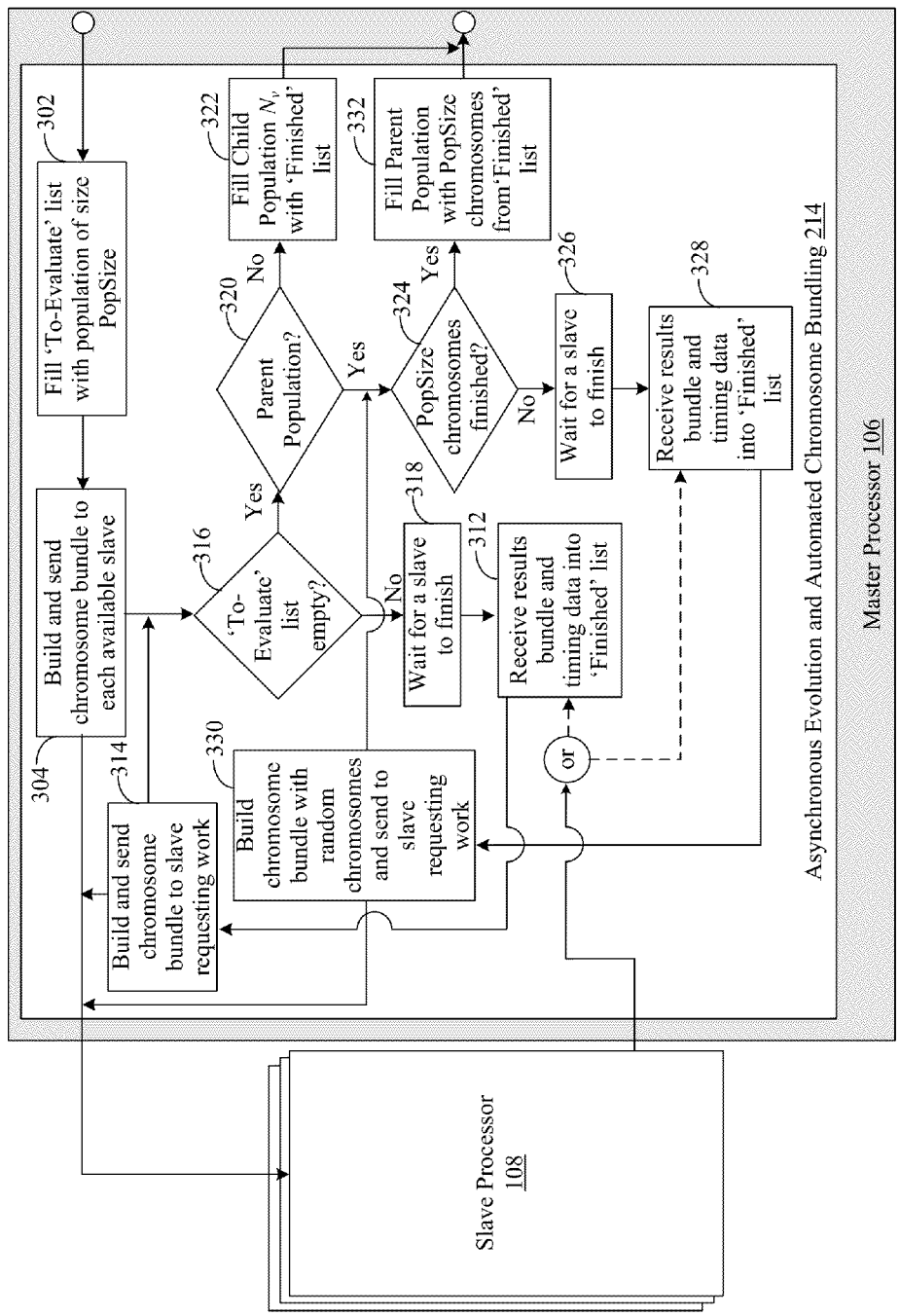
FIG. 3 illustrates an example flow diagram for an asynchronous evolution and automated chromosome bundling process, according to an example embodiment of the invention.

FIG. 3 illustrates an example implementation of an asynchronous evolution and automated chromosome bundling process that may be utilized for block 214 of FIG. 2. It will be appreciated that the example asynchronous evolution and automated chromosome bundling process of FIG. 3 is provided by way of example only, and that many variations are available without departing from example embodiments of the invention.

The asynchronous evolution and automated chromosome bundling process can be utilized in conjunction with at least two example scenarios: (i) evaluation of a randomly generated initial population (e.g., block 204 of FIG. 2) or (ii) evaluation of a new child population (e.g., block 212 of FIG. 2).

Turning now to FIG. 3, the process begins with block 302 in which a "To Evaluate" list or queue is filled with either (i) the randomly generated input population of parent chromosome data structures from block 204, or (ii) the new child population of chromosome data structures from block 212. In block 304, the master processor 106 allocates the chromosome data structures from the "To-Evaluate" list or queue to some or all of the plurality of slave processors 108. More specifically, in block 304, the master processor 106 may build a chromosome bundle for each available slave processor 108 that is to receive work. It will be appreciated that some slave processors 108 may be busy processing chromosome bundles from previous generations/iterations. The number of chromosome data structures included within each chromosome bundle may be determined by the master processor 106 using an example bundling calibration algorithm, which will now be described in further detail.

In an example embodiment of the invention, an example chromosome bundling calibration algorithm may utilize the following tuning knobs or tuning parameters, which may be set, predetermined, or adjusted by a user:

Time_to_Process_Chrom_Bundle_Theshold: A threshold time to process the chromosome bundle (e.g., 10 minutes). This threshold time may provide a target for how many chromosome data structures to include in a chromosome bundle such that the processing time during function evaluation reaches at least this threshold time.

Number_of_Chromosome_Bundles_Needed_for_Rolling_Average: Provides the number of chromosome bundles (e.g., 25) (each having a certain number of chromosome data structures) that each slave processor will process to achieve an acceptable rolling average. The rolling average refers to the total time that the average timing data is collected over.

In addition, each slave processor 108 may maintain the following timing data:

Rolling_Average_Wait_Time: An amount of time that a slave processor spends waiting for work from a master processor.

Average_Function_Evaluation_Time: A cumulative average time required by a slave processor to process or evaluate a single chromosome data structure.

In an example embodiment of the invention, a goal of the example bundling calibration algorithm in block 304 may be to help keep the slave processors 108 at a fairly high (e.g., nearly 100%) utilization rate. Increasing the bundle size decreases the number of packets sent across the network and helps to minimize the time the slave processors 108 are waiting for work. However, if the bundle size is too large, a lag or delay may result in which a chromosome data structure may be potentially outdated by the evolutionary progress. The equilibrium bundle size may be dependent on the function evaluation times of the slave processors 108 and the network capability.

The bundling calibration algorithm may be performed by the master processor 106 for each slave processor 108. In an example embodiment of the invention, the bundling calibration algorithm may be performed for each slave processor 108 based upon the occurrence of one or more of the following conditions: (i) a sufficient number of chromosome data structures have already been processed and calibration has yet to occur, (ii) the rolling average wait time for a slave processor has changed by a threshold amount (e.g., >10%), and/or (iii)

the number of slave processors 108 being managed by the master processor 106 has changed.

In an example embodiment of the invention, the bundling calibration algorithm may be implemented as follows in Table I. It will be appreciated that variations of the algorithm in Table I are available without departing from example embodiments of the invention.

TABLE I

Bundling Calibration Algorithm

When (Average_Function_Evaluation_Time >
  Time_to_Process_Chrom_Bundle_Theshold), set Bundle_Size = 1.
If (Bundle_Size * Average_Function_Evaluation_Time) >
  Time_to_Process_Chrom_Bundle_Theshold), then
  reduce Bundle_Size by 1, and
  monitor the benefit of the reduced Bundle_Size
  (If Rolling_Average_Wait_Time
  has not increased, then keep new Bundle_Size; Otherwise,
  keep the prior
  Bundle_Size);
Else (Bundle_Size is less than threshold), then set Bundle_Size =
  (Time_to_Process_Chrom_Bundle_Theshold /
  Average_Function_Evaluation_Time); monitor the benefit (wait
  until the number of chromosome data structures needed to calculate the
Rolling_Average_Wait_Time has been processed); and register
or store the new
  Bundle_Size and new Rolling_Average_Wait_Time.

The chromosome bundles generated in block 304 may be allocated to the slave processors 108. Each slave processor 108 may evaluate, in accordance with a plurality of objective functions, the received chromosome bundle of chromosome data structures to generate a plurality of respective objective function values for each chromosome data structure. In addition, each slave processor 108 may also perform timing operations or calculations, including a determination of the Rolling_Average_Wait_Time and Average_Function_Evaluation_Time associated with the respective slave processor 108. As each slave processor 108 finishes the objective function evaluations and/or timing operations in block 215, the slave processor 108 may provide a results bundle (e.g., objective function values) and timing data to the master processor 106. The results bundle and timing data may be received in the "Finished" list or queue in block 312 or block 328, depending on the states of blocks 316, 320, and 324.

In particular, if the "To-Evaluate" list or queue is not empty (block 316), then the master processor 106 may wait for one or more slave processor 108 to finish, and the results bundle and timing data may be received into the "Finished" list or queue in block 312. Processing may then proceed from block 312 to block 314, where additional chromosome data structures from the "To-Evaluate" list or queue may be allocated in one or more chromosome bundles to one or more slave processors 108 that have previously finished processing and are waiting for additional work.

Once the "To-Evaluate" list or queue is empty, processing may proceed to block 320 to determine whether a parent population is being evaluated. If not, then the "Finished List" may be filled with the evaluated child population of chromosome data structures in block 322. On the other hand, if the parent population is being evaluated, then processing may proceed to block 324 to determine whether a predetermined population size (PopSize) has been evaluated. If so, then processing proceeds to block 332, where the "Finished List" may be filled with the evaluated parent population of chromosome data structures. On the other hand, block 324 may determine that less than the predetermined population size has been evaluated, and processing may proceed to block 326 to wait for one or more slave processors 108 to finish. Following block 326, processing may proceed to block 328 where the results bundle and timing data may be received from the just finishing slave processors 108 into the "Finished" list or queue. Processing may then proceed to block 330, where additional chromosome data structures are randomly generated and allocated in one or more chromosome bundles to one or more slave processors 108 for objective function evaluation.

In an example embodiment of the invention, block 330 may be utilized to keep available slave processors 108 working with randomly generated chromosome data structures until the predetermined parent population size has been reached. The modified parent population must have the prerequisite number of chromosome data structures, and some of the randomly generated chromosomes may complete processing prior to the chromosome data structures originating from the parent population; in this situation they will become part of the modified parent population, which is received back to block 314. The remaining randomly generated chromosomes will eventually complete and become part of a subsequent modified child population. Block 330 may improve efficiency by keeping slave processors 108 more fully employed, according to an example embodiment of the invention.

It will be appreciated that many variations of the FIG. 3 are available without departing from example embodiments of the invention.

C. Slave Processor Evaluation and Timing Operations

Figure 4:
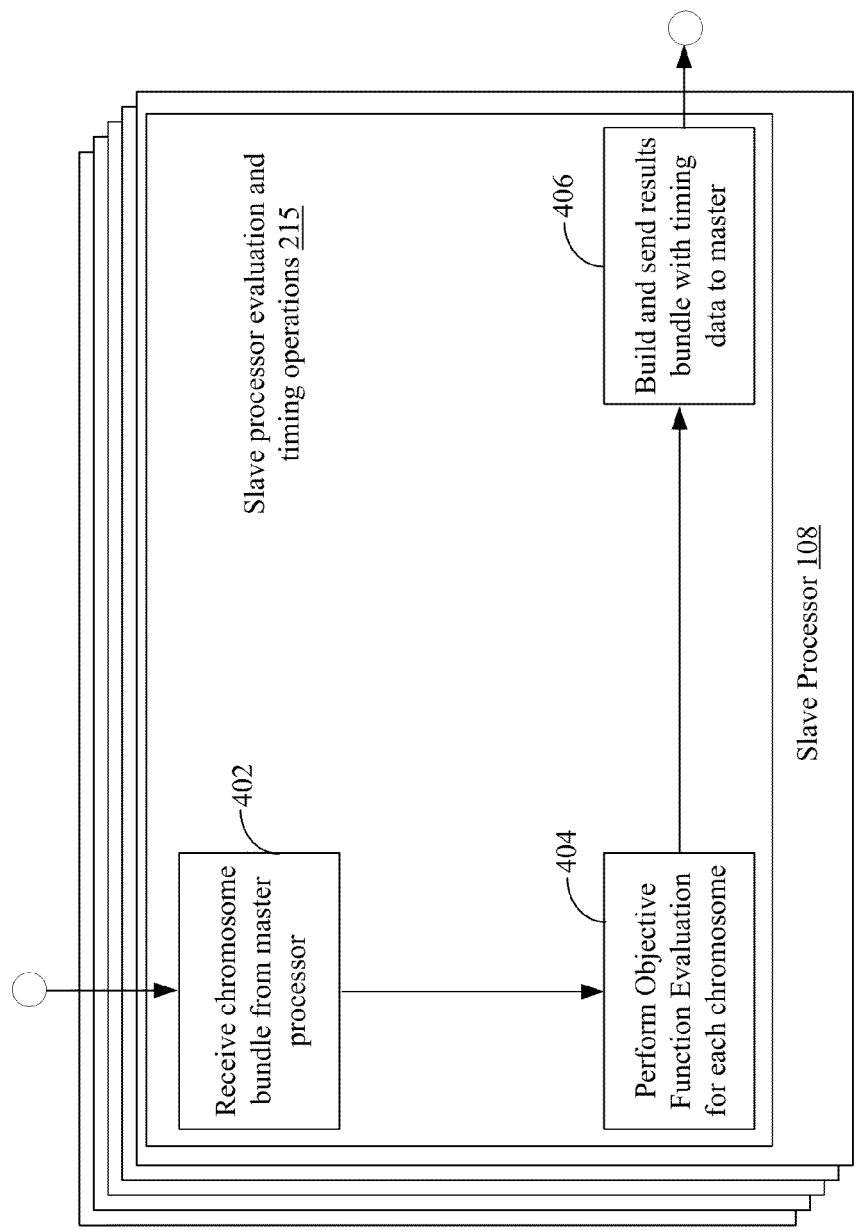
FIG. 4 illustrates example flow diagram for slave processor and timing operations, according to an example embodiment of the invention.

FIG. 4 illustrates example slave processor and timing operations that may be utilized for block 215 of FIG. 2, according to an example embodiment of the invention. It will be appreciated that the example slave processor and timing operations of FIG. 4 are provided by way of example only, and that many variations are available without departing from example embodiments of the invention.

Referring now to FIG. 4, in block 402, a slave processor 108 may receive a chromosome bundle having one or more chromosome data structures from the master processor 402. In block 404, the slave processor 108 may perform objective function evaluation for each chromosome data structure in the chromosome bundle. In an example embodiment of the invention, the slave processor 108 may perform objective function evaluation by applying a plurality of objective functions to each chromosome data structure. The slave processor 108 may access the objective functions from a local memory or database, or may otherwise access the objective functions from a network memory or database. In block 406, the slave processor 108 may also calculate or maintain timing data, such as wait times and/or objective function evaluation times described herein. The slave processor 108 may build and send the results bundle with the timing data to the master processor 106.

III. Box Fitness Termination Criteria

The termination criteria described in block 219 of FIG. 2 (or block 619 of FIG. 6) will now be described in further detail. In an example embodiment of the invention, the termination criteria may be based upon box fitness, as described herein.

As described above, the master processor 106 may have allocated a population of chromosome data structures to the slave processors 108 in respective chromosome bundles for evaluation. The slave processors 108 may evaluate the chromosome data structures according to at least two objective functions $f_1$ and $f_2$. Accordingly, each chromosome data structure may be associated with at least a respective first objective function value and a second objective function value corresponding to the objective functions $f_1$ and $f_2$.

Initially, a first non-domination sorting may be applied to the current population to remove solutions that are dominated by at least one other solution (see, e.g., FIG. 5A, discussed below). It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population (see, e.g., FIG. 5B, discussed below). Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\epsilon_1$ associated with objective function $f_1$, and a second epsilon value may be associated with second epsilon spacing or step size $\epsilon_2$ associated with objective function $f_2$. Each solution may then be associated with an epsilon vector or epsilon box address $(\epsilon_1, \epsilon_2)$ corresponding to the first epsilon value and the second epsilon value. If two or more solutions have the same epsilon box address, then the epsilon non-domination sorting may retain a single solution per epsilon box address $(\epsilon_1, \epsilon_2)$. This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

An example box fitness termination criteria will be described more particularly with respect to FIGS. 5A-5F. FIG. 5A illustrates a feasible design region 502 associated with a first objective function $f_1$ and a second objective function $f_2$. Within the feasible design region is a snapshot of a population of solutions (e.g., at block 216 or 616) of a given generation/iteration, according to an example embodiment of the invention. Based upon the goal of minimizing the first and second objective functions $f_1$ and $f_2$, non-domination sorting (e.g., at block 218 or 618) identifies all of the circles as being non-dominated solutions and all of the triangles as dominated solutions. The dominated solutions may be eliminated from the population or removed from further consideration, according to an example embodiment of the invention.

Figure 5A:
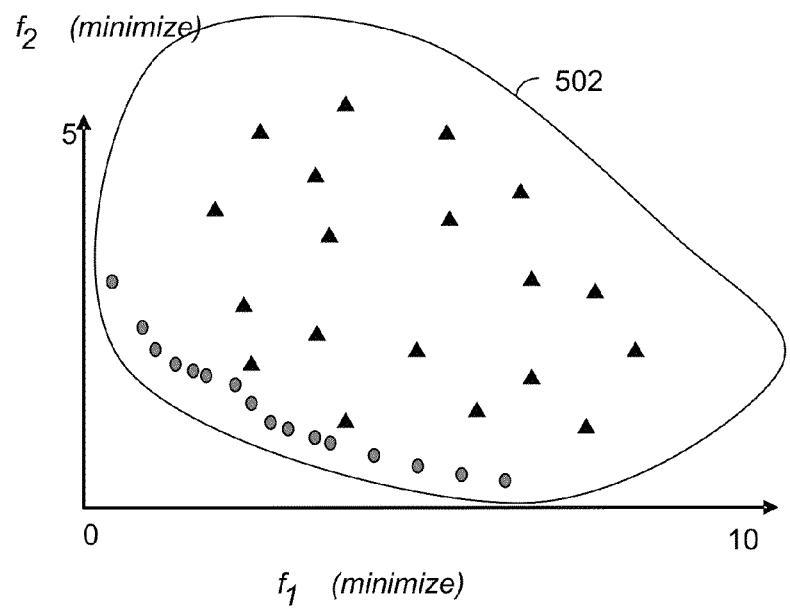
FIGS. 5A-5F illustrate a visual representation of an operation of box fitness termination criteria, according to an example embodiment of the invention.
Figure 5B:
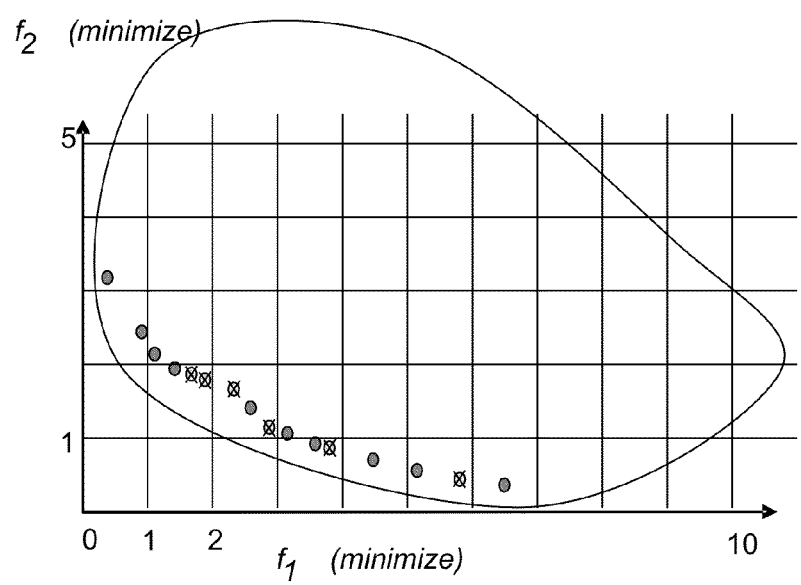

In FIG. 5B, epsilon non-domination sorting may be applied to the remaining solutions (e.g., non-eliminated solutions) from the first non-domination sorting of FIG. 5A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 5B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 5C:
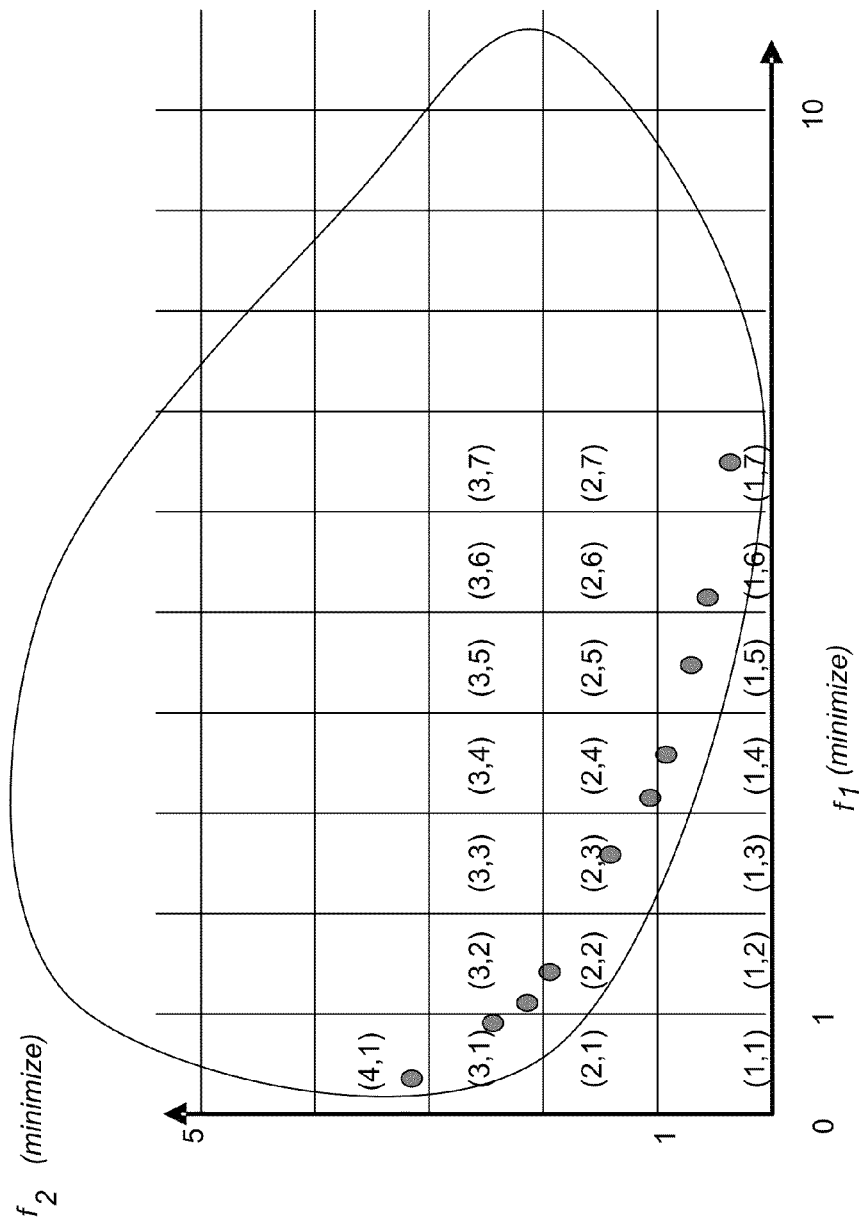

In FIG. 5C, the epsilon non-dominated solutions are illustrated. Each of these solutions has an epsilon box address as shown by FIG. 5C. Each solution inside a given box has a fitness based upon its domination rank and diversity, as described herein in accordance with an example embodiment of the invention. Since only one solution can exist in any given box during a generation/iteration (e.g., box 221 or 621), one can count how many boxes remain unchanged from iteration to iteration.

Figure 5D:
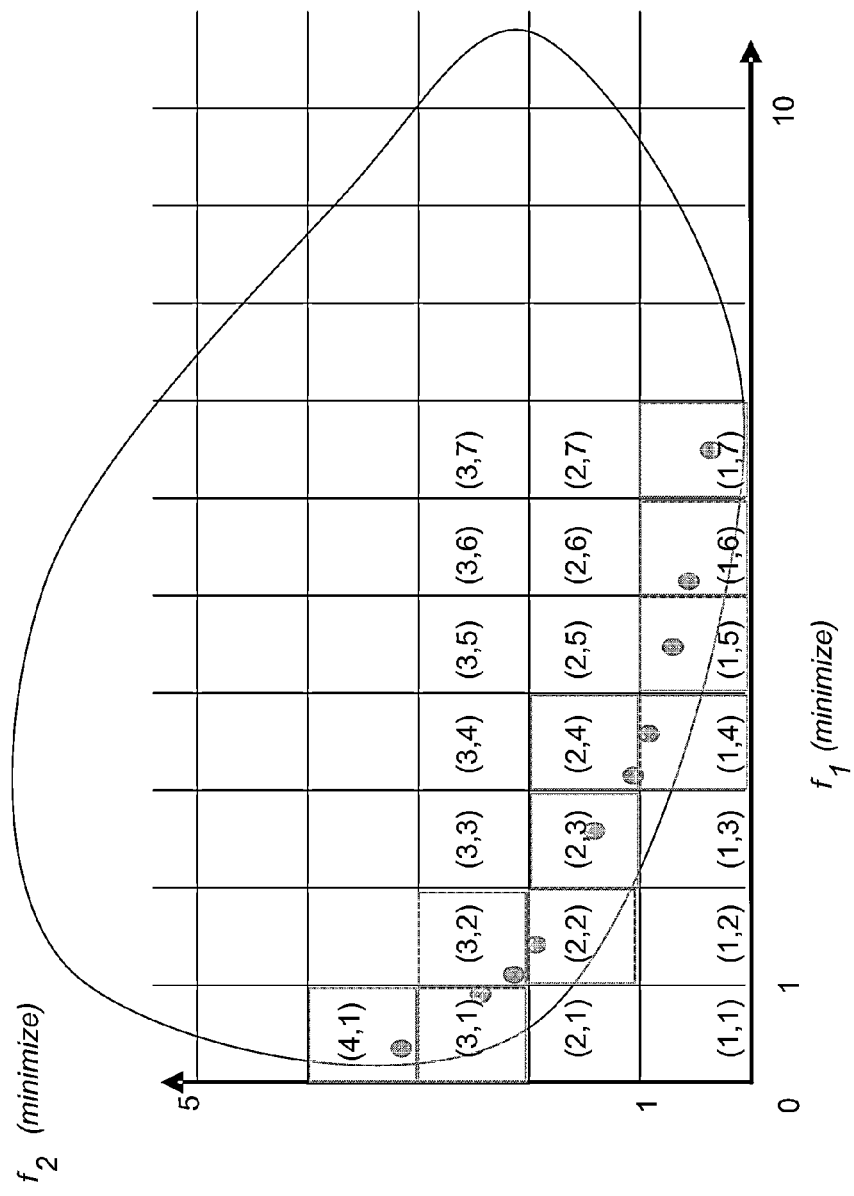

In FIG. 5D, the number of unique boxes for a particular generation/iteration (e.g., box 221 or 621) is illustrated. In particular, in FIG. 5D, there are 10 unique boxes corresponding to the addresses of: (4,1), (3,1), (3,2), (2,2), (2,3), (2,4), (1,4), (1,5), (1,6), and (1,7). The addresses for each unique box may be stored in a memory or archive for the purposes of comparison to future generations.

Recall that the box fitness termination criteria may operate as follows: (1) Looking back over a predetermined number of previous generations/iterations (e.g., block 221 or 621), the total quantity of unique box addresses must remain unchanged above a threshold (e.g., 90%), (2) This greater-than-or-equal-to threshold must be maintained for a predefined number of generations/iterations (e.g., 20 generations/iterations), and (3) If both of these conditions are met, then the job is terminated.

Figure 5E:
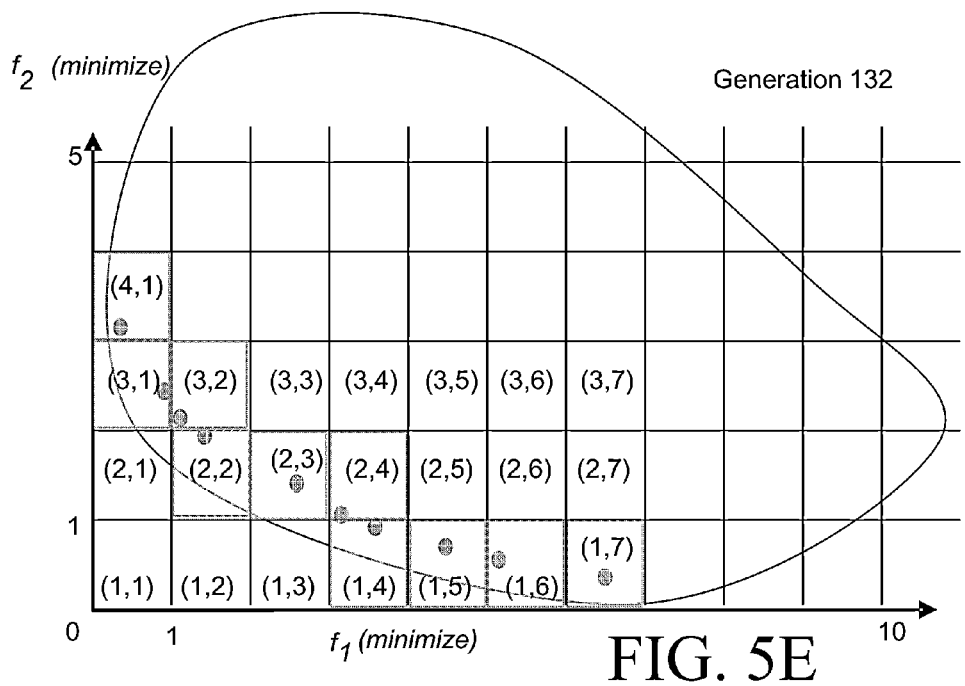
Figure 5F:
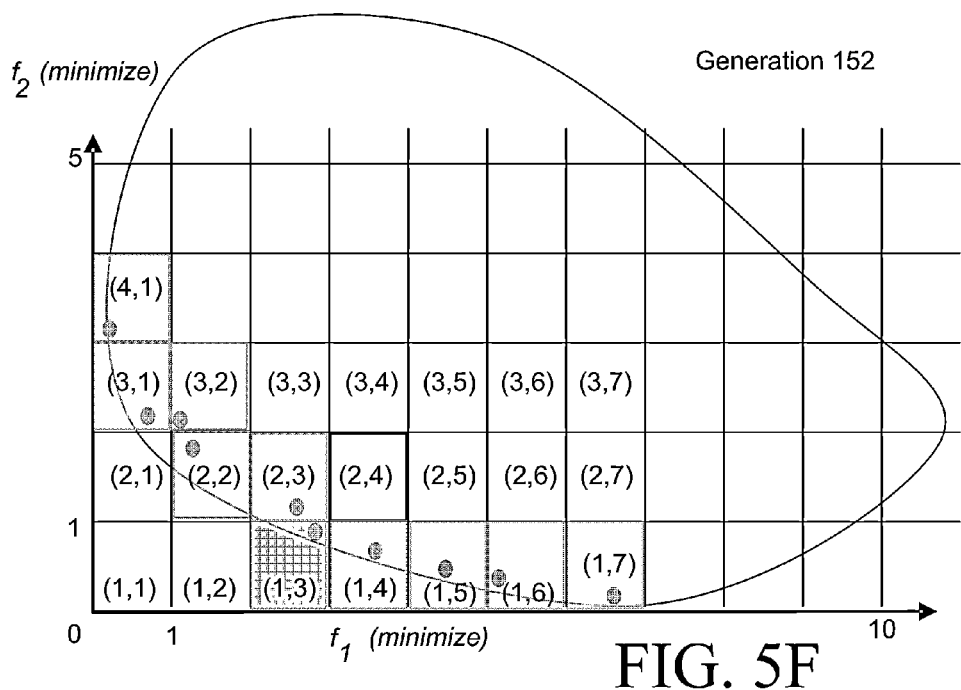

FIG. 5E illustrates a snapshot of a mostly converged population of epsilon non-dominated solutions at a particular generation/iteration such as generation #132. FIG. 5F illustrates a snapshot of the population of non-dominated solutions at a subsequent generation/iteration such as generation #152. As compared to FIG. 5E, one of the solutions in FIG. 5F has moved closer to the Pareto-optimal front, but the remaining solutions have not materially improved with regard to their box addresses. Note one new epsilon box address of (1,3) has been found in FIG. 5F as compared to FIG. 5E. However, this represents a 90% unchanged population between FIGS. 5E and 5F with respect to unique box addresses, which has remained above this threshold for the predetermined number of consecutive generations/iterations (e.g., last 20 consecutive generations/iterations), so this job can be terminated.

It will be appreciated that while the box fitness criteria has been illustrated with respect to two objective functions, the box fitness can be applied where there are three or more objective functions without departing from example embodiment of the invention. Indeed, the box-fitness termination criteria can be generalized to n-objectives/dimensions, where 3 objectives/dimensions may be represented by volumes, and 4+ objectives/dimensions can be represented by hypervolumes.

In addition, it will be appreciated that the epsilon spacings or step sizes discussed herein may be varied in accordance with an example embodiment of the invention. For example, a larger epsilon spacing or step size may decrease the number of generations/iterations that are needed before the box-fitness termination criteria is met and a job is terminated. On the other hand, a smaller epsilon spacing or step size may increase the number of generations/iterations that are needed before the box-fitness termination criteria is met and the job is terminated.

It will also be appreciated that the epsilon spacing or step size of the epsilon vector can also be dynamically adjusted or changed. An example method for dynamically changing the epsilon vector will now be discussed in further detail. Suppose, for example, that there is a 10-dimensional optimization problem in which there are 10 objectives:

1) For each objective, the decision maker (problem stakeholder) may decide, a priori, how many epsilon non-dominated solutions are desired for each objective. For example, perhaps 10 solutions for the first objective/dimension, 20 for the second objective/dimension, etc.
2) For each objective, at some predetermined interval, which may or may not be as frequently as the end of a given generation/iteration:
    Calculate the maximum and minimum objective values and scale between 0 and 1. If the user wanted 10 solutions, for example, then we would desire one solution to fall with the slice between 0 and 0.1, one between 0.1 and 0.2, etc.
    For each of these slices, calculate the number of epsilon non-dominated solutions.
    Then calculate the average number across all slices. If this average is greater than 1, then increase the epsilon value (e.g., epsilon spacing or step size) for that objective dimension according to 3) below. On the other hand, if this average is less than 1, then decrease the epsilon value (e.g., epsilon spacing or step size) for that dimension according to 3) below.
3) Adjust the epsilon value (e.g., epsilon spacing or step size) for the next iteration by multiplying the average number of epsilon non-dominated solutions per slice for that objective by the current epsilon value. If the average rate is greater than 1, then the new epsilon value will encourage the set to shrink in that dimension. If, the average is less than 1, then the new epsilon value will encourage the set to grow in that dimension objective.
4) Over time, using the process described in steps 2-3 will result in an epsilon vector that oscillates in all dimensions around a "mean" vector or steady-state value. For computational efficiency, all epsilon non-dominated solutions found during a given job will be stored off-line and potentially added back into the population after a new epsilon vector is determined. This mechanism ensures that previously epsilon non-dominated solutions are not lost as the dynamic epsilon vector elements are reduced or increased in size at the predetermined frequency.

IV. Parallel Processing System with Infeasible Space Management

A. System Overview

Figure 6:
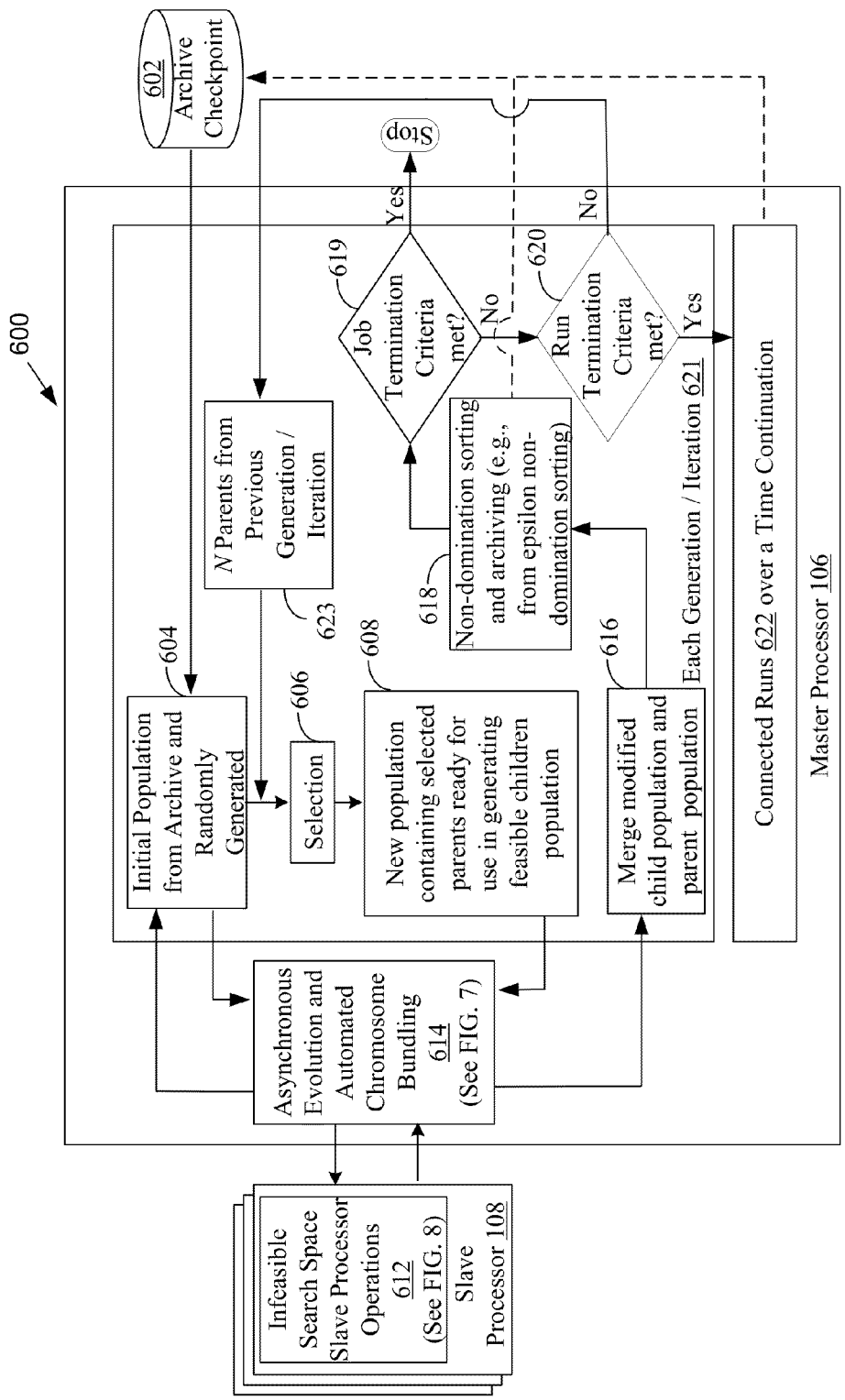
FIG. 6 illustrates an example parallel processing system that executes an evolutionary algorithm with infeasible space management, according to an example embodiment of the invention.

FIG. 6 illustrates an example parallel processing system 600 that executes an evolutionary algorithm with infeasible space management, according to an example embodiment of the invention. It will be appreciated that the infeasible space management may be appropriate with medium to large infeasible space conditions but has been invented to address vastly infeasible space conditions. For example where randomly generated chromosomes may not produce a feasible solution even with multiple billion trials and the crossover/mutation operations have a correspondingly low probability of producing feasible children. The system 600 may allocate the operations of the evolutionary algorithm with infeasible space management between the master processor 106 and slave processors 108.

According to an example embodiment of the invention, infeasible space management may be utilized to ensure that solutions generated by the evolutionary algorithm are within a feasible solution set. For example, infeasible space management may be used with an airline network scheduling optimization to ensure that each generated schedule is feasible— for example, where an arrival time does not occur before a departure time for a flight on a particular schedule.

In an example embodiment of the invention, an executed job of the evolutionary algorithm with infeasible space management may comprise a plurality of connected runs 622 that occur in a sequence to form a time continuation. Each run 622 may comprise one or more evolutionary operations performed during one or more generations/iterations 621. It will be appreciated that a run may be connected to a prior run in that at least some of the same parents are shared in the "initial population" utilized for initiating respective runs, according to an example embodiment of the invention.

Example processing by an executed job for an example generation/iteration 621 will now be discussed in further detail. Referring now to block 604, the master processor 106 may receive or obtain an initial population of parent chromosome data structures. In an example embodiment of the invention, each parent chromosome data structure may include the chromosome, where the chromosome may include one or more parameters (which may also be referred to as "genes"), which may include static variables, evolved variables, and/or derived variables, as similarly described herein.

Still referring to block 604, the initial population of parent chromosome data structures may be obtained by one or more sources. In an example embodiment of the invention, the initial population of parent chromosome data structures may be obtained from a combination of the archive checkpoint 602 and random generation of new chromosome data structures. For example, 25% of the initial population of parent chromosome data structures may be obtained from the archive checkpoint 602 while 75% of the initial population may be randomly generated.

The archive checkpoint 602 may include an elite set of chromosome data structures (i.e., elite solutions) obtained from one or more prior generations/iterations 621, according to an example embodiment of the invention. The archive checkpoint 602 may take the form of a data file or database stored in a computer memory, computer disk, network storage, or other non-volatile memory. As the archived chromosome data structures were previously evaluated in a prior generation/iteration 621, these chromosome data structures may be associated with a plurality of objective function values corresponding to a respective plurality of objective functions. Each objective function may be associated with any predefined objective to be optimized by the executed job of the evolutionary algorithm. For example, for automobile design optimization, an objective function may be associated with the objective of minimizing cost, and the corresponding objective function value indicates which chromosome data structure (based upon the included chromosomes and respective genes) is able to achieve the lowest cost.

Alternatively, in block 604, the initial population of parent chromosome data structures may be produced from only randomly generated chromosomes. In an example embodiment, block 614 may instruct or request one or more slave processors 108 to randomly generate the parent chromosome data structures that are feasible solutions. In generating the random chromosome data structures, the values for the evolved and/or static variables (e.g., fixed values/constants) in the one or more chromosomes may be provided within specified allowable ranges or limits. Values for the derived variables can be calculated from one or more static variables, evolved variables, or other derived variables in accordance with one or more specified functions. An example process by which a slave processor 108 can generate a random feasible solution will be discussed in further detail with respect to block 806 discussed with respect to FIGS. 8 and 9. In addition, as discussed herein with respect to FIG. 8, each of the randomly generated feasible solutions may be associated with a respective plurality of objective function values.

Having received or obtained the initial population of parent chromosome data structures in block 604, processing may then proceed to block 606. In block 606, the master processor 106 may select pairs of parent chromosome data structures from the input population of parent chromosome data structures. In an example embodiment of the invention, the selection of the pairs of parent chromosome data structures may occur according to a tournament selection process, which may include a crowded tournament selection process. An example tournament selection process in accordance with an example embodiment of the invention may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the invention. The winners of each tournament become the two parents resulting from the selection process of block 606. It will be appreciated that a predetermined number of pairs of parent chromosome data structures may be selected in block 606. It will also be appreciated that a particular parent chromosome data structure may be present in two or more selected pairs of parent chromosome data structures, according to an example embodiment of the invention.

In block 608, a new population of chromosome data structures may be generated, where each chromosome data structure includes the selected parent chromosomes (including genes/parameters) from block 606. Accordingly, the new population in block 608 may be ready for sending to the slave processors 108 for generating feasible children chromosome data structures. It will be appreciate that the crossover and mutation functionality do not occur in the master processor 106 for infeasible space processing. Rather, the crossover and mutation functionality may be iteratively applied by slave processors 108 using the parent chromosomes selected in block 606 to produce feasible children chromosomes.

Following block 608, processing may proceed to block 614. In block 614, the new population of chromosome data structures from block 608 may be received into a "To Evaluate" list or queue (see also block FIG. 7, which illustrates block 614 in further detail). Block 614 may then allocate the chromosome data structures from the "To Evaluate" list or queue to some or all of the plurality of slave processors 108 according to an asynchronous evolution process. An automated chromosome bundling process, discussed in further detail with respect to FIG. 7, may also be utilized in block 614 to determine how many chromosome data structures should be included in a respective chromosome bundle for a respective slave processor 108. For example, a slave processor 108 with faster processing capability may receive a chromosome bundle with a larger number of chromosome data structures. Alternatively, the slave processor 108 may receive a fixed number of chromosome data structures in a chromosome bundle, but simply receive a larger number of chromosome bundles within a predetermined amount of time. The example automated chromosome bundling process may allow efficient allocation of chromosome data structures among the plurality of slave processors 108.

In block 612, each slave processor 108 may have received a chromosome bundle comprising one or more chromosome data structures from the master processor. Each slave processor may apply an evolutionary subprocess to the chromosomes of the previously selected pair of parent chromosome data structures to generate a feasible solution comprising at least one chromosome data structure. The generated feasible solution may also be evaluated according to a plurality of objective functions, and accordingly, a corresponding number of objective function values may be obtained. In addition, each slave processor 108 may also perform timing operations or calculations, including determination of certain wait times and/or evaluation times associated with the respective slave processor 108. Each slave processor may then provide a results bundle (e.g., feasible solution and objective function values) and timing data (e.g., wait times and/or objective function evaluation times) to the master processor 106. The master processor 108 may provide the results bundle and timing data to a "Finished" list or queue. It will be appreciated that with asynchronous evolution processing, the objective function results may be included in the "Finished" list or queue on an as-received basis from the slave processor 108. Indeed, the evolutionary process is asynchronous in that as soon as the "To Evaluate" list is empty for a given generation/iteration 621, the processing taking place in block 614 is completed, and the child population passed to block 616 is comprised of all of the chromosome data structures currently within the "Finished" list. It will be further appreciated that the results from some of the chromosome bundles previously sent to the various slave processors 108 may not have been received at the time the "To Evaluate" list is emptied.

In block 616, the master processor 106 receives a modified child population of chromosome data structures from the asynchronous evolution process of block 614. The modified child population may include different chromosome structures as well as a different number of chromosome data structures as compared to the population of block 608. The received modified child population is merged with the current parent population, as illustrated by block 616. In block 618, the master processor 106 may perform epsilon non-domination sorting of the merged list of child and parent chromosome data structures to identify an elite set of chromosome data structures based at least in part on the corresponding objective function values, as similarly described previously with respect to block 218 of FIG. 2. The obtained elite set of chromosome data structures for the particular generation/iteration may be stored in the archive checkpoint 602 or another archive of a computer memory or other data storage for subsequent retrieval.

Following processing in block 618, processing may proceed to block 619. In block 619, a determination is made as to whether the current job is completed such that the evolutionary algorithm should be terminated. A job typically comprises processing involving a plurality of connected runs 622, where each run 622 may include processing associated with one or more generations/iterations 621. Block 619 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. The operation of block 619 is similar to the operation of block 219 discussed with respect to FIG. 2.

If block 619 determines that the job is not complete, then processing may proceed to block 620 to determine whether the current run 622 has completed. In determining whether the current run is complete, block 620 may determine whether a current run 622 has failed to produce improvement in quantity and quality of the solutions generated from the prior iterations/generations 621. The quantity measure may be based upon the number of solutions. The quality measure may be based on some quantification of distance from a utopia point, box fitness (e.g., described with respect to FIGS. 5A-5F), or yet another measure.

If block 620 determines that a current run 622 is not complete, then processing may proceed to block 623, where a population of parent chromosome structures may be obtained or otherwise selected from the elite chromosome data structures determined from block 618. The prior process is then repeated for another generation/iteration 621 using the parent chromosome data structures from the prior generation/iteration. It will be appreciated that because the evolution process of block 614 is asynchronous, there may be one or more late child chromosome data structures received in the "Finished" list or queue in 616 that are associated with one or more pairs of parent chromosome data structures allocated to slave processors 108 during one or more prior generations/iterations. Therefore, in the next generation/iteration 621, the merged children chromosome data structures in block 616 may likewise include those late child chromosome data structures as well as current child chromosome data structures generated as feasible solutions by the slave processors 108 during the current generation/iteration 621.

On the other hand, block 620 may determine that a current run 622 is complete. For example, looking back over a predetermined number of generations, the search may have failed to produce improvement in the solutions during each generation/iteration 621 of the current run 622. Improvement may be based upon the quantity of the solutions (e.g., the number of solutions) and the quality of the solutions (e.g., some quantification of distance from a utopia point, box fitness, etc.). In this case, the current run 622 is completed, and processing proceeds to initiate a subsequent run 622. The subsequent run 622 may generate an initial population by invigorating the elite solutions stored in the archive checkpoint 602. In particular, the subsequent run 622 may utilize a first number of the elite solutions from the archive checkpoint 602 as part of the initial population utilized in block 604, but may also invigorate the initial population by adding a second number of randomly generated parent chromosome data structures. The randomly generated parent chromosome data structures may be generated and evaluated by the slave processor 108 using the example processes discussed herein.

B. Asynchronous Evolution and Automated Chromosome Bundling

Figure 7:
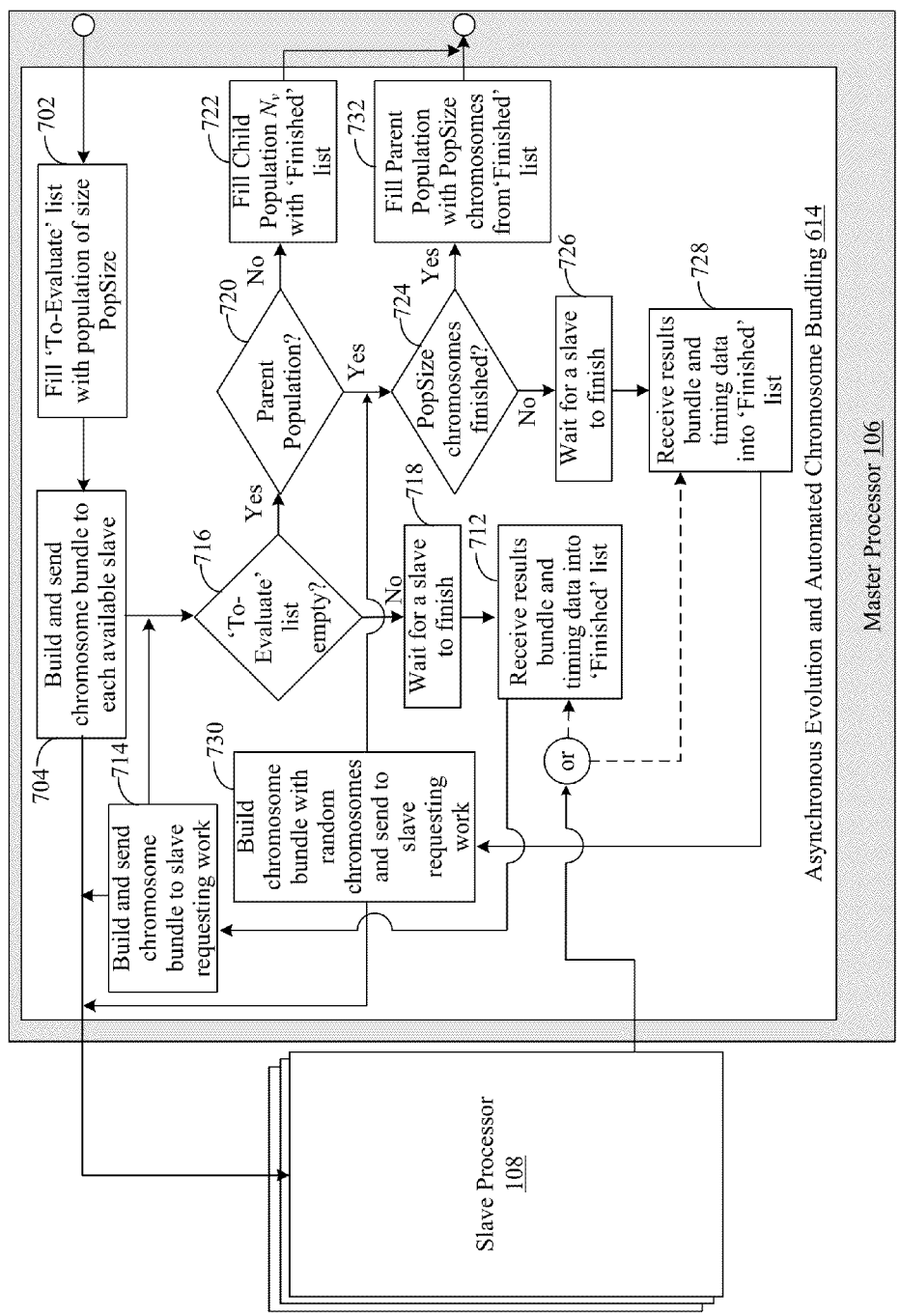
FIG. 7 illustrates an example flow diagram for an asynchronous evolution and automated chromosome bundling process, according to an example embodiment of the invention.

FIG. 7 illustrates an example implementation of an asynchronous evolution and automated chromosome bundling process that may be utilized for block 614 of FIG. 6. It will be appreciated that the example asynchronous evolution and automated chromosome bundling process of FIG. 7 is provided by way of example only, and that many variations are available without departing from example embodiments of the invention.

The asynchronous evolution and automated chromosome bundling process can be utilized in conjunction with at least two example scenarios: (i) generation and evaluation of a randomly generated initial population (e.g., following block 604 of FIG. 6) or (ii) generation and evaluation of a new child population (e.g., following block 608 of FIG. 6).

Turning now to FIG. 7, the process begins with block 702, where a "To Evaluate" list or queue is filled. If an initial parent population is to be randomly generated (see, e.g., from block 604), then the "To Evaluate" list or queue may be filled with a population of chromosome data structures in which a random flag for each chromosome data structure may be set. The random flag may indicate to a slave processor 108 that the evolved variable values and/or constants of the chromosome data structure should be randomly generated within the allowable ranges. The random flag may be represented by a particular field (e.g., a Boolean value such as YES/NO, ON/OFF, or 0/1) of a chromosome data structure. On the other hand, in block 702, if the "To Evaluate" list or queue is being filled based upon block 608, then the "To Evaluate" list or queue may be filled with the new population of chromosome data structures from block 608.

In block 704, the master processor 106 allocates the chromosome data structures from the "To-Evaluate" list or queue to some or all of the plurality of slave processors 108. More specifically, in block 704, the master processor 106 may build a chromosome bundle for each available slave processor 108 that is to receive work. The number of chromosome data structures included within each chromosome bundle may be determined by the master processor 106 using an example bundling calibration algorithm, which is similar to that described with respect to block 304 of FIG. 3.

The chromosome bundles generated in block 704 may be allocated to the slave processors 108. Responsive to the received chromosome bundle, each slave processor 108 may generate a feasible solution, as will be described with respect to FIGS. 8-10. Likewise, each slave processor 108 may evaluate, in accordance with a plurality of objective functions, the generated feasible solution. In addition, each slave processor 108 may also perform timing operations or calculations, including a determination of the Rolling_Average_Wait_Time and Average_Function_Evaluation_Time associated with the respective slave processor 108, as described above. The slave processor 108 may provide a results bundle (e.g., objective function values and genes of the feasible solution) and timing data to the master processor 106. The results bundle and timing data may be received in the "Finished" list or queue in block 712 or block 728, depending on the states of blocks 716, 720, and 724.

In particular, if the "To-Evaluate" list or queue is not empty (block 716), then the master processor 106 may wait for one or more slave processor 108 to finish, and the results bundle and timing data may be received into the "Finished" list or queue in block 712. Processing may then proceed from block 712 to block 714, where additional chromosome data structures from the "To-Evaluate" list or queue may be allocated in one or more chromosome bundles to one or more slave processors 108 that have previously finished processing and are waiting for work.

Once the "To-Evaluate" list or queue is empty, then processing may proceed to block 720 to determine whether a parent population is being generated and evaluated. If not, then the "Finished List" may be filled with the generated and evaluated child population of chromosome data structures in block 722. On the other hand, if the parent population is being generated and evaluated, then processing may proceed to block 724 to determine whether a predetermined population size (PopSize) has been generated and evaluated. If so, then processing proceeds to block 732, where the "Finished List" May be filled with the generated and evaluated parent population of chromosome data structures. On the other hand, block 724 may determine that less than the predetermined population size has been evaluated, and processing may proceed to block 726 to wait for one or more slave processors 108 to finish. Following block 726, processing may proceed to block 728 where the results bundle and timing data may be received from the just finishing slave processors 108 into the "Finished" list or queue. Processing may then proceed to block 730, where additional chromosome data structures are generated (with the "random flag" set) and allocated in one or more chromosome bundles to one or more slave processors 108 for generation and evaluation of a feasible solution. In an example embodiment of the invention, block 730 may be utilized to keep available slave processors 108 working until the predetermined population size has been reached.

It will be appreciated that many variations of the FIG. 7 are available without departing from example embodiments of the invention.

C. Infeasible Search Space Slave Processor Operations

Figure 8:
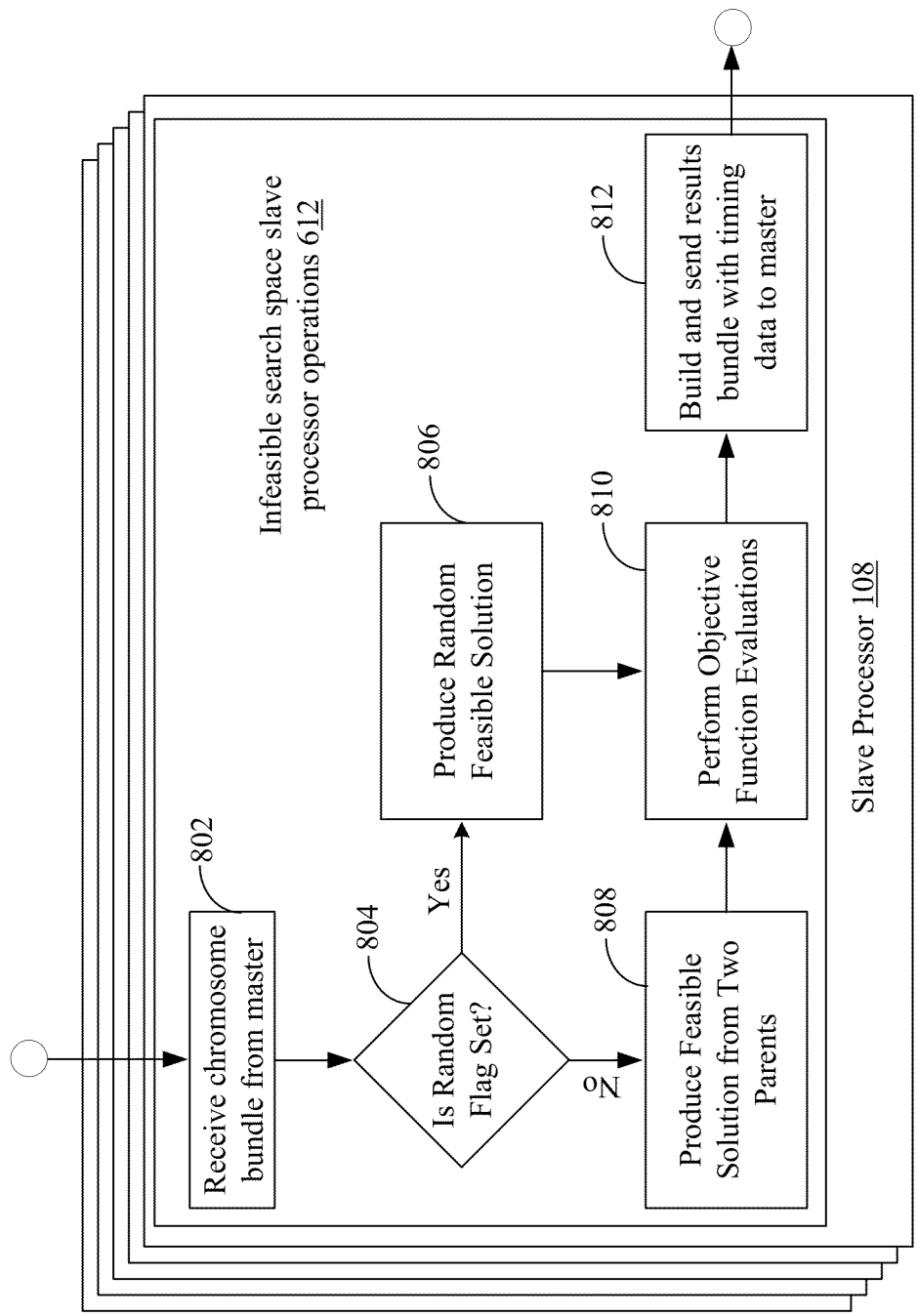
FIG. 8 illustrates an example flow diagram of example infeasible search space operations that may be utilized by a slave processor, according to an example embodiment of the invention.

FIG. 8 illustrates example infeasible search space operations that may be utilized by a slave processor 108 for block 612 of FIG. 6, according to an example embodiment of the invention. It will be appreciated that the example infeasible search space operations of FIG. 8 are provided by way of example only, and that many variations are available without departing from example embodiments of the invention.

Referring now to FIG. 8, in block 802, a slave processor 108 may receive a chromosome bundle having one or more chromosome data structures from the master processor 402. The received chromosome data structures in the chromosome bundle may have a respective field (e.g., a Boolean value) indicating the setting of a random flag if the slave processor 108 is requested to randomly produce a feasible solution for an initial parent population. If the random flag is set for a chromosome data structure, then the variable values for that particular chromosome data structure may not be meaningful (and may be null or blank) since those values will be randomly generated by the slave processor 108. On the other hand, the received chromosome data structures in the chromosome bundle may include chromosomes from at least one selected pair of parent chromosome data structures (e.g., from block 608) to be used in producing a feasible solution.

Following block 802, processing may proceed to block 804. In block 804, the slave processor 108 may determine whether a field in the received chromosome data structure indicates that a random flag has been set. If the random flag has been set, then processing may proceed to block 806 in which the slave processor 108 may produce a random feasible solution. Block 806 will be discussed in further detail with respect to FIG. 9. On the other hand, if the random flag has not been set, then processing may proceed to block 808 in which a slave processor 108 may produce a feasible solution from chromosomes from at least one selected pair of parent chromosome data structures. Block 808 will be discussed in further detail with respect to FIG. 10.

Following blocks 806 or 808, a feasible solution may be provided to block 810. In block 810, the slave processor 108 may perform objective function evaluation by applying a plurality of objective functions to the chromosome data structure of the feasible solution. The slave processor 108 may access the objective functions from a local memory or database, or may otherwise access the objective functions from a network memory or database. In block 812, the slave processor 108 may also calculate or maintain timing data, such as wait times and/or objective function evaluation times described herein. The slave processor 108 may build and send the results bundle (e.g., feasible solution & objective function values) with the timing data to the master processor 106.

D. Generate Random Feasible Solution

Figure 9:
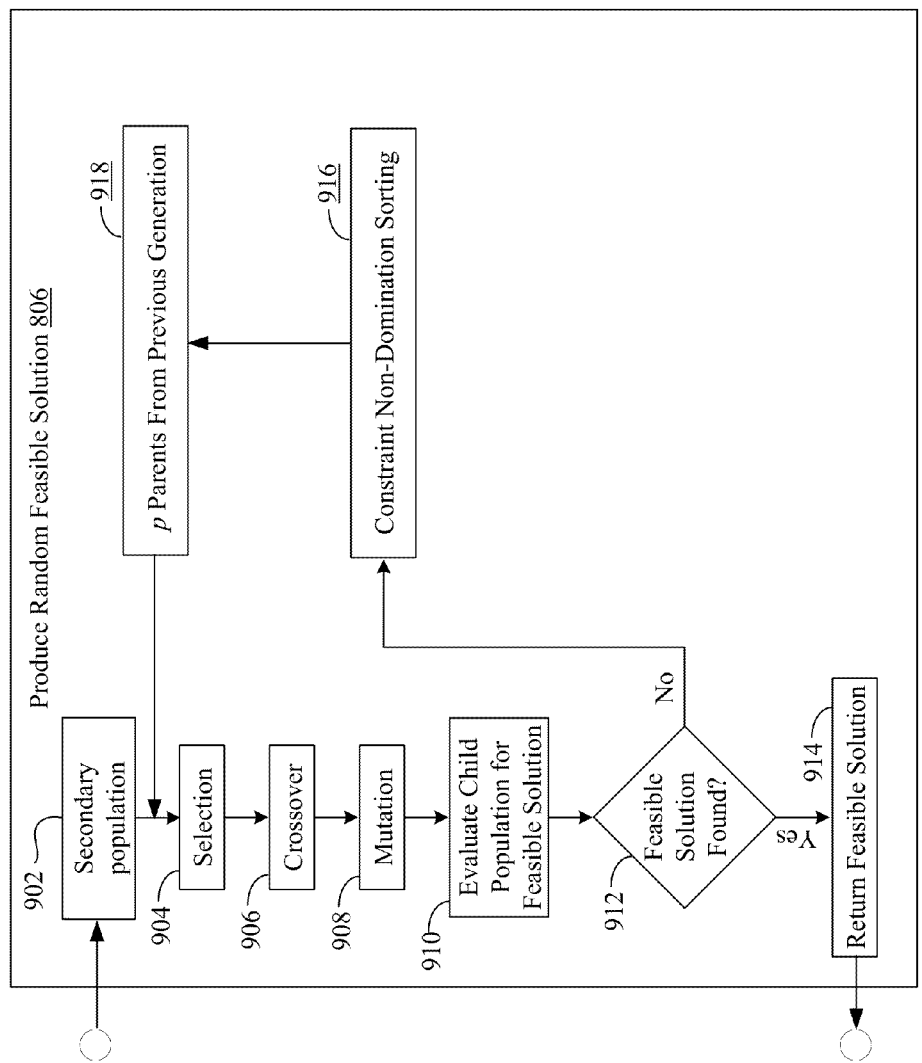
FIG. 9 illustrates an example flow diagram for generating random feasible solutions, according to an example embodiment of the invention.

FIG. 9 illustrates an example process for generating random feasible solutions that may be utilized for block 806 of FIG. 8, according to an example embodiment of the invention. It will be appreciated that the example process for generating random feasible solutions are provided by way of example only, and that many variations are available without departing from example embodiments of the invention.

Referring now to FIG. 9, in block 902, a secondary population of parent chromosome structures is randomly generated by the slave processor 108. In generating the random chromosome data structures, the values for the evolved and/or static variables may be selected to be within allowable ranges. Values for the derived variables can be calculated from the evolved, static variables, and/or other derived variables in accordance with one or more functions. The secondary population of the parent chromosome data structures may be evaluated according to a plurality of constraint functions that define constraints on a feasible solution set. Thus, members of the secondary population may be associated with respective constraint values.

In block 904, the slave processor 108 may select pairs of parent chromosome data structures from the secondary population of parent chromosome data structures. In an example embodiment of the invention, the selection of the pairs of parent chromosome data structures may occur according to a tournament selection process, which may include a crowded tournament selection process. An example tournament selection process in accordance with an example embodiment of the invention may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the invention. The winners of each tournament become the two parents resulting from the selection process of block 904.

Following block 904, chromosomes of the selected pairs of parent chromosome data structures may be subject to one or more evolutionary operators to generate a child population of child chromosome data structures, according to an example embodiment of the invention. Two example evolutionary operators are illustrated by blocks 906 and 908. For example, block 906 illustrates a crossover evolutionary operator in which a portion of the parameter values or "gene" values may be exchanged between chromosomes in selected pairs of parent chromosome data structures to generate new pairs of chromosome data structures. In an example embodiment of the invention, the crossover evolutionary operation may be capable of performing crossover using integer or non-integer numbers (e.g., double precision numbers, etc.), binary representation of numbers, letters, and/or symbols. As another example, block 908 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome of a chromosome data structure. In an example embodiment of the invention, only a portion or percentage of the received chromosomes of the chromosome data structures in blocks 906 and 908 may have genes that are crossed-over or mutated, respectively. The respective portions or percentages that are crossed-over and/or mutated may be predetermined or dynamically varied during operation of evolutionary algorithm, according to an example embodiment of the invention. For example, a first predetermined portion or percentage (e.g., 50%-80%) of the received chromosomes of the chromosome data structures may have genes that are crossed over in block 906 while a second predetermined portion or percentage (e.g., 1%-3%) of the received chromosomes of the chromosome data structures may have genes that are mutated in block 908. On the other hand, for dynamic variations, the respective portions or percentages that are crossed-over and/or mutated may be increased or decreased during runtime to dynamically increase or decrease the rate of evolutionary progress as desired or required. It will be appreciated that other evolutionary operators besides blocks 906 and 908 may be available without departing from example embodiments of the invention. Likewise blocks 906 and 908 may be performed in a different order than that shown in FIG. 9 or otherwise combined into a single block without departing from example embodiments of the invention.

By applying one or more evolutionary operators to the selected pairs of parent chromosome data structures, a new child population of child chromosome data structures may be obtained and evaluated in block 910. In particular, block 910 may evaluate the child population according to a plurality of functions that define constraints on a feasible solution set. For instance, an example constraint function for an airline scheduling application may define a constraint in which an arrival time cannot be before a departure time for a particular schedule. When the slave processor 108 evaluates the child population in block 910 according to the plurality of constraint functions, a respective plurality of constraint function values may be obtained.

In block 912, the slave processor 108 may determine whether a feasible solution is found within the evaluated child population of chromosome data structures. For example, block 912 may include analyzing the respective constraint function values for each chromosome data structure in the child population. Indeed, the respective constraint function values may indicate whether a particular chromosome data structure is within the feasible solution set. If the respective constraint function values identify at least one feasible solution (e.g., chromosome data structure) within the feasible solution set, then the feasible solution will be returned in block 914 for further processing.

On the other hand, if no feasible solution is identified in block 912, then processing may proceed to block 916. In block 916, the slave processor 108 may perform constraint non-domination sorting of the child population of chromosome structures to identify an elite set of chromosome data structures based at least in part on the corresponding constraint function values. Constraint non-domination sorting may operate by performing non-domination sorting, where the constraint functions defining constraints on the feasible solution set are treated as the objective functions for purposes of the non-domination sorting. In an example embodiment, the constraint non-domination sorting may use the respective constraint function values to determine which of the chromosome data structures from the child population are non-dominated by other solutions when considering the respective constraint function values corresponding to the constraint functions. In other words, the best solutions that are approaching feasibility are maintained by the elite set of chromosome data structures.

In block 918, a new generation/iteration is performed using a number of parent chromosome data structures from the previous generation/iteration. In particular, in block 918, the parent chromosome data structures were obtained from the elite set of chromosome data structures provided from block 916. Accordingly, following block 918, the new generation/iteration performs the selection process in block 904 as well as the evolutionary operations (e.g., blocks 906 and 908) to generate another child population of child chromosome data structures. Again, block 912 determines whether a feasible solution can be identified in the child population, and if so, processing proceeds to block 914 where a feasible solution is returned. Otherwise, processing proceeds again to blocks 916 and 918, where yet another generation/iteration is performed using a number of parent chromosome data structures from the previous generation/iteration.

It will be appreciated that ultimately a feasible solution will be returned by block 914, or otherwise, the number of generations/iterations may reach a maximum number that terminates the example process in FIG. 9 for generating a random feasible solution.

E. Generate Feasible Solution from Two Parents

Figure 10:
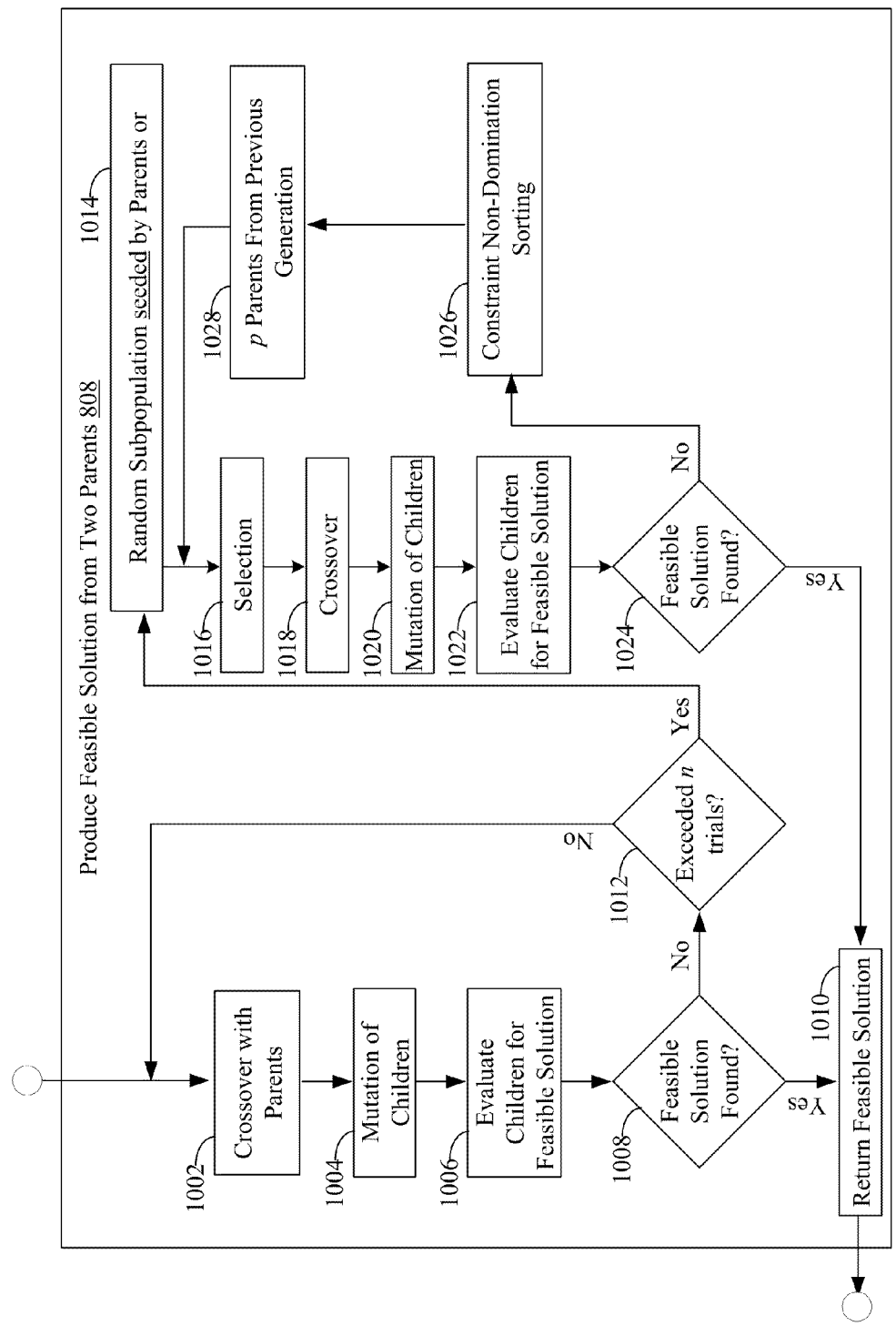
FIG. 10 illustrates an example flow diagram for generating a feasible solution from chromosomes of two parent chromosome data structures, according to an example embodiment of the invention.

FIG. 10 illustrates an example process for generating a feasible solution from chromosomes of two parent chromosome data structures, according to an example embodiment of the invention. The example process of FIG. 10 may be utilized for block 808 of FIG. 8, according to an example embodiment of the invention. It will be appreciated that the example process for generating random feasible solutions from chromosomes of two parent chromosome data structures are provided by way of example only, and that many variations are available without departing from example embodiments of the invention.

Referring now to FIG. 10, in block 1002, chromosomes from a pair of parent chromosome data structures may be received by the slave processor 108 in a chromosome bundle from the master processor 106. In block 1002, an evolutionary operator such as a crossover operator may be applied to the chromosomes of the pair of parent chromosome data structures such that a portion of the parameter values or "gene" values may be exchanged between chromosomes of the selected pairs of parent chromosome data structures to generate a new pair of child chromosome data structures. In block 1004, either child chromosome data structure may be subject to another evolutionary operator such a mutation operator in which a parameter value or gene value (e.g., an evolved variable value) in the child chromosome data structure may be varied or otherwise changed to another value by a mutation of the child chromosome data structure.

It will be appreciated that the crossover evolutionary operator and the mutation evolutionary operator need not necessarily be applied to genes of each received chromosome of a chromosome data structure. In an example embodiment of the invention, only a portion or percentage of the received chromosomes of the chromosome data structures in blocks 1002 and 1004 may have genes that are crossed-over or mutated, respectively. The respective portions or percentages that are crossed-over and/or mutated may be predetermined or dynamically varied during operation of evolutionary algorithm, according to an example embodiment of the invention. For example, a first predetermined portion or percentage (e.g., 50%-80%) of the received chromosomes of the chromosome data structures may have genes that are crossed over in block 1002 while a second predetermined percentage or portion (e.g., 1%-3%) of the received chromosomes of the chromosome data structures may have genes that are mutated in block 1004. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 1002 and 1004 may be available without departing from example embodiments of the invention. Likewise blocks 1002 and 1004 may be performed in a different order than that shown in FIG. 10 or otherwise combined into a single block without departing from example embodiments of the invention.

Following block 1004, processing may proceed to block 1006 in which the child chromosome data structure received from block 1006 may be evaluated according to a plurality of constraint functions that define constraints on a feasible solution set. When the slave processor 108 evaluates the child chromosome data structure in block 1006 according to the plurality of constant functions, a respective plurality of constraint function values may be obtained.

In block 1008, the slave processor 108 may determine the evaluated child chromosome data structure is a feasible solution that is within the feasible solution set. Indeed, the respective constraint function values may indicate whether the child chromosome data structure is within the feasible solution set. If the respective constraint function values identify the child chromosome data structure as being within the feasible solution set, then the feasible solution will be returned in block 1010.

On the other hand, if no feasible solution is identified in block 1008, then processing may proceed to block 1012. Block 1012 may provide a maximum number of trials for performing the operations of blocks 1002, 1004, 1006, and 1008. If the maximum number of trials has not been exceeded, then processing may proceed to block 1002 for the operation of a subsequent trial. It will be appreciated that in a subsequent trial, the crossover and mutation in blocks 1002 and 1004 may result in different children being available for evaluation in block 1006 even though the same parent chromosomes are being used. Ultimately, either feasible solution will be identified by block 1008 or the maximum number of trials will be reached in block 1012 without identifying a feasible solution. If the maximum number of trials is reached in block 1012 without identifying a feasible solution, then processing may proceed to block 1014.

In block 1014, another evolutionary subprocess may be initiated using a subpopulation of chromosome data structures. In particular, the subpopulation may include a randomly generated subpopulation of chromosome data structures. In addition, in block 1014, the subpopulation may be seeded by the two parent chromosome data structures received by the slave processor 108 in the bundle from the master processor 106. Indeed, when processing reaches block 1014, this means that no feasible solution was found when using both parents in isolation. Therefore, a more diverse pool is provided by introducing a subpopulation of randomly generated chromosome data structures. The seeding by the two parent chromosome data structures enables or provides a potentially greater likelihood of generating more fit solutions. In particular, with seeding, the parents have a greater likelihood of being selected because of their better fitness in the constraint space (e.g., better than random, or much better than random), and their mixing with random solutions helps to ensure that more optimal solutions are generated. The subpopulation of the chromosome data structures may be evaluated according to a plurality of constraint functions that define constraints on a feasible solution set. Thus, members of the subpopulation may be associated with respective constraint values.

In block 1016, the slave processor 108 may select pairs of chromosome data structures from the subpopulation of chromosome data structures in block 1014. In an example embodiment of the invention, the selection of the pairs of parent chromosome data structures may occur according to a tournament selection process, which may include a crowded tournament selection process. An example tournament selection process in accordance with an example embodiment of the invention may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the invention. The winners of each tournament become the two parents resulting from the selection process of block 1016.

It will be appreciated that a predetermined number of pairs of parent chromosome data structures may be selected in block 1016. It will also be appreciated that a particular parent chromosome data structure may be present in two or more selected pairs of parent chromosome data structures, according to an example embodiment of the invention.

Following block 1016, the chromosomes of the selected pairs of parent chromosome data structures may be subject to one or more evolutionary operators to generate a child population of chromosome data structures, according to an example embodiment of the invention. Two example evolutionary operators are illustrated by blocks 1018 and 1020. For example, block 1018 illustrates a crossover evolutionary operator in which a portion of the parameter values or "gene" values may be exchanged between chromosomes of selected pairs of chromosome data structures to generate new pairs of chromosome data structures. As another example, block 1020 illustrates a mutation evolutionary operator in which a parameter value or gene value (e.g., an evolved variable value) of a chromosome in a chromosome data structure may be varied or otherwise changed to another value by a mutation.

It will be appreciated that the crossover evolutionary operator and the mutation evolutionary operator need not necessarily be applied to each received chromosome of a chromosome data structure. In an example embodiment of the invention, only a portion or percentage of the genes of the received chromosomes of the chromosome data structures in blocks 1018 and 1020 may be crossed-over or mutated, respectively. The respective portions or percentages that are crossed-over and/or mutated may be predetermined or dynamically varied during operation of evolutionary algorithm, according to an example embodiment of the invention.

For example, a first predetermined portion or percentage (e.g., 50%-80%) of the received chromosomes of the chromosome data structures may have genes that are crossed over in block 1018 while a second predetermined portion or percentage (e.g., 1%-3%) of the received chromosomes of the chromosome data structures may have genes that are mutated in block 1020. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 1018 and 1020 may be available without departing from example embodiments of the invention. Likewise blocks 1018 and 1020 may be performed in a different order than that shown in FIG. 10 or otherwise combined into a single block without departing from example embodiments of the invention.

By applying one or more evolutionary operators to chromosomes of the selected pairs of parent chromosome data structures, a new child population of child chromosome data structures may be obtained and evaluated in block 1022. In particular, block 1022 may evaluate the child population according to a plurality of constraint functions that define constraints on a feasible solution set, as similarly described with respect to block 1006. When the slave processor 108 evaluates the child population in block 1022 according to the plurality of constraint functions, a respective plurality of constraint function values may be obtained for each chromosome data structure in child population.

In block 1024, the slave processor 108 may determine whether a feasible solution is found within the evaluated child population of chromosome data structures. For example, block 1024 may include analyzing the respective constraint function values for each chromosome data structure in the child population. Indeed, the respective constraint function values may indicate whether a particular chromosome data structure is within the feasible solution set. If the respective constraint function values identify at least one feasible solution (e.g., chromosome data structure) within the feasible solution set, then the feasible solution will be returned in block 1010.

On the other hand, if no feasible solution is identified in block 1024, then processing may proceed to block 1026. In block 1026, the slave processor 108 may perform constraint non-domination sorting of the child population of chromosome structures to identify an elite set of chromosome data structures based at least in part on the corresponding constraint function values. Constraint non-domination sorting may operate by performing non-domination sorting, where the constraint functions defining constraints on the feasible solution set are treated as the objective functions for purposes of the non-domination sorting. In particular, the constraint non-domination sorting using the respective constraint function values to determine which of the chromosome data structures from the child population are non-dominated by other solutions when considering the respective constraint function values corresponding to the constraint functions. In other words, the best solutions that are approaching feasibility are maintained by the elite set of chromosome data structures.

In block 1028, a new generation/iteration is performed using a number of parent chromosome data structures from the previous generation/iteration. In particular, in block 1028, the parent chromosome data structures were obtained from the elite set of chromosome data structures provided from block 1026. Accordingly, following block 1028, the new generation/iteration performs the selection process in block 1016 as well as the evolutionary operations (e.g., blocks 1018 and 1020) to generate another child population of child chromosome data structures. Block 1024 again determines whether a feasible solution can be identified in the child population, and if so, processing proceeds to block 1010 where the feasible solution is returned. Otherwise, processing proceeds to blocks 1026 and 1028, where yet another generation/iteration is performed using a number of parent chromosome data structures from the previous generation/iteration. It will be appreciated that ultimately a feasible solution will be found by block 1024, or otherwise, the number of generations/iterations may reach a maximum number that terminates the example process for generating a random feasible solution.

V. Application Program Interface/General Representation

An example application program interface (API) will now be described with reference to FIG. 11. The API illustrated in FIG. 11 allows one or more objective blocks 1102, function blocks 1104, arguments blocks 1106, genes blocks 1108, output blocks 1112, settings blocks 1114, program blocks 1118, and plug-in blocks 1116 to be present within a single group of API blocks 1120. The collection of API blocks 1120 may be represented according to an input file or a graphical user interface.

Figure 11:
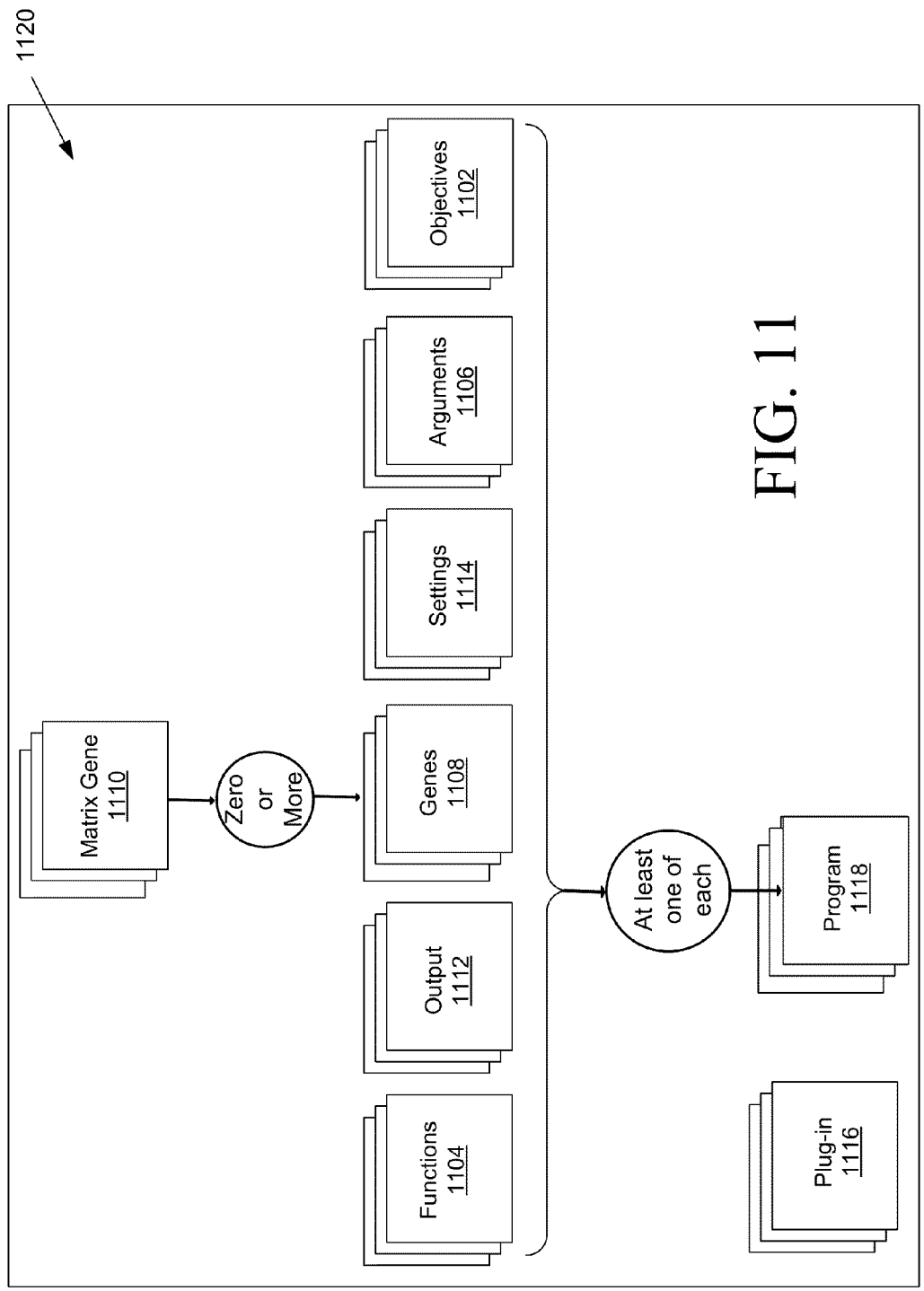
FIG. 11 illustrates an example block diagram representation of an application program interface (API), according to an example embodiment of the invention.

In FIG. 11, each program block 1118 may have an attached or associated objective block 1102, function block 1104, arguments block 1106, genes block 1108, output block 1112, and settings block 1114. In addition, some genes blocks 1108 may optionally include one or more matrix genes 1110. The program block 1118 may be provided as an input argument for the evolutionary software program that is operative to run one or more jobs in which an evolutionary algorithm is utilized in solving multi-objective optimization problem. In addition, one or more plug-in blocks 1116, which may be present within a grouping of API blocks 1120, may be loaded, active, and accessible by the evolutionary software program.

Still referring to FIG. 11, blocks 1102-1116 will now be described in further detail. The objectives blocks 1102 may provide declarations of objectives and associated parameters. The functions block 1104 may provide a user-defined declaration of functions that will be used for a particular job. The arguments block 1106 may provide for declaration of user-defined arguments. The genes block 1108 may provide for declaration of chromosome data structures (e.g., declaration of evolved variables, fixed values/constants, derived variables). The output block 1112 may provide specifications for an output file or other output format. The settings block 1114 may define evolutionary algorithm parameters and run-time settings. The plug-in block 1116 may provide a declaration of independent code or external software to be embedded within the evolutionary software program for a particular job.

The blocks introduced in FIG. 11 and further illustrated in FIGS. 12A-19B provide mechanisms for defining the optimization problem to be solved (e.g., function blocks 1104, genes blocks 1108, objectives blocks 1102, arguments blocks 1106, plug-in blocks 1116, etc.) and specifies the associated parameters (e.g., settings and output) required for the program block 1118. It will be appreciated that the blocks described herein may be interpreted in the form on an input file, a graphical user interface, or a combination thereof.

Indeed, the program block 1118 may serve as an entry point where other blocks may be combined to represent a particular problem. Multiple representations of a problem may be provided in respective program blocks 1118 that are part of the collection of API blocks 1120. As an example, the program block 1118 may serve as an application program interface (API) for the evolutionary software program, external plug-ins or other functions, and user-specifications associated with running a job/simulation by the evolutionary software program. As an example, a computer such as the manager processor 104 may include a memory for storing computer-executable instructions for the application program interface. The computer processor, which is in communication with the memory, may be configured to execute the computer-executable instructions to present the application program interface to enable a user of the application program interface to perform the following:

specify an evolutionary algorithm used to solve a particular problem (See, e.g., PROG_TYPE in FIG. 19A).

specify a location (e.g., network location, disk/memory location) for storing outputs from the evolutionary software program (See, e.g., RESULTS_DIRECTORY in FIG. 19A), specify parameters (See, e.g., settings block 1114), including parameters associated with the evolutionary algorithm, wherein the evolutionary algorithm executes in accordance with the specified parameters;

define one or more chromosome data structures (See, e.g., genes block 1108 and matrix gene 1110), including a chromosome data structure that includes a plurality of variables that are permitted to evolve in accordance with execution of the evolutionary algorithm in order to generate one or more child chromosome data structures;

identify one or more functions (e.g., objective function, infeasible search space function, pre-processing function, post-processing function, etc.) and associated parameters (See, e.g., functions block 1104), including objective functions and parameters for evaluating chromosome data structures, including the generated one or more child chromosome data structures;

define an output format (See, e.g., Output Block 1112) for providing one or more optimal chromosome data structures as designs and their associated objective function values;

define objectives associated with one or more identified functions (See, e.g., objectives block 1102), including an optimization direction (e.g., minimize, maximize), define arguments (See, e.g., arguments block 1106), which may be used by the evolutionary software program, perhaps when performing a calculation for an objective function or another function, and specify one or more plug-ins comprising third-party software, functions, or code that is accessible by the evolutionary software program.

FIG. 12A illustrates an example input file text 1202 for implementing an example objectives block 1102, according to an example embodiment of the invention. As shown in FIG. 12A, the input file text 1202 associated with the objectives block 1102 may include the following fields:

NAME: A name specified for the set of objectives (e.g., car_objectives in FIG. 12A). This name will be called out in the Program Block 1118 to specify which Objective Block 1102 is being used for a given job/simulation by the evolutionary software program.

OBJ_NUM: Each individual objective is identified using a particular objective number (e.g., using a zero-index in which the first objective is identified with an OBJ_NUM of "0"). These objective numbers OBJ_NUM are associated with an array of objective values being returned from a user-defined objective function FUNC_OBJECTIVE (see the Functions Block 1104).

TAG: Each individual objective may be further identified using a tag (e.g., a name specific to the objective). It is appreciated that the tag may be reused in the output to associate columns of objective function data with their associated objective function names.

OPT_DIRECTION: An optimization direction for each objective that is specified (e.g., MAXIMIZE or MINIMIZE)

SCALING_LIMITS: It may be advantageous, from an evolutionary search effectiveness perspective, to scale the objective values between a predetermined range. Objective scaling may be enabled by specifying "YES" following the recitation of the SCALING_LIMITS. On the other hand, objective scaling is not used if "NO" follows the SCALING LIMITS. The SCALING_LIMITS may specify the predetermined range by providing a lower limit (e.g., 0.0) and an upper limit (e.g., 1.0), according to an example embodiment of the invention. The SCALING_LIMITS may be dynamically adjusted as part of an evolutionary search, according to an example embodiment of the invention.

EPSILON VALUE: The epsilon spacing or step size used to create a computational grid (for two objectives), volume (for three objectives), hypervolume (for four+objectives), etc. that allows for the assignment of box fitness to each design (used for epsilon non-domination sorting and/or run termination detection, as described herein).

Figure 12B:
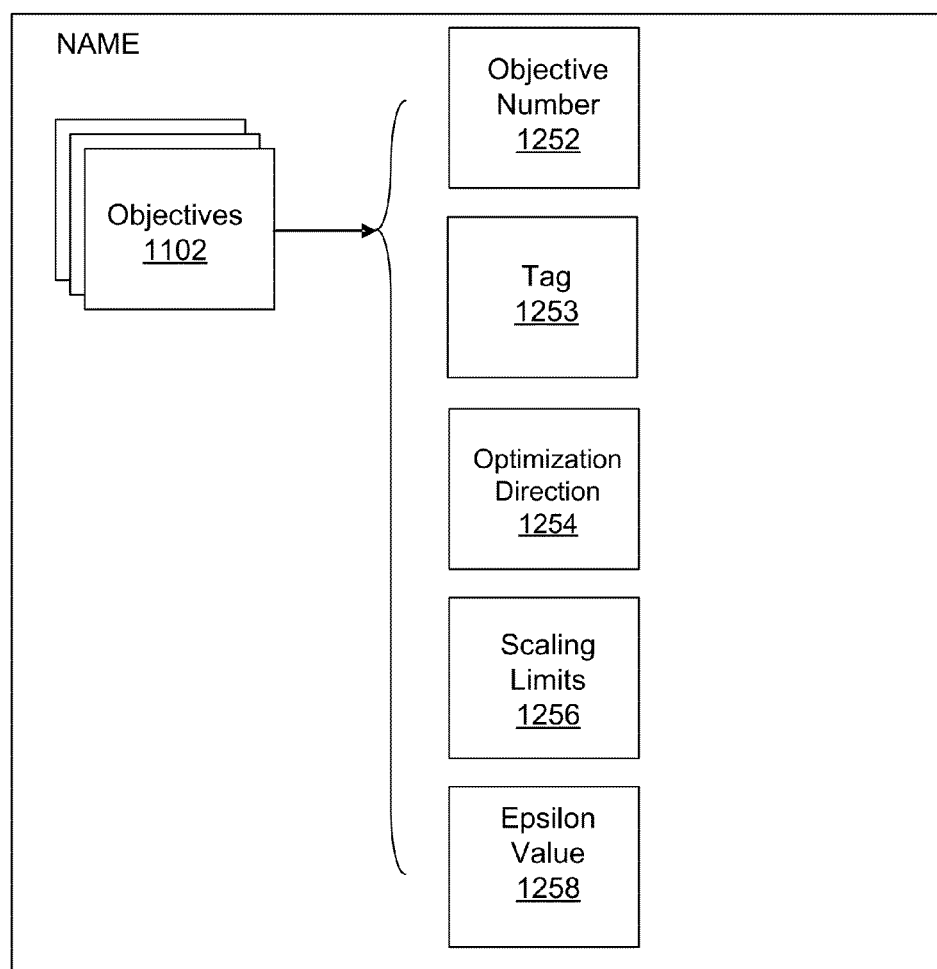
FIG. 12B provides an example block diagram for illustrating the objectives block, according to an example embodiment of the invention.

FIG. 12B provides an example block diagram for illustrating the objectives block 1102. As shown in FIG. 12B, an example objectives block 1102 may be comprised an objective number 1252 (e.g., OBJ_NUM), a tag 1253 (e.g., TAG), an optimization direction 1254 (e.g., OPT_DIRECTION), scaling limits 1256 (e.g., SCALING_LIMITS), or epsilon value 1258 (e.g., EPSILON VALUE), as similarly described with respect to FIG. 12A.

FIG. 13A illustrates an example input file text 1302 for implementing an example functions block 1104. In an example embodiment of the invention, the example input file text 1302 may identify user-defined functions. The user-defined functions may be well-defined functions that, when implemented and declared to the evolutionary software program, will be called upon to perform a specific task. As shown in FIG. 13A, the input file text 1302 associated with the functions block 1104 may include the following:

NAME: This is the name that will be called out in the program block 1118 to specify which function block 1104 is being used for a given job/simulation by the evolutionary software program (e.g., car_functions).

In addition, the input file text 1302 associated with the functions block 1104 may provide fields that identify the available functions for a given job/simulation by the evolutionary software program, which may include the following:

FUNC_OBJECTIVE: An identification of the application source code or module for one or more objective functions.

FUNC_INFEASIBLE: An identification of the application source code or module for an infeasible search space function. If the optimization problem for a given job/simulation has infeasible search space, a user may provide an infeasibility check by providing an infeasible search space function to determine if the solutions are within the feasible space.

FUNC_PREPROCESS: An identification of the application source code or module for a pre-process function. The pre-process function is associated with startup processing for a given job/simulation. When a pre-process function is specified, it may be called after an input file has been parsed but before chromosome data structures are evaluated.

FUNC_POSTPROCESS: An identification of the source code or module for a post-process function. The post-process function is associated with shutdown processing for a given job/simulation. When a post-process function is specified, it is called after the evolutionary algorithm has finished processing but before the evolutionary software program shuts down.

FUNC_ENDOFGEN: An identification of the source code or module for performing application processing at the completion of each generation/iteration. (e.g., 221, 621).

FUNC_RUN_TERMINATION: An identification of the source code or module for a run termination function.

FUNC_REPORT_VTK_*: The evolutionary software program output may interface with high-dimensional visualization tools. These functions provide for the ability to produce that output according to formatting specification that the high-dimensional visualization tools require.

FUNC_REPORT_ENDOFGEN: The evolutionary software program standard output may include detailed generational data. These functions allow for the production of generational data in a user-specified format.

It will be appreciated that the functions identified in input file text 1302 may be stored in a software library, database, or other computer storage medium. The evolutionary software program may be operable to access the identified functions via the software library, database, or other computer storage medium that is located in a path specified by the input file for the evolutionary software program.

Figure 13B:
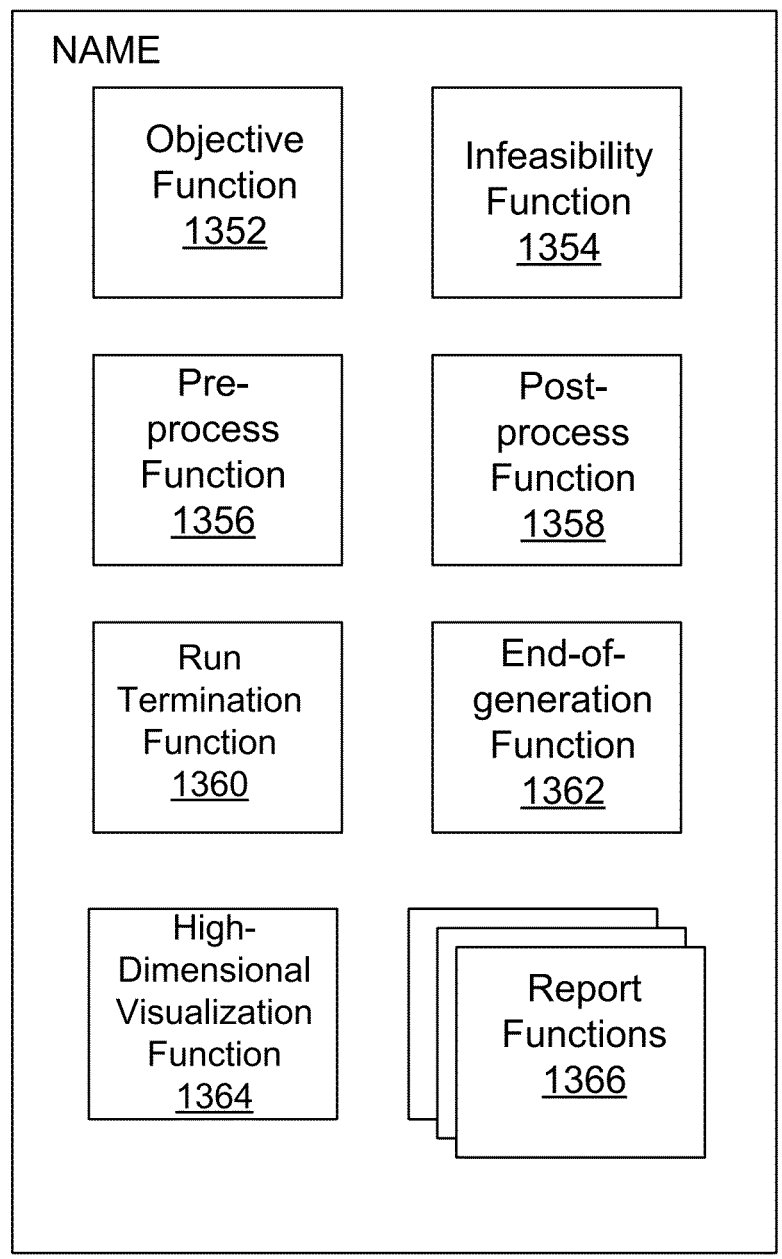
FIG. 13B provides an example block diagram for illustrating an example functions block, according to an example embodiment of the invention.

FIG. 13B provides an example block diagram for illustrating the functions block 1104. As shown in FIG. 13B, an example functions block 1104 may be comprised of an objective function 1352 (e.g., FUNC_OBJECTIVE), an infeasibility function 1354 (e.g., FUNC_INFEASIBLE), a pre-process function 1356 (e.g., FUNC_PREPROCESS), a post-process function 1358 (e.g., FUNC_POSTPROCESS), a run termination function 1360 (e.g., FUNC_RUN_TERMINATION), an end-of-generation function 1362 (e.g., FUNC_ENDOFGEN), a high-dimensional visualization function 1364 (e.g., FUNC_REPORT_VTK_*), and one or more report functions 1366 (e.g., FUNC_REPORT_ENDOFGEN).

FIG. 14A illustrates an example input file text 1402 for implementing an example arguments block 1106. In an example embodiment of the invention, the example input file text 1402 may identify user-defined arguments. For example, these user-defined arguments, when implemented and declared to the evolutionary software program, may be used in the application code (e.g., as a fixed value/constant in an objective function calculation). As shown in FIG. 14A, the input file text 1402 associated with the functions block 1104 may include the following:

NAME: This is the name that will be called out in the program block 1118 to specify which arguments block 1106 is being used for a given job/simulation by the evolutionary software program (e.g., car arguments).

Each argument in the input file text 1402 is specified by a type, tag, and value. Example argument types may include the following: double precision number, integer, character(s), Boolean, pair of double precision numbers, pair of integers, array of double precision numbers, array of integers, or file/spreadsheet. Other argument types may be available without departing from example embodiments of the invention. The tag may be used to reference those variables that can be used in the application source code. The value may be a single number, string, array, or identification of a file such as a spreadsheet (with some formatting tags).

An example of how arguments are used in application source code by the program block 1118 will now be described. Suppose there is a calculation of the weight of a particular car. The application source code may specify the calculation as follows:

MASS=length*width*height*model_density[i], where 'i' might be associated with a particular model. The evolutionary software program can then determine the value for the length, width, height, and model_density[i] arguments by referencing the corresponding values in FIG. 14A. For instance, length=78.0, width=30, height=60, and the model_density[0] corresponding to the first model=1.1. It will be appreciated that the example arguments may be used with user-defined functions (e.g., object functions, report generation, etc.).

Figure 14B:
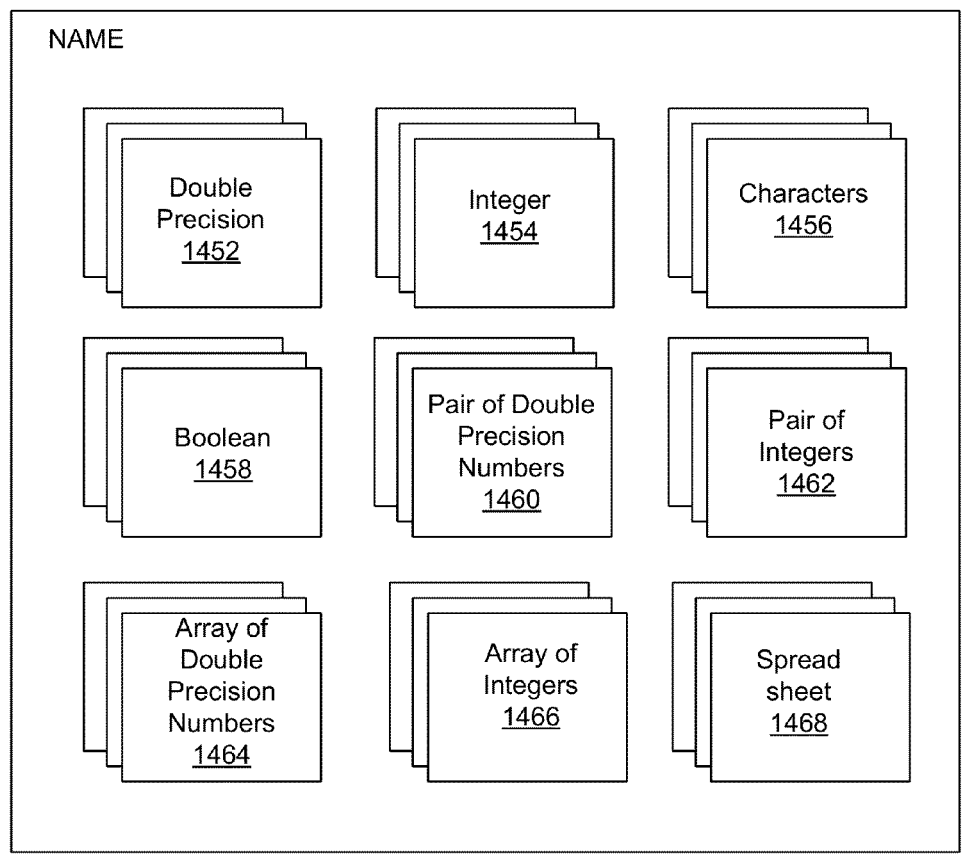
FIG. 14B illustrates an example block diagram for illustrating an example arguments block, according to an example embodiment of the invention.

FIG. 14B illustrates an example block diagram for illustrating the arguments block 1106. As shown in FIG. 14B, the example argument types may correspond to the following:

Double precision 1452,
Integer 1454,
Characters 1456,
Boolean 1458: Defines two possible values (e.g., TRUE/FALSE),
Pair of Double Precision Numbers 1460: Defines two Double Precision Numbers,
Pair of Integers 1462: Defines two integers,
Array of Double Precision Numbers 1464,
Array of Integers 1466, or
File/Spreadsheet 1468.

It will be appreciated that a plurality of combinations with a plurality of each argument type is possible without departing from example embodiments of the invention.

FIG. 15A illustrates an example input file text 1502 for implementing an example genes block 1108. In an example embodiment of the invention, the example input file text 1502 may declare all variables that are being optimized (evolved) along with derived variables and fixed value/constant types. As shown in FIG. 15A, the input file text 1502 associated with the genes block 1108 may include the following:

NAME: This is the name that will be called out in the program block 1118 to specify which genes block 1108 is being used for a given job/simulation by the evolutionary software program (e.g., car_genes).

In addition, the input file text 1502 associated with the genes block 1108 may also allow one or more of the following four types of genes to be declared:

Integer genes (GENE_INT),
Double Precision genes (GENE),
Gaussian genes (GENE_GAUSSIAN), and/or
Matrix genes (GENE_MATRIX).

Integer genes, double precision genes, and Gaussian genes may be specified using a combination of an index assignment (INDEX ASSIGN), a name (TAG), and limit (LIMITS). Using a zero base, the INDEX ASSIGN NUM may be set to "0" if only one variable is added to the chromosome data structure. That added variable can take any value between the LIMITS specified and has the variable name associated with the TAG. When the INDEX ASSIGN NUM is non-zero, a list of genes may be added to the chromosome accessible by the TAG name with the assigned index number appended. For example the third "myFloat" gene of the twenty "myFloat" genes would have variable name myFloat_2 (if starting from a zero base).

Integer and double precision genes may use a uniform distribution to randomly generate a variable value within the specified LIMITS. The Gaussian gene may operate similarly to the integer and double precision genes except that the number is pulled from a Gaussian distribution whose parameters (limits describing the distribution) may be specified by the RANDOM_SIGMAS block illustrated in FIG. 15A. It will be appreciated that different RANDOM_SIGMAS may be specified for each of a plurality of Gaussian genes without departing from an example embodiment of the invention. For example, two chromosomes may specify Gaussian genes, but each of those Gaussian genes may be associated with different Gaussian distributions based upon the specified RANDOM_SIGMAS. It will be appreciated that other distributions may be utilized as well instead of a uniform distribution or a Gaussian distribution without departing from example embodiments of the invention. In addition to integer, double precision, and Gaussian genes, there may also be a matrix gene (GENE_MATRIX) declared in the input file text 1502. The matrix genes will be described in further detail with respect to FIGS. 15B and 15C. In an example embodiment of the invention, referring to the values declared in the RANDOM_SIGMAS block, a single Gaussian parameter, sigma, is randomly selected by the following algorithm: 1) a sigma_low is obtained by producing a uniform random number between LOW_MIN and LOW_MAX; 2) a sigma_high is obtained by producing a uniform random number between HIGH_MIN and HIGH_MAX; and 3) the Gaussian parameter, sigma, is obtained by producing a uniform random number between sigma_low and sigma_high. It will be appreciated that the above algorithm allows for a weighting towards a lower or higher Gaussian parameter, sigma.

Figure 15B:
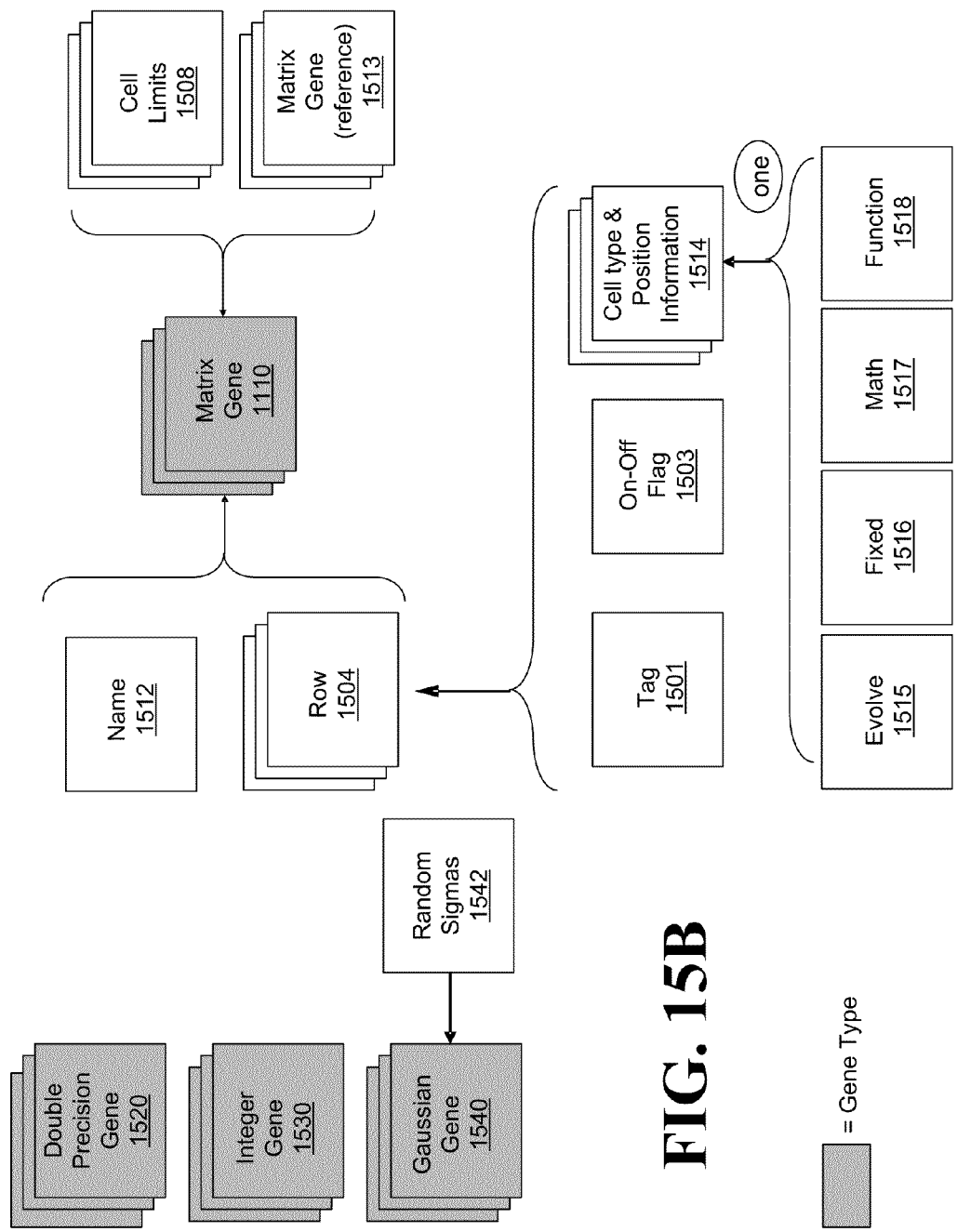
FIG. 15B illustrates an example block diagram for illustrating an example genes block, according to an example embodiment of the invention.

FIG. 15B illustrates an example block diagram for illustrating the genes block 1108. FIG. 15B illustrates four types of genes that may be introduced into a chromosome data structure. Indeed, only a portion of these four types of genes may be present in a chromosome data structure. The four types of genes may include one or more matrix genes 1110 (e.g., GENE_MATRIX), double precision genes 1520 (GENE), integer genes 1530 (GENE_INT), and Gaussian genes 1540 (GENE_GAUS). Each Gaussian gene 1540 may be associated with a Random Sigmas 1542 for defining the parameters of the associated Gaussian distribution. The parameters of the Gaussian distribution may be used to produce values for a Gaussian gene 1540.

Each matrix gene 1110 may include a name, as represented by the name 1512. The name may allow a particular matrix gene 1110 to be referenced by one or more other matrix genes 1110 (e.g., as with Matrix Gene (reference) 1513). It will be appreciated that a particular matrix gene 1110 may reference another matrix gene 1110 a plurality of times to provide a respective plurality of instances of that matrix gene.

Each matrix gene 1110 may include a plurality of rows 1504. Each row 1504 may also include an ON-OFF inclusion indicator 1503 that may allow the variables that make up the row 1504 to be turned ON or OFF. When ON-OFF is in the YES state, only the variables whose rows of the matrix gene 1110 are turned on are presented to the function evaluation code. Accordingly, the length of the variables in the chromosome data structure may effectively be variable. Each row 1504 may also include a tag 1501, thereby allowing for the function evaluation code to reference a particular row 1504. Each row 1504 may also include the cell type & position information 1514. The cell type may be one of the following:

Evolved Variable (Evolve 1515): A gene within the chromosome data structure that may be evolved by the evolutionary algorithm. Each evolve variable may be one of the following:
  i. Evolved Double Precision Variable (EVOLVE): The gene may have particular non-integer precision (e.g., double precision, etc.) and be constrained to limits and initialized according to a random distribution (e.g., a uniform random distribution);
  ii. Evolved Integer Variable (EVOLVE_INT): A gene within the chromosome data structure that may be evolved by the evolutionary algorithm. The gene may have integer precision and be constrained to limits and initialized according to a random distribution (e.g., a uniform random distribution);
  iii. Evolved Gaussian Variable (EVOLVE_GAUS): A gene within the chromosome data structure that may be evolved by the evolutionary algorithm. The gene may have double precision, and be constrained to limits and initialized according to a Gaussian distribution.

Static Variable (Fixed 1516): A fixed value or constant that is not evolved by the evolutionary algorithm. A value of the static variable may have floating point precision (e.g., double precision) or integer precision.

Math Variable (Math 1517): A variable may be derived based upon an equation using operands comprising either constants or variables that specify values from other elements specified within the matrix gene 1110. The variable names may follow the name convention <alphabetic character><number>, where the <alphabetic character> may specify the column position of elements within the matrix gene 1110, and the <number> may specify the row position of elements within the matrix gene 1110. It will be appreciated that a math variable may be a fixed or constant value (double precision or integer precision).

Function Variable (Function 1518): A variable may be produced by a function call, which may include calling arguments of a plurality of other constants, and variables from the matrix gene 1110.

In addition, a linkage indicator may be declared for each evolved variable cell type 1515 (EVOLVE, EVOLVE_INT, EVOLVE_GAUS) that is included in the matrix gene 1110. In particular, the linkage indicator ties evolved variables across the rows of the matrix gene 1110 such that the same evolved variable value may be used by the system. All rows may refer to the same evolved variable or different evolved variables, as described below in FIG. 15C.

FIG. 15C illustrates an example input file text 1560 for implementing an example matrix gene 1110. As shown in FIG. 15C, each matrix gene 1110 may include a "NAME". The "NAME" given to any particular matrix gene 1110 is referenced by gene block 1108 and/or by other matrix genes 1110, thereby allowing for a hierarchical structure for chromosome data structure construction. For example, the example input file text 1560 for a particular matrix gene 1110 refers to two other matrix gene blocks 1513 (e.g., GENE_MATRIX . . . car_gene_matrix2; and GENE_MATRIX . . . car_gene_matrix3).

For purposes of the evolutionary software program, chromosome data structures may be fixed length; however, variable length chromosomes may be simulated using an ON-OFF inclusion indicator. In particular, the variables that make up each row of the matrix gene can be turned ON or OFF, which effectively simulates a variable length chromosome data structure. For example, when the ON-OFF inclusion indicator is set to YES, only the variables whose row cells are turned on are presented to the function evaluation code.

Following the ON-OFF inclusion indicator for each row of the matrix gene are any number of variables that may take one of four cell types: 1) evolved (EVOLVE, EVOLVE_INT, EVOLVE_GAUS), 2) fixed/constant value (Fixed 1516), 3) value generated by a mathematical equation (Math 1517), or 4) value provided by a function call (Function 1518), where the EVOLVE, EVOLVE_INT, and/or EVOLVE_GAUS variables define the chromosome data structure. Accordingly, the ability to include any of foregoing matrix gene types may allow for general representation used in construction of virtually any searchable variable space where some variables need to be optimized (e.g., EVOLVE, EVOLVE_INT, EVOLVE_GAUS), while others remain fixed (e.g., Fixed

1516) after being initiated/assigned, and yet others are derived from existing variables or functions (e.g., Math 1517, Function 1518).

As also illustrated in FIG. 15C are the LIMITS keywords corresponding to the EVOLVE, EVOLVE_INT, and EVOLVE_GAUS variable types. The LIMITS keywords in the matrix gene are followed by the column (COL) indication keyword which corresponds to the column letter (or alternatively, a number) of the matrix that indicate which the proceeding arrays of numbers or function names correspond to. These LIMITS define a range having a lower limit and an upper limit for values of the EVOLVE, EVOLVE_INT, and EVOLVE_GAUS variables.

In the example input file text 1560 of FIG. 15C, the strings of variables, fixed values/constants, and derived variables have the ON-OFF inclusion indicator (i.e., ONOFF) set to YES. As the evolutionary software program evolves the solutions for a given job/simulation, the variables (e.g., CELLs) for a given ROW will be turned to YES ("1") or NO ("0") to make the variables within the given row visible (YES)/invisible (NO) for function evaluation (i.e. thereby simulating variable length chromosome data structures). In an example embodiment of the invention, cost may be one of the objectives in a car optimization problem. If the evolutionary software program produces a "1" for the ON-OFF inclusion indicator of car_gene_matrix ROW 0 (e.g., car1 variables for a first car) and a "0" for the ON-OFF inclusion indicator for the other car_gene_matrix ROWs, it would be a much cheaper chromosome data structure than if all four cars had a "1". On the other hand, if the ON-OFF inclusion indicator for all four car_gene_matrix ROWs were set to "1" for "ON", then all four car_gene_matrix ROWs would contribute their variables to the chromosome data structure construction. It will be appreciated that the ROWs of a given matrix gene 1110 may include different numbers of variables (e.g., CELLs), and therefore a different number of columns. Each row of the matrix gene 1110 may also include a TAG for referencing the particular row, perhaps by the application source code or within output reports.

Referring more particularly to the input file text 1560 of FIG. 15C, the first column (A) of each ROW refers to EVOLVE variable types along with a following "0". The "0" here is a linkage indicator specifying that all EVOLVE variables within the same column may be the same variable. This means that all of these EVOLVE variable types have the same value when searched by GRIPS and the LIMITS for the search correspond to range between 0.0 and 1.0 [LIMITS COL=A, (0.0,1.0);].

In the second column (B) of each ROW, there are two FIXED VARIABLES. In particular, the rows of car1 and car2 have the same fixed variable value of 1.0, while the rows of car3 and car4 have the same fixed value of 2.0.

Next, the third column (C) indicates that the car1, car2, car3, and car4 ROWs, will each have independent, searched integers that range between 100 and 200 [LIMITS COL=C, (100,200);]. It will be appreciated that the "0", "1", "2" or "3" following each of the EVOLVE_INT in column C are linkage indicators specifying that each of the EVOLVE_INT cells may be separate variables. This means that each of the EVOLVE_INT variable types having the different values when searched by the evolutionary software program and the LIMITS for the search correspond to the range between 100 and 200 [LIMITS COL=C, (100, 200);].

The fourth column (D) indicates that both car1 and car2 ROWs call the same function myFunc0 to derive their variable value, while car3 and car4 each have their own derived myFunc1 and myFunc2. In the last column (E), the car1 ROW has a fixed value of 5.0, the car2 ROW has a fixed value of 6.0, the car3 ROW has a fixed value of 7.0, and the car4 CELL has a fixed value of 8.0.

In addition, the example input file text 1560 of FIG. 15C also illustrates the ability to specify math operations used to produce values for derived variables. Indeed, math operations and derived function arguments can utilize any of the cells within the matrix gene 1101. Examples operators supported by the math operations may include addition ("+"), subtraction ("−"), division ("/"), multiplication ("*"), exponential operations ("^"), logarithmic and natural logarithmic operations, sine/cosine/tangent operations, root-based operations, calculus-based operations, algebraic-based operations, and yet other math operations. For example, in FIG. 15C, example math operations include the product of A0 and A1 (A0*A1), and the sum of B0 and C0 raised to the C1 power ((B0+C0)^C1), where the values A0, A1, B0, C0, and C1 refer to the column (e.g., COL=A, B, C, etc.) and ROW (e.g., 0, 1, 2) of the matrix subblocks. The example input file text 1560 of FIG. 15C also illustrates the ability to specify derived functions with calling arguments—for example, function myfunc0 (A0, A1). It will also be appreciated that a plurality of cells are available to the math derived variables as well as a plurality of any combination of nested parentheses in accordance with an example embodiment of the invention.

FIG. 16A illustrates an example input file text 1602 for implementing an example output block 1112. In an example embodiment of the invention, the example input file text 1502 may be used to provide the user with one or more preformatted standard outputs. As shown in FIG. 16A, the input file text 1602 may include the following:

NAME: This is the name that will be called out in the program block 1118 to specify which output block 1112 is being used for a given job/simulation by the evolutionary software program (e.g., car_output).

Figure 16B:
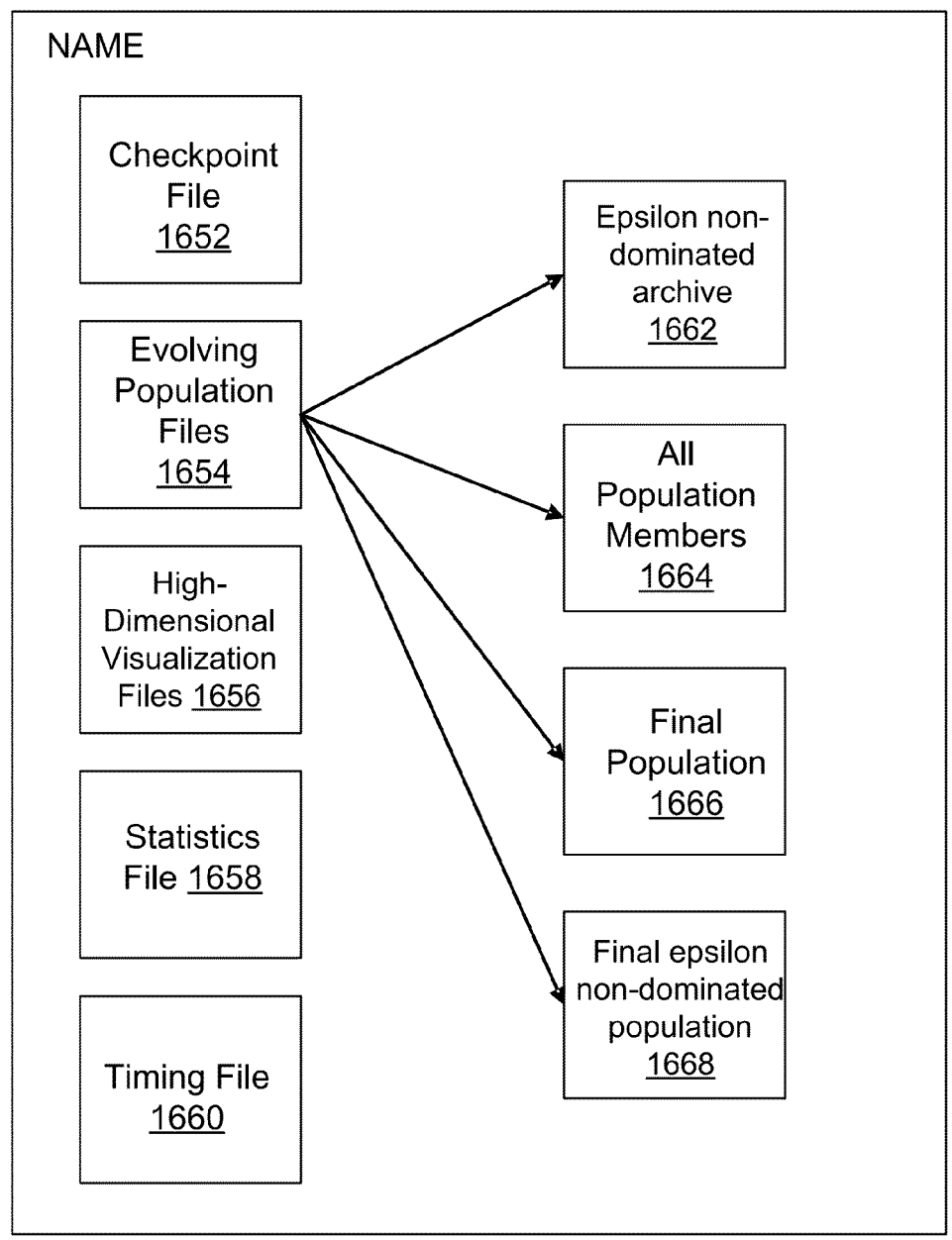
FIG. 16B illustrates an example block diagram for illustrating the output block, according to an example embodiment of the invention.

As shown in FIG. 16A, there may be several different types of outputs. Each output type may be turned ON or OFF with the YES or NO keywords respectively and if the type has the potential to produce data at every generation, a parameter (e.g., MODULO_FREQ) is specified to inform the evolutionary software program at what iteration/generational frequency, the data is to be output (e.g., printed to a file). According to an example embodiment of the invention, the output types may include:

1) A checkpoint file that periodically (in accordance with the specified MODULO_FREQ_HOURS) saves the archive to a file offline or in a specified computer storage location (e.g., database) or other non-volatile memory that allows for restarting the jobs/simulations after node failures or run termination.
2) Files that contain the designs that make up the evolving populations (either all population members, or only the epsilon non-dominated individuals making up the archive).
3) A statistics file that contains, among other things, a convergence history that is used to calculate the box-fitness termination criteria
4) A file that contains an echo of all "Blocks" for a given simulation. This is useful for repeatability of pervious runs.
5) Two types of high-dimensional visualization files:
    a). Only objective function data (useful to watch the evolution of the population in the objective function space)
    b). Both the objective function data and chromosome data (useful for interrogating individual solutions)
6) A file that contains timing information, including but not limited to average function evaluation time and distributed computing communication costs FIG. 16B illustrates an example block diagram for illustrating the output block 1112. FIG. 16B illustrates a checkpoint file 1652, evolving population files 1654, high-dimensional visualization files 1656, a statistics file 1658, and a timing file 1660, as similarly described above. The evolving population files 1654 may be associated with an epsilon non-dominated archive 1662, all population members 1664, a final population 1666, and/or a final epsilon non-dominated population 1668.

FIG. 17A illustrates an example input file text 1702 for implementing an example settings block 1114. In an example embodiment of the invention, the example input file text 1702 may specify run-time settings for an algorithm of a given job/simulation. As shown in FIG. 17A, the input file text 1702 may include the following:

NAME: This is the name that will be called out in the program block to specify which Settings block is being used for a given job/simulation for the evolutionary software program (e.g., car_settings).

The types or classes of settings may include the following:
1) Settings that control the evolutionary algorithm including the search dynamics (e.g., crossover and mutation rates), population sizing, connected run lag windows/termination, etc.
2) Settings that control the search in infeasible spaces (e.g., specific elements of boxes 806 and 808).
3) Job termination options (e.g., box fitness, max run time, max function evaluations).

Figure 17B:
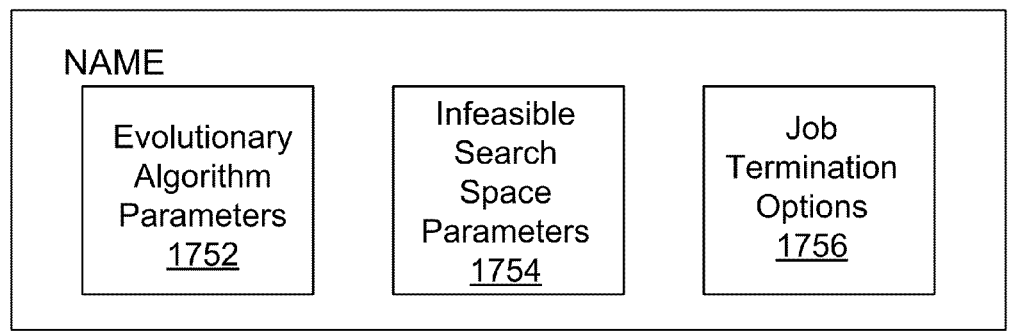
FIG. 17B illustrates an example block diagram for illustrating an example settings block, according to an example embodiment of the invention.

FIG. 17B illustrates an example block diagram for illustrating the settings block 1114. In particular, the settings block 1114 may include setting such as evolutionary algorithm parameters 1752, infeasible search space parameters 1754, and job termination options 1756. It will be appreciated that the infeasible search space parameters 1754 may be utilized only where the problem being solved or optimized falls into the category of having a large infeasible search space (e.g., scheduling). Other settings are available without departing from example embodiments of the invention.

FIG. 18A illustrates an example input file text 1802 for implementing an example plug-in block 1116. In an example embodiment of the invention, the example input file text 1802 may allow external software packages to be used by or "plugged into" in the evolutionary software program to support the functions block 1104 (e.g., objective functions, infeasibility functions).

In an example embodiment of the invention, the plug-ins associated with the plug-in block 1116 may be made available to the evolutionary software program as shared libraries or other software modules that are accessible from a designated storage location. For example, as shown in the example input file text 1802, the 'LIBRARY' keyword may designate the location (e.g., input path) where the shared libraries or other software modules are located. In addition, like the functions block 1104, pre-processing and post-processing functions can be written that pertain specifically for a plug-in.

It will be appreciated that it may be beneficial to make variables typically only known to the plug-in code, available to the user through the input file for the evolutionary software program. Accordingly, the "FUNC_PARSE_KEYWORDS" and "FUNC_GENTAB_KEY" are mechanisms that allow for this.

The plug-in may require input arguments for initialization or for other purposes. Any of the arguments can be made available for this purpose by indicating the argument type (e.g., ARGUMENT_REAL or ARGUMENT_INT), tag, and value. It will be appreciated that the same plurality of arguments and plurality of argument types are available to the plugin 1802 as are available to the example input file text 1402 of FIG. 14B, according to an example embodiment of the invention.

Figure 18B:
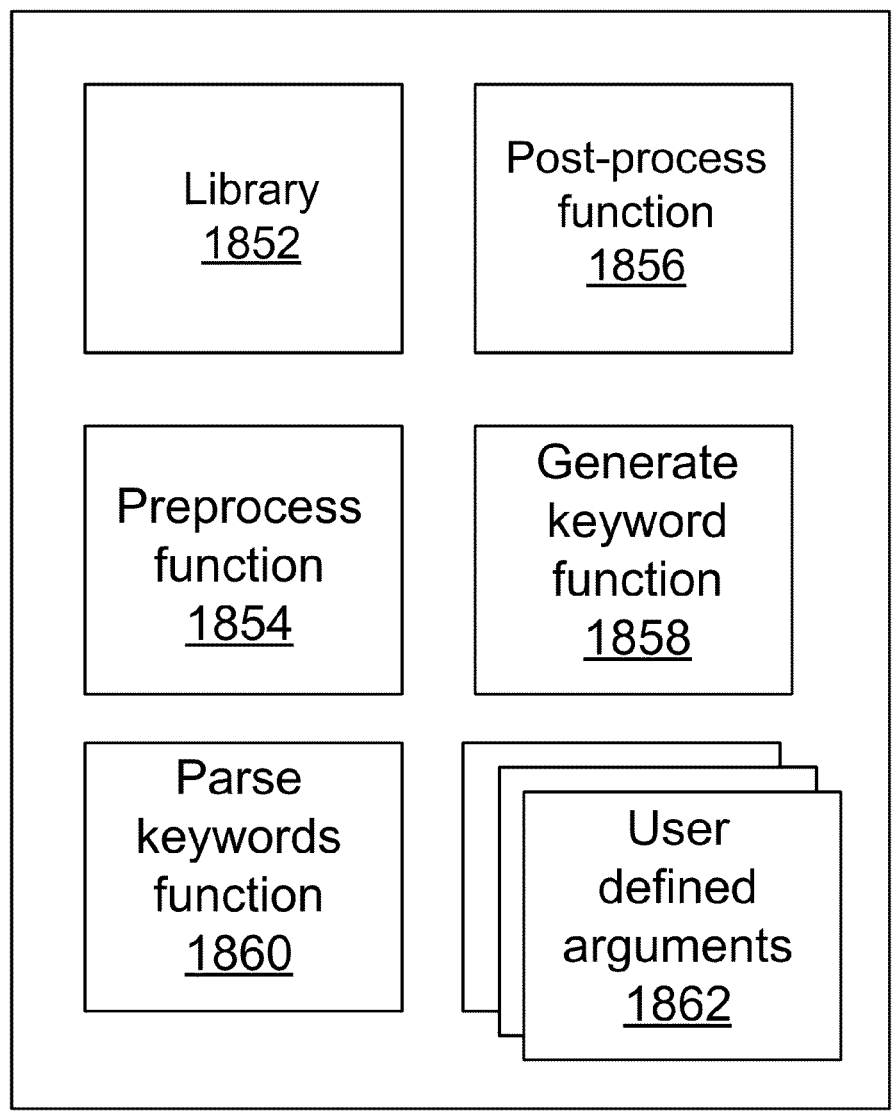
FIG. 18B illustrates an example block diagram for illustrating the plug-in block, according to an example embodiment of the invention.

FIG. 18B illustrates an example block diagram for illustrating the plug-in block 1116. In particular, the plug-in block 1116 provides access to a library 1852 (e.g., a software storage module stored in a computer memory location) for storing one or more plug-ins. The plug-in block 1116 may also provide access to a pre-process function 1854 or a post-process function 1856 that may be utilized before or after the operations of the plug-ins. In addition, the plug-in block 1116 may also have a generate keyword function 1858 and a parse keywords function 1860, which make variables from the plug-in code available to the user through the input file. Finally, the plug-in block 1116 may also include one or more user-defined arguments 1862.

FIG. 19A illustrates an example input file text 1902 for implementing a program block 1118. The program block 1118 generally utilizes and/or incorporates a portion or all of the prior blocks described with respect to FIGS. 12-18. In particular, the program block 1118 may tie together the prior component blocks in representing a particular problem to be optimized. As shown in FIG. 19A, the input file text 1902 may include the following:

NAME: This is the name that will be called, perhaps via a command line, to start a given job/simulation for the evolutionary software program.

PROG_TYPE: Allows a user to specify the type of evolutionary algorithm used to solve a particular problem.

RESULTS_DIRECTORY: Allows the user to specify where all output (e.g., either from the Output block or user-defined output functions) is to be written to disk.

In the example input file text, the remaining blocks are enumerated and includes one each of the following blocks:
1) Functions,
2) Output,
3) Genes,
4) Objectives,
5) Settings, and/or
6) Arguments.

Figure 19B:
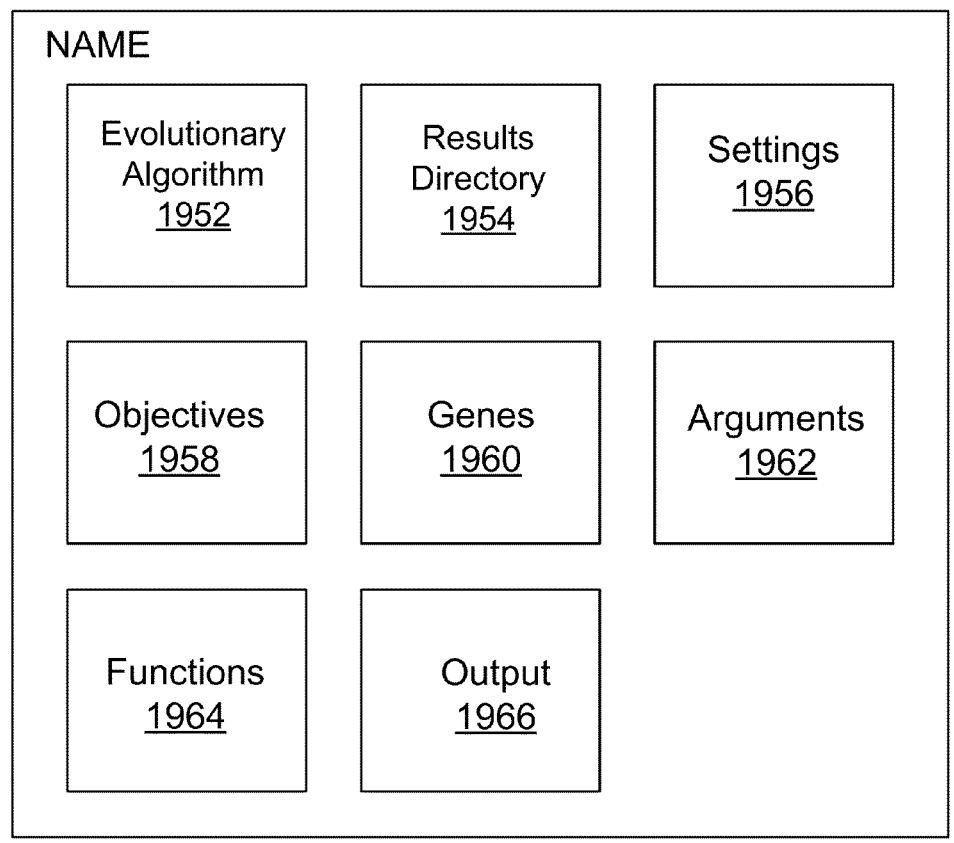
FIG. 19B provides an example block diagram for illustrating the program block, according to an example embodiment of the invention.

FIG. 19B illustrates an example block diagram for illustrating the program block 1120. The program block 1120 may designate an evolutionary algorithm 1952, a results directory 1954, settings 1956, objectives 1958, genes 1960, arguments 1962, functions 1964, and outputs 1966.

1. Example Embodiment for Satellite Constellation Optimization

Satellite constellation optimization may be to determine which combination of satellite orbits provides optimal coverage. As background, in order for a satellite to be able to perform its mission, the satellite must be able to "see" or cover the location(s) that it is trying to sense or communicate with. In order to understand the complexity of this task, an analogy to the Traveling Salesman Problem (TSP) is provided. With the traditional TSP problem, a salesman must find the optimal tour from a given list of cities, visiting each city only once. Now suppose that the cities are a grid of thousands of receivers located around the earth and the orbit of a satellite (the salesman) is the potential fixed path that may or may not cover the receivers. What orbit provides the optimal path that gives access to the most receivers? Next, increase the number of satellites to form a constellation and impose access constraints like minimum receiver elevation angles, link budgets, sun-illumination, and simultaneous satellite access. What combination of orbits provides optimal coverage of the receiver grid? Coverage analysis can be extraordinarily difficult due to this factorial growth in its complexity.

An example application program interface (API) can be defined for an evolutionary software program that is utilized for an example satellite constellation optimization, which will be described herein with respect to FIGS. 20A-20D. The example satellite constellation optimization is associated with a design of a three-satellite constellation in which decision makers (stakeholders) seek to minimize two coverage metrics known as maximum and average revisit time, according to an example embodiment of the invention. The maximum revisit time (MRT) is the maximum visibility gap to any receiver in a grid (region of interest which may or may not be the entire Earth). The average revisit time is the average of the gaps to all receivers in the grid. Since these statistics are gap metrics, the gaps are to be minimized in order to minimize the metrics.

Recall that the API for the evolutionary software program allows for external, domain-specific source code to be called upon for the objective function calculations. In this example satellite constellation optimization, external, domain-specific source code can be called upon to read in each chromosome (the satellite constellation designs) produced by the evolutionary software program and return the determined average and maximum revisit times to the receiver grid.

FIGS. 20A-20D illustrate an example implementation of an API for the evolutionary software program that is utilized for an example satellite constellation optimization. In particular, FIGS. 20A-D illustrate an example implementation of an objectives block 2002, a functions block 2004, an arguments block 2006, genes block 2008, matrix gene 2010, output block 2012, settings block 2014, and program block 2018.

Referring now to FIG. 20A, in the objectives block 2002, two objectives are specified. The first objective corresponding to OBJ_NUM 0 is associated with minimizing the average revisit time to a grid of points representing a region on the Earth's surface. The second objective corresponding to OBJ_NUM 1 is associated with minimizing the maximum revisit time to a grid of points representing a region on the Earth's surface. Through the API mechanisms, the first objective and the second objective can be associated with the respective average and maximum revisit time objective functions.

In addition, as also shown in block 2002, neither objective enables objective function space scaling to scale the objective values between a predetermined range. Likewise, in both objectives, the average revisit time epsilon associated with the first objective is set at 0.45 seconds (0.0075 minutes), and the maximum revisit time epsilon associated with the second objective is set at 0.45 seconds (0.0075 minutes). The epsilon values may be utilized with the epsilon non-dominated sorting, as described herein.

In the functions block 2004, "Revisit_objectives" is the name that identifies the application source code that, for a given chromosome, performs the average and maximum revisit function evaluations. The "Revisit_preprocess" identifies the application source code that performs startup processing after the input file is parsed but before Revisit_Objectives begins to process chromosomes.

The arguments block 2006 illustrates just a few of the many argument required by the Revisit objective function code (e.g., ground station locations, visibility masks, etc.). For example, the tag "minE1", which is defined by ARGUMENT_REAL, corresponds to the minimum elevation angle, below which the satellite will no longer have visibility to a receiver. The receiver grid itself is defined by ARGUMENT_ARRAY_REAL corresponding to each latitude point (latGrid) and ARGUMENT_REAL for the longitude.

Referring to FIG. 20B, the genes block 2008 is illustrated along with a matrix gene 2010. The genes block 2008 identifies a matrix gene "constellation_gene_matrix" that is used to build a chromosome. The identified matrix gene is defined in further detail by GENE_MATRIX in the matrix gene 2010.

In the matrix gene 2010, each row corresponds to the six variables that define a satellites position in space (three rows=three satellites). The first column (A) in the row corresponds to a, the semimajor axis that defines the size of the orbit. The second column (B) corresponds to e, the eccentricity that defines the shape of the orbit. The third column (C) corresponds to i, the inclination that defines the orientation of the orbit with respect to the Earth's equator. The fourth column (D) corresponds to $\Omega$, the right ascension of the ascending node that defines the location of the ascending node with respect to a reference direction in the Earth's equatorial plane. The fifth column (E) corresponds to $\omega$, the argument of periapsis that defines the location of the minimum altitude point within the orbit plane with respect to the ascending node. The sixth column (F) corresponds to M, the mean anomaly that defines the position of the satellite in the orbit.

The first row (0), third column (C) for the first satellite defines a cell that corresponds to Cell C0. For Cell C0, there is an evolved variable which is searched by the evolutionary software program between the limits defined by LIMITS COL=C (0.0 to 180 degrees). Moving to the second satellite, the second row (1), third column (C) defines a cell that corresponds to Cell C1. For Cell C1, there is an evolved variable which is searched by the evolutionary software program between the limits defined by LIMITS COL=C (0.0 to 180 degrees). In addition, for Cell D1, there is likewise an evolved variable which is searched by the evolutionary software program between the limits defined by LIMITS COL=D (0.0 to 360.0 degrees). For Cell F1, there is an evolved variable which is searched by the evolutionary program between the limits defined by LIMITS COL=F (0.0 to 360.0 degrees). Moving to the third satellite, the third row (2), third column (C) defines a cell that corresponds to Cell C2. For Cell C2, there is an evolved variable which is searched by the evolutionary software program between the limits defined by LIMITS COL=C (0.0 to 180 degrees). In addition, for Cell D2, there is likewise an evolved variable which is searched by the evolutionary software program between the limits defined by LIMITS COL=D (0.0 to 360.0 degrees). For Cell F2 we have an evolved variable which is searched by the evolutionary program between the limits defined by LIMITS COL=F (0.0 to 360.0 degrees).

FIG. 20B also illustrates the output block 2012. The output block 2012 provides for the following:

The current archived non-dominated population members of the evolutionary software program are being written to a file (e.g., checkpoint file) every six minutes (YES, MODULO_FREQ_HOURS=0.1 hrs for GEN_OUTPUT_CHECK_POINT).

Each population (e.g., chromosomes and objective functions) is not being printed or written to file at every iteration/generation ("NO" for GEN_OUTPUT_ALL_POPS).

The archived non-dominated population members are being printed or written to a file at every iteration/generation. (YES, MODULO_FREQ_HOURS_FREQ=1 for GEN_OUTPUT_ALL_NON_DOMINATED).

At job termination, the entire final population (both non-dominated and dominated solutions) is being printed or written to a file ("YES" for GEN_OUTPUT_FINAL_POP).

At job termination, the final non-dominated population members are being printed or written to a file ("YES" for GEN_OUTPUT_FINAL_NON_DOMINATED).

Two high-dimensional visualization files (one with only objective function data, the other with both objective function and chromosome data) are being generated every ten generations (YES, BOTH, MODULO_FREQ=10 for GEN_OUTPUT_VISUAL_TOOLKIT).

The detailed timing data (function evaluation time, communication costs, etc.) is being reporting or printed/written to a file every ten generations. (YES, MODULO_FREQ=10 for TIMERS_RPT).

A life-sign is being printed to a screen every generation showing that the evolutionary software program is running properly (YES, MODULO_FREQ=1 for LIFE_SIGN).

FIG. 20C illustrates an example settings block 2014, according to an example embodiment of the invention. The settings block 2014 allows the evolutionary software program to perform a "random seed analysis" (RANDOM_SEED_ANALYSIS), which means that the evolutionary software program will run n number of jobs where n is defined by the STOP tag. The random seeds can be random (RANDOMIZE=YES) or pre-seeded (pre-determined) using a file (RANDOMIZE=NO). In this example, the initial population size (POP_SIZE_INITIAL) and the minimum population size (POP_SIZE_MINIMUM) is 100 members (e.g., chromosomes). The auto-adaptive population is allowed to grow to a maximum size (POP_SIZE_MAXIMUM) of 20,000 individuals.

Still referring to the example settings block 2014, at each connected run, the population is increased according to the scaling factor (POP_SCALING_FACTOR), in this case 0.25. This means that if, at connected run reinvigoration, the archive has 100 members in it, the new population at the start of the next connected run will have the 100 non-dominated archive members plus 300 new randomly generated solutions (for a total of 400).

After the first connected run (which runs for LAG_WINDOW_INITIAL generations, 250 in this case), the subsequent connected runs execute for a maximum number of generations according to MAX_GENERATIONS_PER_RUN, in this case, 100 generations. This means that each connected run (after the initial run) is forced to commence once 100 generations have elapsed if search has not stagnated according to the LAG_WINDOW_FINAL criteria. LAG_WINDOW_FINAL=20 means that, after the first connected run, if looking back 20 generations from the current generation, there is less than 10% improvement (defined by RUN_TERM_CRITERIA, YES, DELTA=10) in the archive population (See, e.g., run termination criteria discussed herein in block 220 of FIG. 2), then a new connected run commences. LAG_WINDOW_INIT_NUM_GENS corresponds to how many of the connected runs beginning with the initial one will run for exactly 250 generations (LAG_WINDOW_INITIAL).

The evolutionary algorithm operator probability is set to 0.9 for crossover (REAL_CROSSOVER_PROBABILITY), which means that for any selected pair of parent chromosomes, there is a 90% probability that the chromosomes of the selected parents will undergo crossover. If the chromosomes of the selected pair of parents undergo crossover, each pairwise gene in the chromosome will participate in crossover with a 50% probability. The evolutionary algorithm operator probability (REAL_MUTATION_PROBABILTY) is set to 0.05 for mutation, which means that for any selected pair of parent chromosomes, there is a 5% probability that any given gene in each individual child chromosome will be mutated.

The job termination criteria, as discussed herein, has three mechanisms to halt the evolutionary search. The first is simply the maximum number of function evaluations, the second is maximum elapsed time, and the third is the box fitness termination criterion. According to the settings block 2014, the job termination is based upon box fitness. The settings that control the box fitness termination are LAG_WINDOW, PCT_UNCHANGED, NUM_TIMES. In this optimization example, the job is terminated when, if looking at the archive population 20 generations from the current generation (LAG_WINDOW), a percentage of the population remains unchanged according to their box fitness, above 90 percent (PCT_UNCHANGED), and this threshold is not broken for 20 subsequent generations (NUM_TIMES).

Figure 20D:
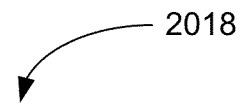

FIG. 20D illustrates an example program block 2018 where pieces of the problem are tied together to form the complete satellite constellation optimization problem to be solved. Referring to block 2018, the NAME (e.g., constellation_2obj) can be called from a command line, or executed through a graphical user interface (GUI) to start a job. The evolutionary algorithm used is specified by program type (PROG_TYPE), which allows for different types of evolutionary algorithms to be selected depending on which is most effective for a given problem. The MASTER_SLAVE_SPEEDUP is set to YES to indicate to the evolutionary software program that mechanisms that give near 100% processor efficiency on large-heterogeneous cluster, be invoked. All output specified in the output block 2012 is printed to a location given by the name associated with the RESULTS_DIRECTORY. In this case, the directory is named 'constellation_2obj' because the USE_PROGRAM NAME keyword is invoked. The remaining keywords identify the required blocks to define the program, which were previously identified in FIGS. 20A-20C.

Figure 21:
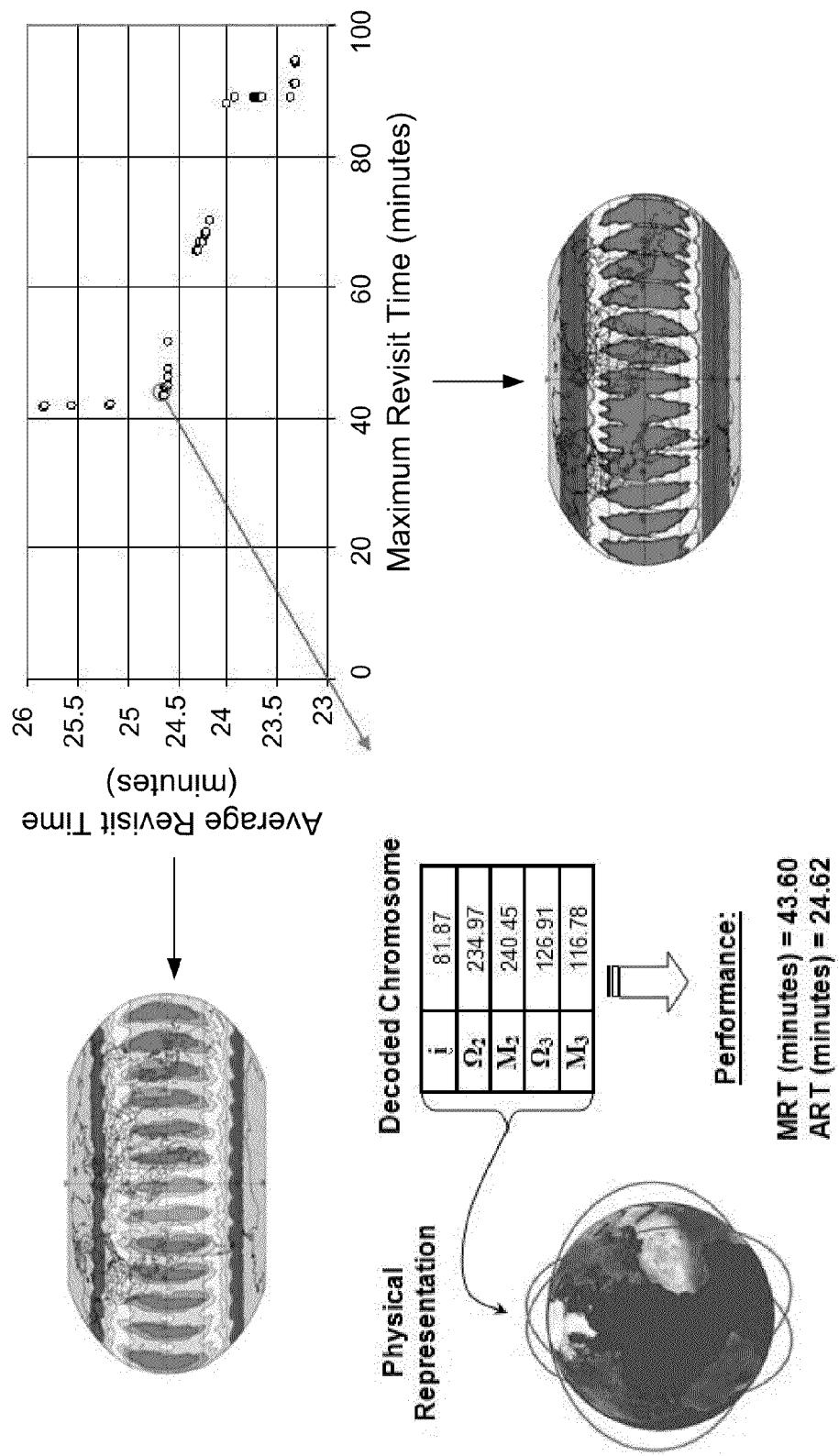
FIG. 21 illustrates example results that may be obtained from an executed job of the evolutionary software program associated with satellite constellation optimization, according to an example embodiment of the invention.

FIG. 21 illustrates example results that may be obtained from an executed job of the evolutionary software program associated with satellite constellation optimization, according to an example embodiment of the invention. In particular, the chart in the upper right corner of FIG. 21 illustrates non-dominated solutions for the tradeoff between maximum and average revisit times. It will be appreciated that the maximum and average revisit time global performance can be illustrated by respective Robinson projection global contour plots. The chromosome for the selected design is also shown along with its physical satellite constellation representation.

2. Example Embodiment for Airline Network Schedule Optimization

Airline network schedule optimization may be used to determine an optimal set of flight schedules for one or more airlines or airports. Generally, with prior methods, the amount of processing time required to solve the schedule optimization problem increases very quickly as the size of the problem grows. However, the evolutionary software program described herein can leverage infeasibility handling mechanisms to provide for solutions to the scheduling problem in less than the super-polynomial time typically required using prior methods.

According to an example embodiment of the invention, the evolutionary software program is used to optimize the daily schedule for a small airline wherein the decision makers (stakeholders) seek to maximize revenue, minimize cost, and minimize schedule disruption. The chromosome (decision variable space) includes the take-off time for 391 flight legs to potentially as many airports.

Recall that the API of the evolutionary software program allows for external, domain-specific source code to be called upon for the objective function calculations. In this example scheduling optimization, an external, domain-specific source code can be called upon to read in each chromosome (the take-off times for 391 flight legs) and return the following information: (i) revenue, cost, and schedule disruption if the solution is feasible, or (ii) if infeasible, how many flight legs are not valid (e.g., violated a constraint) and the total number of bad minutes (e.g., for a given design if flight leg 1 of 2 violates a take-off constraint by 20 minutes, and flight leg 2 of 2 violates the its leg constraint by 3 minutes the total invalid flight legs are 2, and total bad minutes are 23 and the schedule is infeasible).

FIGS. 22A-D illustrate an example implementation of an API for the evolutionary software program that is utilized for an example airline network schedule optimization. In particular, FIGS. 20A-D illustrate an example implementation of an objectives block 2202, a functions block 2204, an arguments block 2206, a genes block 2208, an output block 2212, a settings block 2214, and a program block 2218.

Referring now to FIG. 22A, in the objectives block 2202, three objectives are specified. The first objective corresponding to OBJ_NUM 0 is associated with minimizing the cost to fly the generated schedule. The second objective corresponding to OBJ_NUM 1 is associated with maximizing the revenue generated by the schedule. The third objective corresponding to OBJ_NUM 2 is associated with minimizing the schedule disruption, which may be defined by the total number of take off-legs that had a non-zero change from the a baseline schedule. Through the API mechanisms, the three objectives can be associated with their respective cost, revenue, and disruption objective functions.

In addition, as shown in block 2202, none of the objectives enable objective function space scaling. The cost epsilon associated with the first objective is set at $10,000. The revenue epsilon associated with the second objective is also set at $10,000. The schedule disruption epsilon associated with the third objective is set at 1 (units of flight legs).

In the functions block 2204, "air1_infeasible" identifies the application source code that performs the feasibility check, and if infeasible the application source code returns the number of bad legs and number of bad minutes. The "air1_preprocess" identifies the application source code that performs startup processing after the input file is parsed, but before "air1_funcEval" begins to process feasible chromosomes. The arguments block 2206 illustrates an argument with tag "scenarioFname," which identifies the location of the schedule data used by the function "air1_funcEval." Block 2206 indicates that this location information comprises characters (i.e., ARGUMENT_CHAR).

Referring to FIG. 22B, a genes block 2208 is illustrated. In this example, it was desirable to minimize schedule disruption—in other words, if it is not advantageous from a minimizing cost or maximizing revenue perspective, don't change the take-off time from their baseline schedule. A Gaussian distribution can be used for the generation of the takeoff time for each leg (vs. the uniform distribution of the other Gene types) because the Gauss gene has a higher probability of creating genes (take-off times) closer to the nominal schedule (and therefore less disruptive). A Gaussian gene, as illustrated in the genes block 2208, in a given chromosome can be produced by the following process:

A LOW_SIGMA is produced by selecting a uniform random number between LOW_MIN and LOW_MAX.

A HIGH_SIGMA is produced by selecting a uniform random number between HIGH_MIN and HIGH_MAX.

Finally, a SIGMA is produced by selecting a uniform random number between LOW_SIGMA and HIGH_SIGMA. The SIGMA defines the Gaussian distribution from which the chromosome variable is pulled from.

The LOW_MIN/MAX and HIGH_MIN/MAX approach described above can be utilized to give the user control over the proportion of "flat" vs. "sharp" distributions that are used to select a random number from the Gaussian for any given chromosome. The effect of these settings is to either flatten or sharpen the distribution about the nominal gene value at the mid-point of the LIMITS. In the example genes block 2208, the "search space or "limits" are 2 hours (120 minutes) on either side of each take-off leg of the baseline schedule (i.e., LIMITS(−120.0, 120)). In other words, the evolutionary software program will construct schedules for evaluation that search for take-off times + or −120 minutes from the baseline takeoff time for each leg). There are 391 flight legs in this example, INDEX ASSIGN, NUM=391, wherein each gene's variable name will be associated with a particular index number (e.g., the chromosome variable names are delta_0, delta_1, . . . ).

FIG. 22B also illustrates the output block 2212. The output block 2212 provides for the following:

The current archived non-dominated population members of the evolutionary software program is being printed or written to a file (e.g., checkpoint file) every six minutes (YES, MODULO_FREQ_HOURS=0.1 hrs for GEN_OUTPUT_CHECK_POINT). In this example, we are printing, to a file, the checkpoint file every 6 minutes.

Each population (e.g., chromosomes and objective functions) is not being printed or written to file at every iteration/generation ("NO" for GEN_OUTPUT_ALL_POPS).

The archived non-dominated population members are being printed or written to a file at every iteration/generation. (YES, MODULO_FREQ_HOURS_FREQ=1 for GEN_OUTPUT_ALL_NON_DOMINATED).

At job termination, the entire final population (both non-dominated and dominated solutions) is being printed or written to a file (YES for GEN_OUTPUT_FINAL_POP).

At job termination, the final non-dominated population members are being printed or written to a file (GEN_OUTPUT_FINAL_NON_DOMINATED).

Two high-dimensional visualization files (one with only objective function data, the other with both objective function and chromosome data) are being generated every ten generations (YES, BOTH, MODULO_FREQ=10 for GEN_OUTPUT_VISUAL_TOOLKIT).

The detailed timing data (function evaluation time, communication costs, etc.) is being reporting or printed/written to a file every ten generations. (YES, MODULO_FREQ=10 for TIMERS_RPT).

A life-sign is being printed to a screen showing that the evolutionary software program is running properly (YES, MODULO_FREQ=1 for LIFE_SIGN).

FIG. 22C illustrates an example settings block 2214, according to an example embodiment of the invention. The settings block 2214 allows the evolutionary software program to perform a "random seed analysis" (RANDOM_SEED_ANALYSIS), which means that the evolutionary software program will run n number of times where n is defined by the STOP tag. The random seeds can be random (RANDOMIZE=YES) or pre-seeded (pre-determined) using a file (RANDOMIZE=NO). In this example, he minimum population size (POP_SIZE_MINIMUM) is 100 members with the auto-adaptive population allowed to grow to a maximum population size (POP_SIZE_MAXIMUM) of 20,000 individuals. The initial population size (POP_SIZE_INITIAL) is set to 10,000 individuals for this example.

Still referring to the example settings block 2214, at each connected run, the population is increased according to the scaling factor (POP_SCALING_FACTOR), in this case 0.25. This means that if, at connected run reinvigoration, the archive has 100 members in it, the new population at the start of the next connected run will have the 100 non-dominated archive members plus 300 new randomly generated solutions (for a total of 400).

After the first connected run (which runs for LAG_WINDOW_INITIAL generations, 250 in this case), the subsequent connected runs execute for a maximum number of generations according to MAX_GENERATIONS_PER_RUN, in this case, 100 generations. This means that each connected run (after the initial run) is forced to commence once 100 generations have elapsed if search has not stagnated according to the LAG_WINDOW_FINAL criteria. LAG_WINDOW_FINAL=20 means that, after the first connected run, if looking back 20 generations from the current generation, there is less than 10% improvement (defined by RUN_TERM_CRITERIA, YES,DELTA=10) in the archive population (See, e.g., run termination criteria discussed herein in block 620 of FIG. 6), then a new connected run commences. LAG_WINDOW_INIT_NUM_GENS corresponds to how many of the connected runs beginning with the initial one will run for exactly 250 generations (LAG_WINDOW_INITIAL).

The INFEASIBLE_OPTIMIZATION YES, indicates to the evolutionary software program that the infeasibility handling mechanisms should be invoked. The RANDOM_POP_SIZE=100 corresponds to block 902 of FIG. 9 as well as block 1014 of FIG. 10. The RANDOM_ITER=2500 corresponds to block 912 of FIG. 9 as well as 1024 in FIG. 10. CROSSOVER_ITER=2500 correspond to block 1012 of FIG. 10.

According to the settings block 2214 of FIG. 22C, the number of constraints (NUM_CONSTRAINTS) for this example scheduling optimization problem are set to 2. The two constraints are, the number of (i) "bad" legs and (ii) "bad" minutes, where bad legs correspond to the total number of takeoff times (for a given 391 flight-leg schedule generated by the evolutionary software program) that violated a take-off time constraint for that particular leg. According to an example embodiment, for each bad take-off leg, assume the take-off time constraint for a particular airport was no later than 10 am and the schedule wanted to take off at 10:05—the number bad minutes for this leg is 5 minutes. The sum of all the bad minutes for all the bad legs for each schedule represents the bad minutes constraint value.

The evolutionary algorithm operator probability is set to 0.9 for crossover (REAL_CROSSOVER_PROBABILITY), which means that for any selected pair of parent chromosomes, there is a 90% probability that the chromosomes of the selected parents will undergo crossover. If the chromosomes of the selected pair of parents undergo crossover, each pairwise gene in the chromosome will participate in crossover with a 50% probability. The evolutionary algorithm operator probability (REAL_MUTATION_PROBABILTY) is set to 0.05 for mutation, which means that for any selected pair of parent chromosomes, there is a 5% probability that any given gene in each individual child chromosome will be mutated.

The job termination criteria, as discussed herein, has three mechanisms to halt search. The first is simply the maximum number of function evaluations, the second is max elapsed time, and the third is the box fitness termination criterion. According to the settings block 2214, the job termination is based upon box fitness. The settings that control the box fitness termination are LAG_WINDOW, PCT_UNCHANGED, NUM_TIMES. In this airline network scheduling example, the job is terminated when, if looking at the archive population 20 generations from the current generation, the % of the population remains unchanged according to their box fitness, above 90%, and this threshold is not broken for 20 subsequent generations (NUM_TIMES).

FIG. 22D illustrates an example program block 2218 where pieces of the problem are tied together to form the complete airline network scheduling optimization problem to be solved. Referring to block 2218, the NAME (e.g., airline_3obj) can be called from a command line, or executed through a graphical user interface (GUI) to start a job. The evolutionary algorithm used is specified by program type (PROG_TYPE), which allows for different types of evolutionary algorithms to be selected depending on which is most effective for a given problem. The MASTER_SLAVE_SPEEDUP is set to YES to indicate to the evolutionary software program that the mechanisms that give near 100% processor efficiency on large-heterogeneous cluster, be invoked. All output specified in the output block 2212 is printed to a location given the name associated with the RESULTS_DIRECTORY. In this case the directory is named 'airline_3obj' because the USE_PROGRAM NAME keyword is invoked. The remaining keywords identify the required blocks to define the program, which were previously identified in FIGS. 22A-22C.

Figure 23:
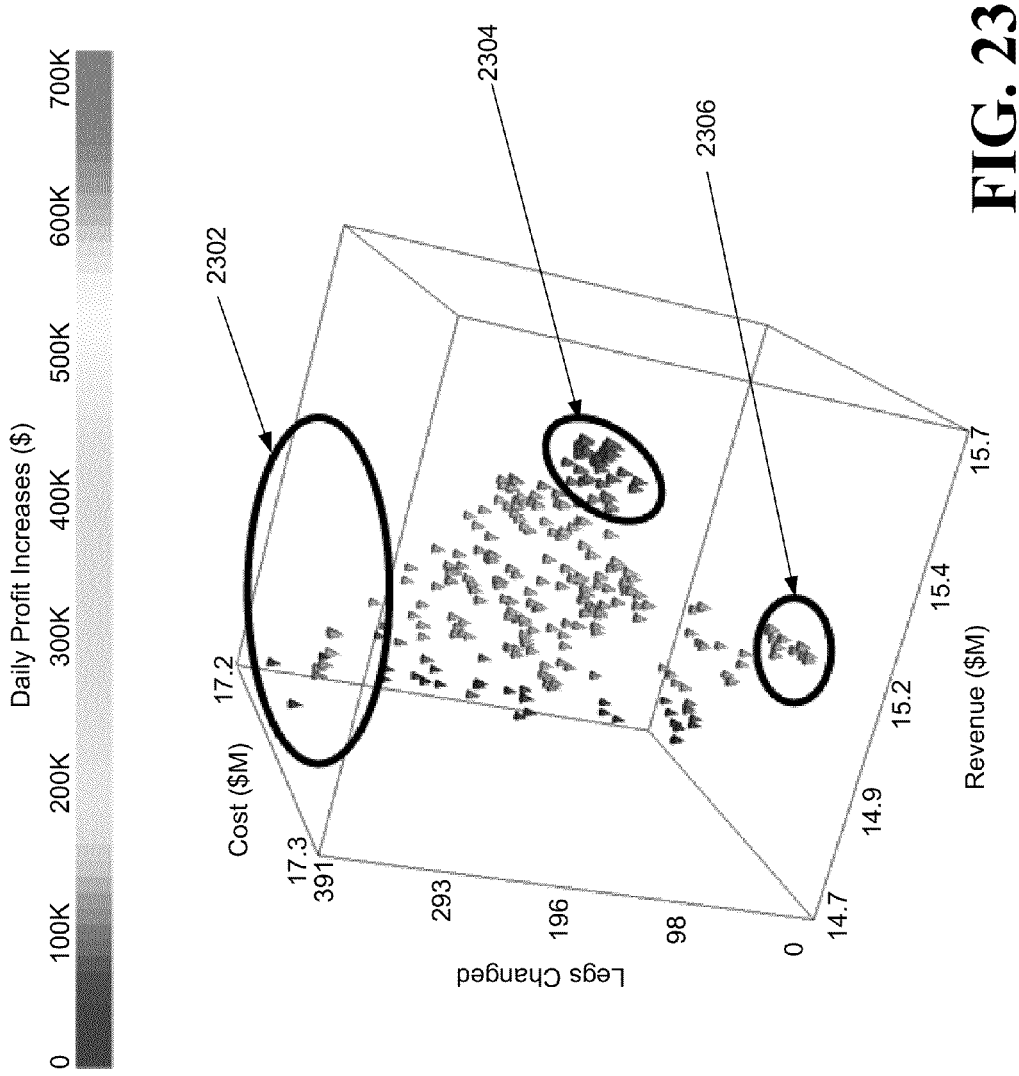
FIG. 23 illustrates example results that may be obtained from an executed job of the evolutionary software program associated with airline network schedule optimization, according to an example embodiment of the invention

FIG. 23 illustrates example results that may be obtained from an executed job of the evolutionary software program associated with airline network schedule optimization, according to an example embodiment of the invention. Recall that this problem involved a three dimensional optimization to find the non-dominated solutions that minimize schedule disruption (legs changed), minimize cost ($M), and maximize revenue ($R). In FIG. 23, each cone marker represents a unique, non-dominated, schedule (391 flight legs) discovered by an executed job of the evolutionary software program. Profit has been added to FIG. 23 as a color dimension, but was not an optimization objective; instead, other modeling details went into the calculation of profit.

Still referring to FIG. 23, the region 2302 includes some of the most disruptive schedule changes. However, these schedule changes do not translate into greater profits for the airline. Instead, the design that produces the greatest profits involves between 220 and 270 legs changes, as illustrated in the region 2304. In addition, the region 2306 includes a design that produces a $350,000 profit increase at the benefit of disrupting only 18 flights.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    receiving, by a master processor, a respective plurality of objective function values for each chromosome data structure of a population of chromosome data structures, wherein the respective plurality of objective function values are obtained based upon an evaluation of each chromosome data structure by a respective plurality of objective functions;
    mapping, by the master processor for each chromosome data structure, the respective objective function values to respective epsilon values, wherein the respective epsilon values define a respective address associated with the plurality of objective functions;
    performing, by the master processor, non-domination sorting of the population of chromosome data structures to generate a reduced population of chromosome data structures based upon an evaluation of the respective plurality of objective function values; and
    performing, by the master processor, epsilon non-dominated sorting according to an optimization of the plurality of objective functions and the defined respective addresses to identify an elite set of addresses,
    wherein the prior steps are performed for a current generation, wherein the elite set of addresses are compared to a prior elite set of addresses for a predetermined number of prior generations to determine one or more variance values, wherein the one or more variance values are utilized to determine whether a current job of an evolutionary algorithm is to be halted.

2. The method of claim 1, wherein the respective epsilon values are obtained at least in part by comparing the respective objective function values to respective epsilon step sizes.

3. The method of claim 2, wherein the respective epsilon step sizes are predetermined prior to initiating the evolutionary algorithm.

4. The method of claim 2, wherein one or more of the respective epsilon step sizes are dynamically varied as a function of search progress associated with the evolutionary algorithm.

5. The method of claim 1, wherein non-domination sorting of the population of chromosome data structures comprises:
    determining that at least two chromosome data structures have a same defined address; and
    retaining only one of the at least two chromosome data structures having the same defined address.

6. The method of claim 1, wherein the optimization of the plurality of objective functions comprises minimizing or maximizing each of the plurality of objective functions.

7. The method of claim 6, wherein the elite set of addresses that are identified based upon being no worse than one or more non-identified addresses according to all of the plurality of objective functions, and strictly better than the eliminated one or more non-identified addresses according to at least one of the plurality of objective functions.

8. The method of claim 1, wherein the one or more variance values remain above a threshold amount for the predetermined number of generations.

9. The method of claim 8, wherein the threshold amount is defined as a percentage.

10. The method of claim 1, wherein the plurality of objective functions conflict at least in part with each other.

11. A system, comprising:
    a memory that stores computer-executable instructions;
    a master processor configured to access the memory, wherein the master processor is further configured to execute the computer-executable instructions to:
    receive a respective plurality of objective function values for each chromosome data structure of a population of chromosome data structures, wherein the respective plurality of objective function values are obtained based upon an evaluation of each chromosome data structure by a respective plurality of objective functions;
    map, for each chromosome data structure, the respective objective function values to respective epsilon values, wherein the respective epsilon values define a respective address associated with the plurality of objective functions;

perform non-domination sorting of the population of chromosome data structures to generate a reduced population of chromosome data structures based upon an evaluation of the respective plurality of objective function values; and perform epsilon non-dominated sorting according to an optimization of the plurality of objective functions and the defined respective addresses to identify an elite set of addresses, wherein the prior steps are performed for a current generation, wherein the elite set of addresses are compared to a prior elite set of addresses for a predetermined number of prior generations to determine one or more variance values, wherein the one or more variance values are utilized to determine whether a current job of an evolutionary algorithm is to be halted.

12. The system of claim 11, wherein the respective epsilon values are obtained at least in part by comparing the respective objective function values to respective epsilon step sizes.

13. The system of claim 12, wherein respective epsilon step sizes are predetermined prior to initiating the evolutionary algorithm.

14. The system of claim 12, wherein one or more of the respective epsilon step sizes are dynamically varied as a function of search progress associated with the evolutionary algorithm.

15. The system of claim 11, wherein non-domination sorting of the population of chromosome data structures comprises:

determining that at least two chromosome data structures have a same defined address; and retaining only one of the at least two chromosome data structures having the same defined address.

16. The system of claim 11, wherein the optimization of the plurality of objective functions comprises minimizing or maximizing each of the plurality of objective functions.

17. The system of claim 16, wherein the elite set of addresses that are identified based upon being no worse than one or more non-identified addresses according to all of the plurality of objective functions, and strictly better than the eliminated one or more non-identified addresses according to at least one of the plurality of objective functions.

18. The system of claim 11, wherein the one or more variance values remain above a threshold amount for the predetermined number of generations.

19. The system of claim 18, wherein the threshold amount is defined as a percentage.

20. The system of claim 11, wherein the plurality of objective functions conflict at least in part with each other.

* * * * *